United States Patent
Taki et al.

(10) Patent No.: US 10,668,945 B2
(45) Date of Patent: Jun. 2, 2020

(54) MOTOR CONTROL APPARATUS, MOTOR DRIVE SYSTEM, AND MOTOR CONTROL METHOD

(71) Applicant: DENSO CORPORATION, Kariya, Aichi-pref. (JP)

(72) Inventors: Masaya Taki, Kariya (JP); Toshimitsu Sakai, Kariya (JP); Koichi Nakamura, Kariya (JP); Shuji Kuramitsu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/243,503

(22) Filed: Jan. 9, 2019

(65) Prior Publication Data
US 2019/0144029 A1 May 16, 2019

Related U.S. Application Data

(63) Continuation of application No. PCT/JP2017/024922, filed on Jul. 7, 2017.

(30) Foreign Application Priority Data

Jul. 11, 2016 (JP) ................................. 2016-136611
Feb. 28, 2017 (JP) ................................... 2017-36595
(Continued)

(51) Int. Cl.
*F04D 15/00* (2006.01)
*H02K 7/14* (2006.01)
(Continued)

(52) U.S. Cl.
CPC ......... *B62D 5/0463* (2013.01); *B62D 5/0403* (2013.01); *B62D 5/0412* (2013.01);
(Continued)

(58) Field of Classification Search
CPC ............................. B62D 5/0463; B62D 5/0403
(Continued)

(56) References Cited

U.S. PATENT DOCUMENTS

2011/0025244 A1* 2/2011 Ura ...................... B62D 5/0403
                                                              318/400.21
2014/0062375 A1    3/2014 Suzuki
(Continued)

FOREIGN PATENT DOCUMENTS

JP    2000-070590 A    3/2000
JP    2003-340192 A    12/2003
(Continued)

OTHER PUBLICATIONS

International Search Report; International Application No. PCT/JP2017/024922; dated Sep. 26, 2017; 4 pages.
(Continued)

*Primary Examiner* — Erick D Glass
(74) *Attorney, Agent, or Firm* — Knobbe, Martens, Olson & Bear, LLP

(57) ABSTRACT

A motor control apparatus includes: multiple motor drive circuits that drive at least one motor; and multiple microcomputers that are operated by a microcomputer power source and include a drive signal generator that generates a motor drive signal. The microcomputers include at least one microcomputer including a stop determiner that determines that operation of an own microcomputer is about to be stopped and transmits information as a stop determination signal. A microcomputer having received the stop determination signal from at least one different microcomputer actually stops operation of an own microcomputer.

22 Claims, 42 Drawing Sheets

(30) Foreign Application Priority Data

Feb. 28, 2017 (JP) .................................. 2017-36596
Jun. 26, 2017 (JP) ................................ 2017-124055
Jun. 26, 2017 (JP) ................................ 2017-124060

(51) Int. Cl.
| | |
|---|---|
| *B62D 5/04* | (2006.01) |
| *G06F 1/12* | (2006.01) |
| *H02P 25/22* | (2006.01) |
| *H02P 27/06* | (2006.01) |
| *B62D 6/08* | (2006.01) |
| *G06F 1/06* | (2006.01) |
| *G06F 1/26* | (2006.01) |
| *G06F 9/4401* | (2018.01) |

(52) U.S. Cl.
CPC ......... *B62D 5/0457* (2013.01); *B62D 5/0481* (2013.01); *B62D 6/08* (2013.01); *G06F 1/12* (2013.01); *H02P 25/22* (2013.01); *H02P 27/06* (2013.01); *G06F 1/06* (2013.01); *G06F 1/26* (2013.01); *G06F 9/4401* (2013.01)

(58) Field of Classification Search
USPC ............................................................ 318/3
See application file for complete search history.

(56) References Cited

U.S. PATENT DOCUMENTS

2017/0237377 A1* 8/2017 Furukawa ............... H02P 29/00
  318/564
2018/0290605 A1* 10/2018 Ito ......................... B60L 15/007

FOREIGN PATENT DOCUMENTS

| JP | 2010-130793 A | 6/2010 |
|---|---|---|
| JP | 2011-148498 A | 8/2011 |
| JP | 5412095 B2 | 2/2014 |
| JP | 5672278 B2 | 2/2015 |
| JP | 2015-081013 A | 4/2015 |
| WO | 2018/012420 A1 | 1/2018 |

OTHER PUBLICATIONS

U.S. Appl. No. 16/243,460, filed Jan. 9, 2019, Taki, et al.
U.S. Appl. No. 16/243,519, filed Jan. 9, 2019, Sakai, et al.

* cited by examiner

MOTOR CONTROL APPARATUS, MOTOR DRIVE SYSTEM, AND MOTOR CONTROL METHOD

CROSS REFERENCE TO RELATED APPLICATIONS

The present application is a continuation application of international Patent Application No. PCT/JP2017/024922 filed on Jul. 7, 2017, which designated the U.S. and claims the benefit of priority from Japanese Patent Application No. 2016-136611 filed on Jul. 11, 2016, Japanese Patent Application No. 2017-36595 filed on Feb. 28, 2017, Japanese Patent Application No. 2017-36596 filed on Feb. 28, 2017, Japanese Patent Application No. 2017-124055 filed on Jun. 26, 2017, and Japanese Patent Application No. 2017-124060 filed on Jun. 26, 2017. The entire disclosures of all of the above applications are incorporated herein by reference.

TECHNICAL FIELD

The present disclosure relates to a motor control apparatus including multiple microcomputers that drive-controls a motor, a motor drive system including the motor control apparatus, and a motor control method.

BACKGROUND

There is a motor control apparatus that drive-controls a motor with use of multiple redundantly provided microcomputers.

SUMMARY

According to one aspect of the present disclosure includes: causing a stop determiner included in at least one of microcomputers to determine that operation of an own microcomputer is about to be stopped; transmitting to another microcomputer, as a stop determination signal, information that operation of the own microcomputer is about to be stopped, in accordance with determination; causing the own microcomputer to receive the stop determination signal from at least one other microcomputer; and causing the own microcomputer to actually stop operation of the own microcomputer in accordance with at least the stop determination signal from the other microcomputer.

BRIEF DESCRIPTION OF DRAWINGS

The above object, other objects, features, and advantages of the present disclosure will be further clarified in the following detailed description with reference to the accompanying drawings. The drawings include.

DETAILED DESCRIPTION

A motor control apparatus according to each of multiple embodiments will be described with reference to the drawings. An ECU as the "motor control apparatus" according to each of the embodiments is included in an electric power steering apparatus of a vehicle, and controls electrification to a motor that outputs steering assist torque. The ECU and the motor configure a "motor drive system".

Substantially identical configurations among the multiple embodiments will be denoted by an identical reference sign and will not be described repeatedly. Each of the following first to eighth embodiments will inclusively be referred to as "the present embodiment".

A configuration of the electric power steering apparatus, a configuration of the motor drive system, and the like to be adopted will initially be described as common matters according to each of the embodiments with reference to FIGS. 1 to 6.

Figure 1:
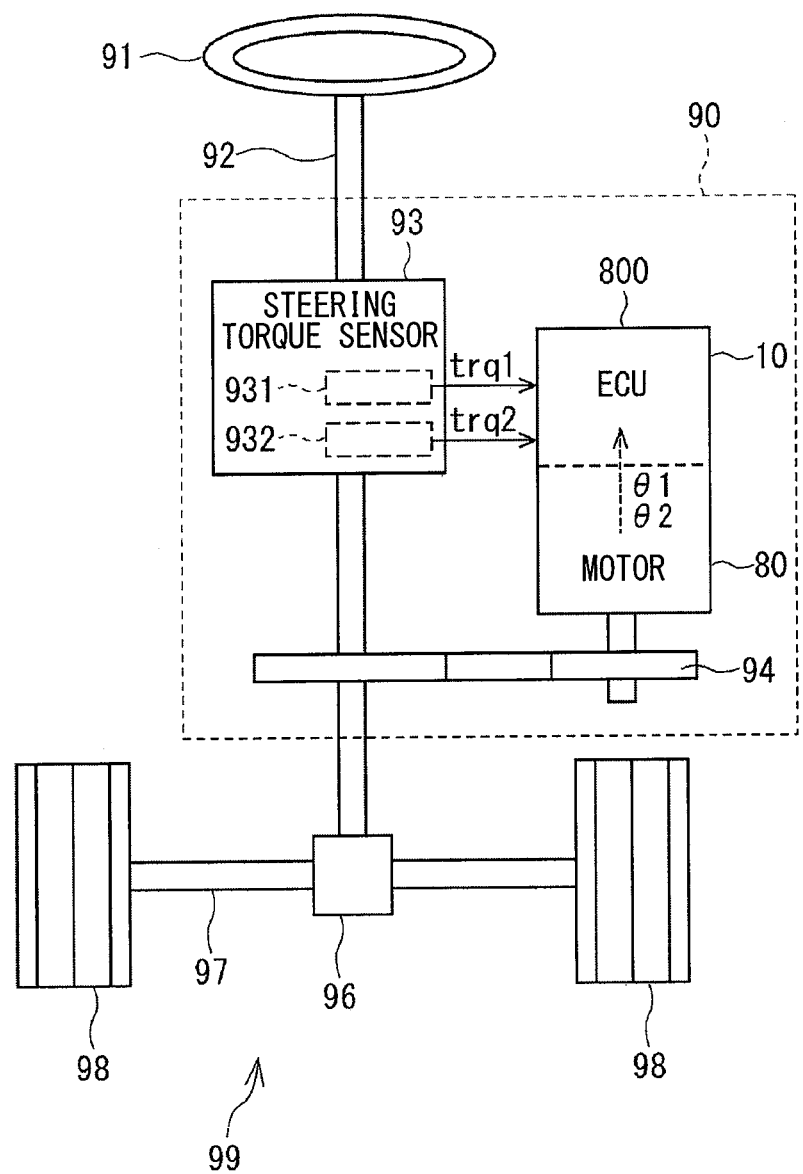
FIG. 1 is a configuration diagram of an electric power steering apparatus including an ECU according to each embodiment functioning as a mechatronically integrated motor drive system.
Figure 2:
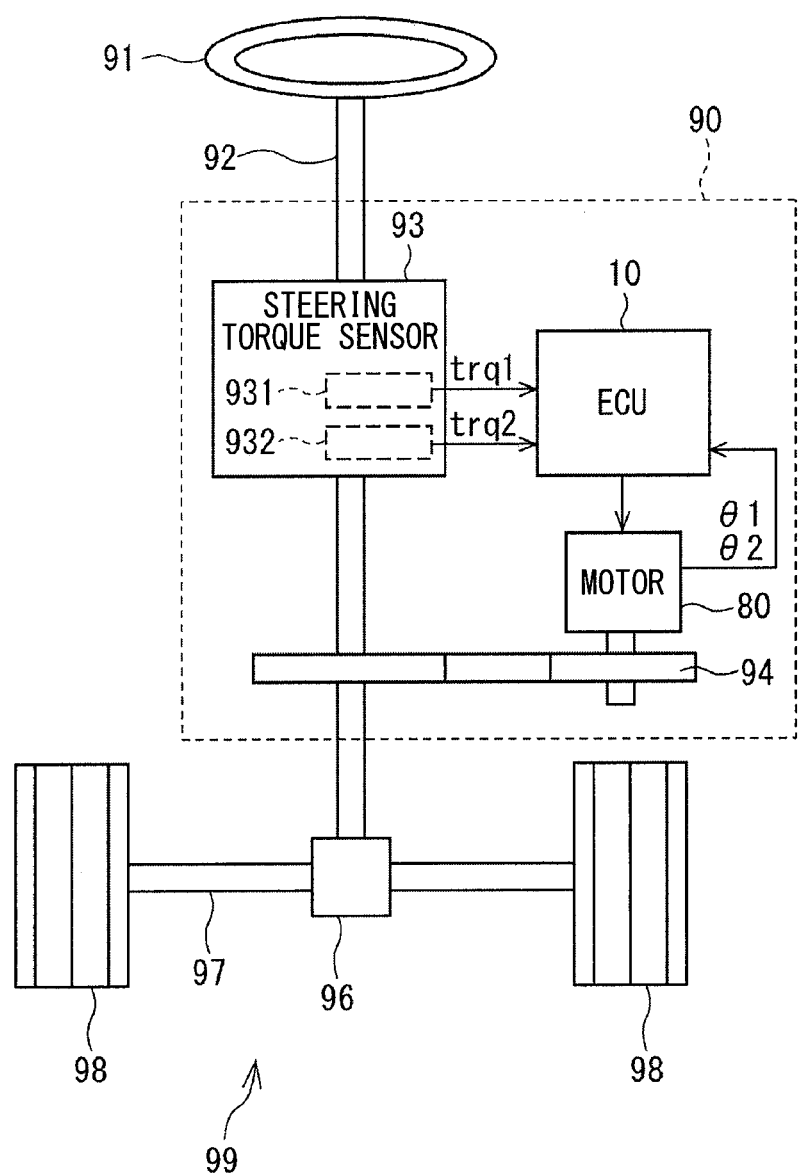
FIG. 2 is a configuration diagram of an electric power steering apparatus including the ECU according to each embodiment functioning as a mechatronically separate motor drive system.

FIGS. 1 and 2 each depict an entire configuration of a steering system 99 including an electric power steering apparatus 90. FIG. 1 depicts a "mechatronically integrated" configuration including an ECU 10 integrally provided at an axial end of a motor 80. FIG. 2 depicts a "mechatronically separate" configuration including the ECU 10 and the motor 80 connected via a harness. The electric power steering apparatus 90 depicted in FIGS. 1 and 2 is of a column assist type. These configurations are similarly applicable to an electric power steering apparatus of a rack assist type.

The steering system 99 includes a steering wheel 91, a steering shaft 92, a pinion gear 96, a rack shaft 97, wheels 98, the electric power steering apparatus 90, and the like.

The steering shaft 92 is connected to the steering wheel 91. The pinion gear 96 is provided at a distal end of the steering shaft 92 and meshes with the rack shaft 97. The rack shaft 97 has two ends provided with a pair of wheels 98 via tie rods, respectively. When a driver turns the steering wheel 91, the steering shaft 92 connected to the steering wheel 91 is rotated. The pinion gear 96 converts rotary motion of the steering shaft 92 to linear motion of the rack shaft 97, and the pair of wheels 98 is steered at an angle according to an amount of displacement of the rack shaft 97.

The electric power steering apparatus 90 includes a steering torque sensor 93, the ECU 10, the motor 80, a reduction gear 94, and the like.

The steering torque sensor 93 is provided at an intermediate portion on the steering shaft 92 and detects steering torque of the driver. The steering torque sensor 93 according to the modes depicted in FIGS. 1 and 2 is duplicated to include a first torque sensor 931 and a second torque sensor 932 and dually detect first steering torque trq1 and second steering torque trq2.

If the steering torque sensor is not provided redundantly, a single detection value of steering torque trq can commonly be applied to two systems. In a case where adoption of the steering torque trq1 and the steering torque trq2 detected redundantly is not specifically meaningful hereinafter, the steering torque trq1 and the steering torque trq2 will collectively be referred to as the single steering torque trq.

The ECU 10 drive-controls the motor 80 in accordance with the steering torque trq1 and the steering torque trq2 to cause the motor 80 to generate desired assist torque. The assist torque outputted from the motor 80 is transmitted to the steering shaft 92 via the reduction gear 94.

The ECU 10 acquires electrical angles θ1 and θ2 of the motor 80 detected by rotation angle sensors, and the steering torque trq1 and the steering torque trq2 detected by the steering torque sensor 93. The ECU 10 drive-controls the motor 80 in accordance with the above information and information such as motor current internally detected in the ECU 10.

Figure 3:
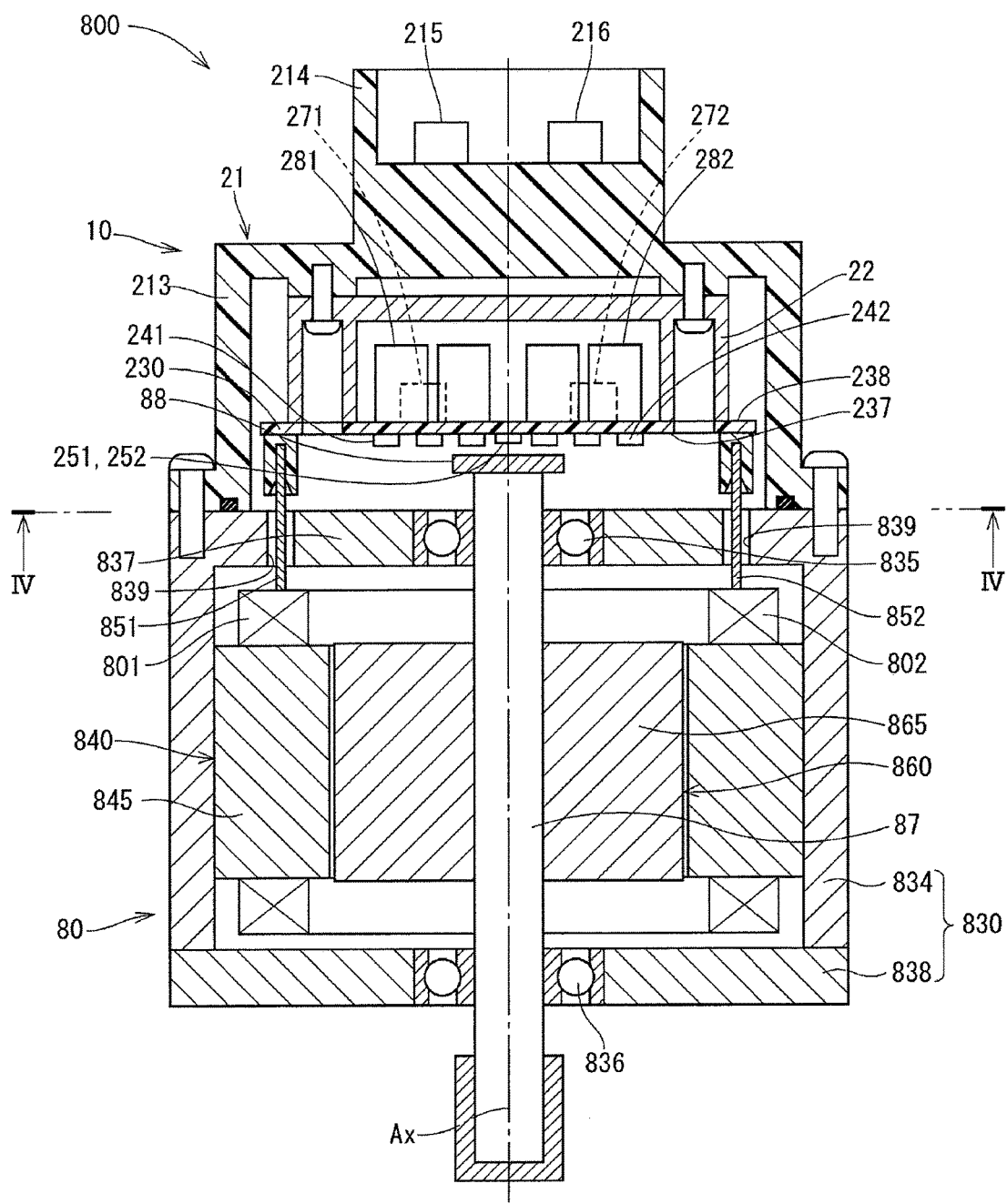
FIG. 3 is an axially sectional view of a dual-system mechatronically integrated motor.
Figure 4:
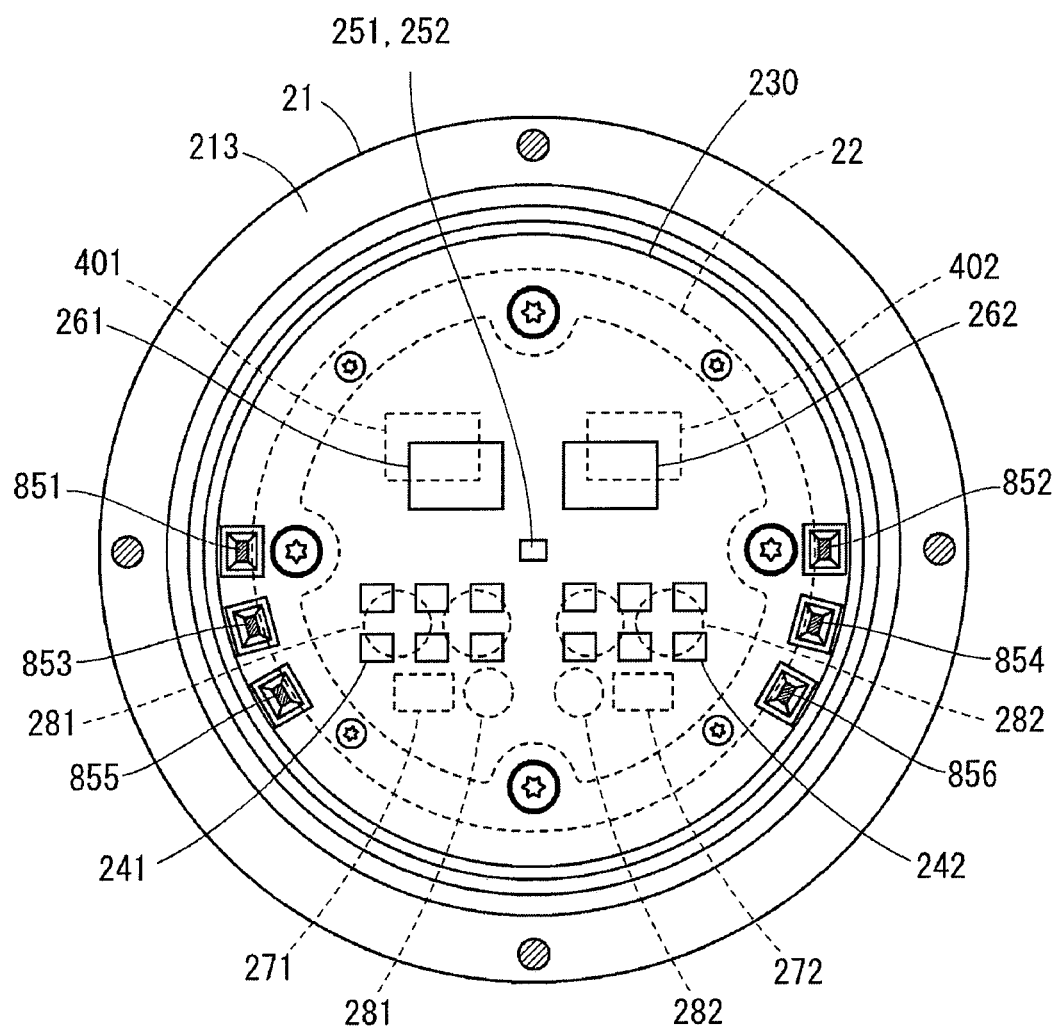
FIG. 4 is a sectional view taken along line IV-IV indicated in FIG. 3.

A configuration of a mechatronically integrated motor 800 including the motor 80 and the ECU 10 integrally provided at an axial end of the motor 80 will be described with reference to FIGS. 3 and 4. The ECU 10 according to the mode depicted in FIG. 3 is disposed opposite to an output end of the motor 80 to be coaxial with an axis Ax of a shaft 87. The ECU 10 according to another embodiment can be disposed at the output end of the motor 80 to be integral with the motor 80.

The motor 80 is a three-phase brushless motor, and includes a stator 840, a rotor 860, and a housing 830 accommodating the stator 840 and the rotor 860.

The stator 840 includes a stator core 845 fixed to the housing 830, and two three-phase coil sets 801 and 802 assembled to the stator core 845.

The first coil set 801 includes respective-phase coils having lead wires 851, 853, and 855 extending therefrom. The second coil set 802 includes respective-phase coils having lead wires 852, 854, and 856 extending therefrom.

The rotor 860 includes the shaft 87 supported by a rear bearing 835 and a front bearing 836, and a rotor core 865 into which the shaft 87 is fitted. The rotor 860 is provided inside the stator 840 and is rotatable relatively to the stator 840. The shaft 87 has an end provided with a permanent magnet 88.

The housing 830 includes a case 834 having a bottomed tubular shape and including a rear frame end 837, and a front frame end 838 provided at an end of the case 834. The case 834 and the front frame end 838 are fastened to each other by a bolt or the like. The lead wires 851, 852, and the like of the coil sets 801 and 802 extend toward the ECU 10 through a lead wire insertion hole 839 provided in the rear frame end 837 to be connected to a substrate 230.

The ECU 10 includes a cover 21, a heat sink 22 fixed to the cover 21, the substrate 230 fixed to the heat sink 22, and various electronic components mounted to the substrate 230. The cover 21 protects the electronic components from external impact, and prevents entry of dust, water, and the like into the ECU 10.

The cover 21 includes an external connector portion 214 with an external power feeder cable and an external signal cable, and a cover portion 213. The external connector portion 214 has power feed terminals 215 and 216 each connected to the substrate 230 via a path (not depicted).

The substrate 230 is exemplified by a printed circuit board, which is positioned to face the rear frame end 837 and is fixed to the heat sink 22. The substrate 230 is provided with the electronic components for the two systems independently from each other, to form fully redundant configurations. The present embodiment provides the single substrate 230, but another embodiment of the present disclosure may provide two or more substrates.

The substrate 230 has two principal surfaces including a motor surface 237 facing the rear frame end 837 and a cover surface 238 being opposite to the motor surface 237 and facing the heat sink 22.

The motor surface 237 is mounted with multiple switching elements 241 and 242, rotation angle sensors 251 and 252, custom ICs 261 and 262, and the like.

The multiple switching elements 241 and 242 according to the present embodiment include six switching elements for each of the systems, and configure three-phase upper and lower arms of motor drive circuits. The rotation angle sensors 251 and 252 are disposed to face the permanent magnet 88 provided at a distal end of the shaft 87. The custom ICs 261, 262 and the microcomputers 401, 402 have a control circuit of the ECU 10. The custom ICs 261 and 262 are provided with clock monitoring portions 661 and 662, and the like depicted in FIG. 7 and the like.

The cover surface 238 is mounted with the microcomputers 401 and 402, capacitors 281 and 282, inductors 271 and 272, and the like. The first microcomputer 401 and the second microcomputer 402 are particularly disposed, with a predetermined space provided therebetween, on the cover surface 238 as an identical surface of the identical substrate 230.

The capacitors 281 and 282 smooth electric power supplied from a power source and prevent noise outflow due to switching operation or the like of the switching elements 241 and 242. The inductors 271 and 272 and the capacitors 281 and 282 configure a filter circuit.

Figure 5:
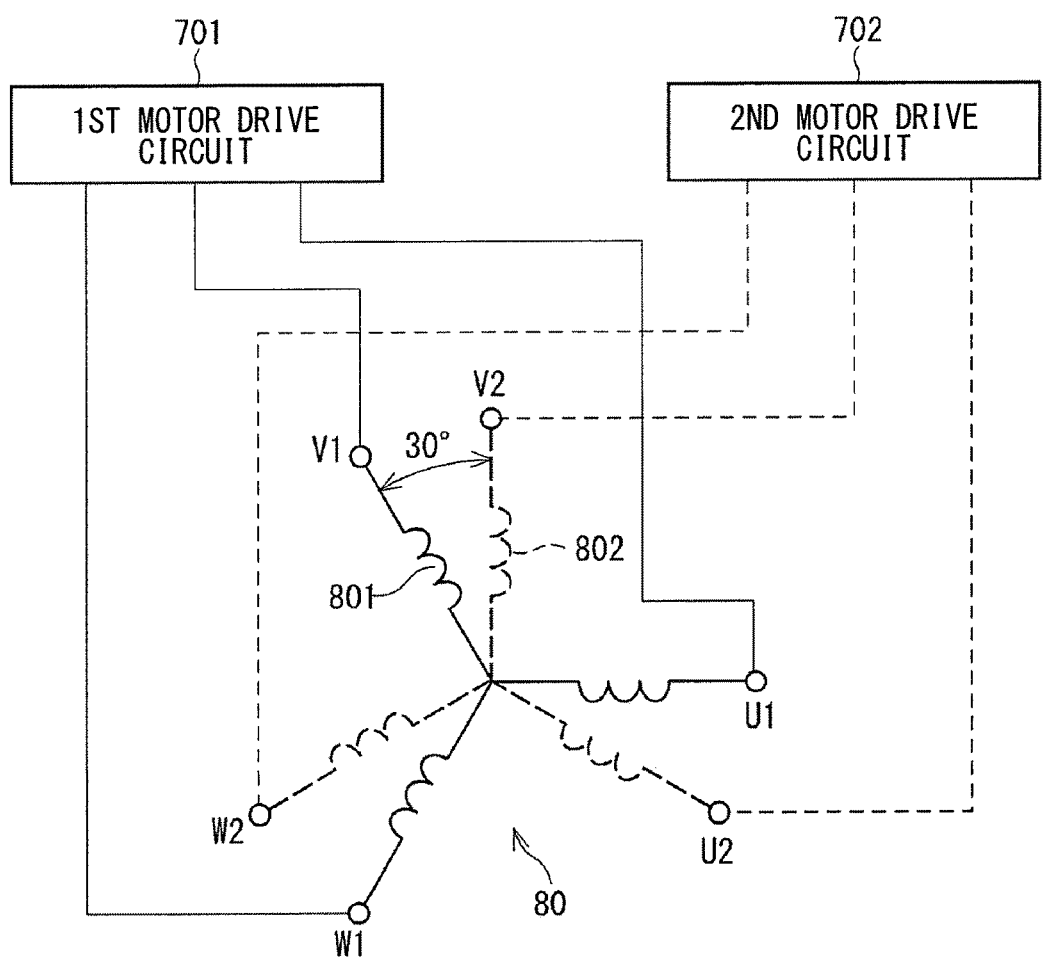
FIG. 5 is a schematic diagram depicting a configuration of a multiphase coaxial motor.
Figure 6:
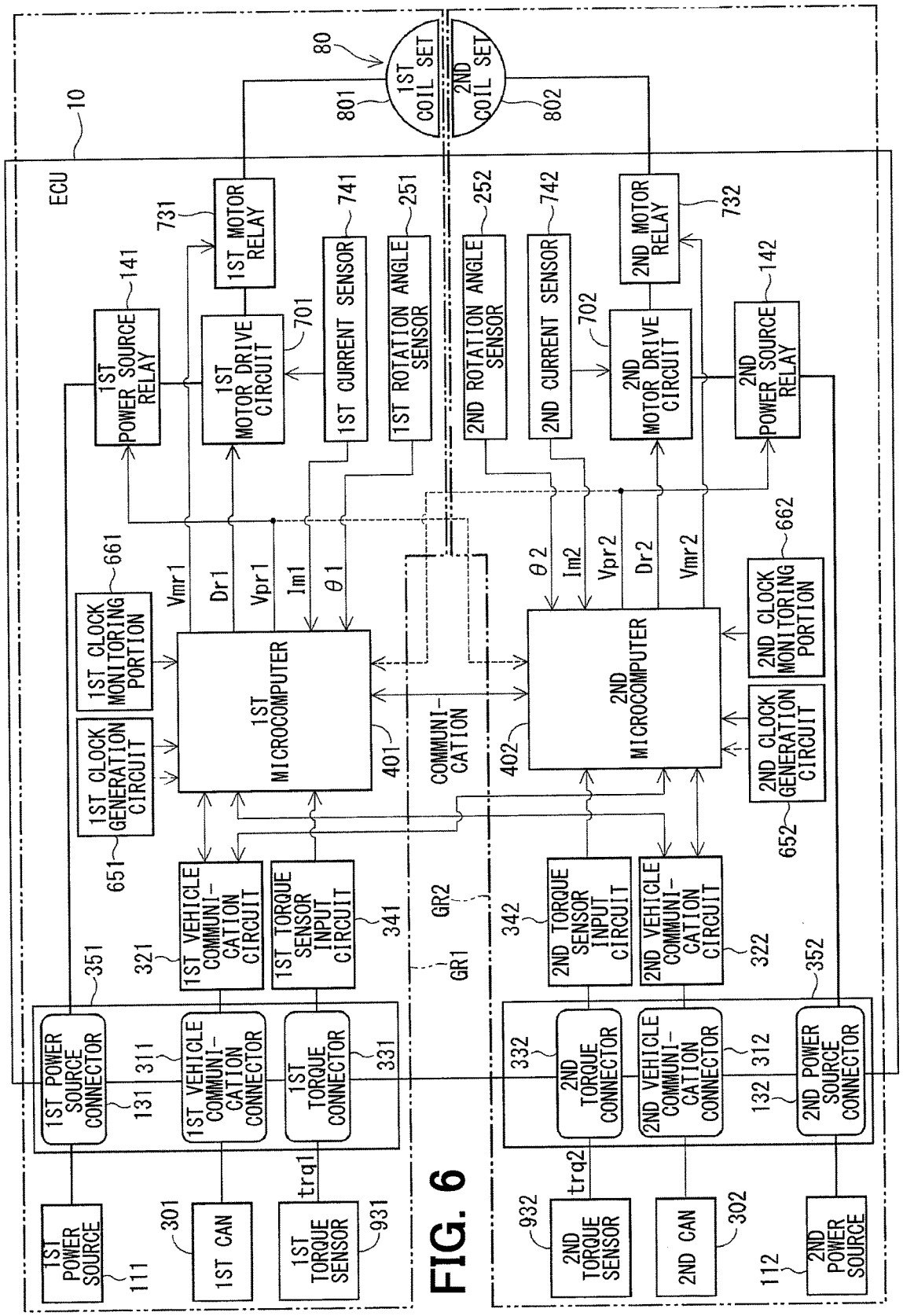
FIG. 6 is an entire configuration diagram of the ECU (a motor control apparatus) according to each embodiment.

As depicted in FIGS. 5 and 6, the motor 80 to be controlled by the ECU 10 is the three-phase brushless motor including the two three-phase coil sets 801 and 802 provided coaxially.

The coil sets 801 and 802 are equal in electrical characteristic, and are disposed at the common stator to be shifted by an electrical angle of 30 degrees, as described in JP 5672278 B2. The coil sets 801 and 802 are controlled to be provided with phase current having equal amplitude and phases shifted from each other by 30 degrees, for example.

FIG. 6 depicts the first coil set 801, as well as the first microcomputer 401, a motor drive circuit 701, and the like relevant to electrification control of the first coil set 801, which configure a first system GR1. FIG. 6 also depicts the second coil set 802, as well as the second microcomputer 402, a second motor drive circuit 702, and the like relevant to electrification control of the second coil set 802, which configure a second system GR2. The first system GR1 and the second system GR2 include two element groups completely independent from each other and form redundant configurations of so-called "full dual systems".

For distinction as necessary in the description, constituent elements or signals for the first system GR1 will have names beginning with "first", whereas constituent elements or signals for the second system GR2 will have names beginning with "second". Common matters between these systems will be described collectively without adding "first" or "second". The constituent elements or the signals for the first system will each have "1" at the end of the reference sign, whereas the constituent elements or the signals for the second system will each have "2" at the end of the reference sign.

Hereinafter, one of the systems including a constituent element will be called the "own system", and the remaining one of the systems will be called the "other system". Similarly, in the microcomputers 401 and 402 for the two systems, the microcomputer in the own system will be called the "own microcomputer" whereas the microcomputer in the other system will be called the "other microcomputer".

The ECU 10 has a first connector portion 351 including a first power source connector 131, a first vehicle communication connector 311, and a first torque connector 331. The ECU 10 further has a second connector portion 352 including a second power source connector 132, a second vehicle communication connector 312, and a second torque connector 332. Each of the connector portions 351 and 352 can be provided as a single connector, or can include multiple divided connectors.

The first power source connector 131 is connected to a first power source 111. The first power source 111 supplies electric power to the first coil set 801 via the power source connector 131, a power source relay 141, the first motor drive circuit 701, and a motor relay 731. The first power source 111 also supplies electric power to the first microcomputer 401 and sensors in the first system GR1.

The second power source connector 132 is connected to a second power source 112. The second power source 112 supplies electric power to the second coil set 802 via the power source connector 132, a power source relay 142, the second motor drive circuit 702, and a motor relay 732.

In a case where the power sources are not provided redundantly, the power source connectors 131 and 132 of the two systems can be connected to a common power source.

In a case where CANs are provided redundantly as vehicle communication networks, the first vehicle communication connector 311 is connected between a first CAN 301 and a first vehicle communication circuit 321, and the second vehicle communication connector 312 is connected between a second CAN 302 and a second vehicle communication circuit 322.

In another case where the CANs are not provided redundantly, the vehicle communication connectors 311 and 312 of the two systems can be connected to the common CAN 30. There can be provided, other than the CAN, a vehicle communication network of any standard, such as a CAN with flexible data rate (CAN-FD) or a FlexRay.

Each of the vehicle communication circuits 321 and 322 bidirectionally communicates with the microcomputers 401 and 402 in the own and other systems.

The first torque connector 331 is connected between the first torque sensor 931 and a first torque sensor input circuit 341. The first torque sensor input circuit 341 notifies the first microcomputer 401 of the steering torque trq1 detected by the first torque connector 331.

The second torque connector 332 is connected between the second torque sensor 932 and a second torque sensor input circuit 342. The second torque sensor input circuit 342 notifies the second microcomputer 402 of the steering torque trq2 detected by the second torque connector 332.

The microcomputers 401 and 402 each execute various processing including software processing of causing a CPU to execute a program preliminarily stored in a substantive memory device such as a ROM, and hardware processing executed by a dedicated electronic circuit.

The microcomputers 401 and 402 operate in accordance with reference clocks generated by clock generation circuits 651 and 652, respectively. The clock monitoring portions 661 and 662 monitor the reference clocks generated by the clock generation circuits 651 and 652, respectively. Generation and monitoring of the reference clocks will be described in detail later.

The first microcomputer 401 generates a motor drive signal Dr1 for operation of the switching elements 241 of the first motor drive circuit 701, and commands the first motor drive circuit 701 by means of the motor drive signal Dr1. The first microcomputer 401 generates a first power source relay drive signal Vpr1 and a first motor relay drive signal Vmr1.

The second microcomputer 402 generates a motor drive signal Dr2 for operation of the switching elements 242 of the second motor drive circuit 702, and commands the second motor drive circuit 702 by means of the motor drive signal Dr2. The second microcomputer 402 generates a second power source relay drive signal Vpr2 and a second motor relay drive signal Vmr2.

The power source relay drive signal Vpr1 or Vpr2 generated by the microcomputer 401 or 402 is transmitted as a command to the power source relay 141 or 142 of the own system, and is also transmitted for notification to the other microcomputer.

The microcomputers 401 and 402 are configured to execute communication between the microcomputers to mutually transmit and receive information. The microcomputers 401 and 402 execute the communication between the microcomputers to mutually transmit and receive a current detection value, a current command value, and the like, to cause the first system GR1 and the second system GR2 to drive the motor 80 in cooperation with each other. The communication between the microcomputers has communication frames including the current detection value and the like. The communication frames may further include the current command value, a current limiting value, an update counter, a status signal, a CRC signal functioning as an error detection value signal, a check sum signal, or the like. The present embodiment is applicable regardless of contents of the communication between the microcomputers. Different information can be transmitted and received as necessary, or the data exemplified above can be excluded partially or entirely.

In a case where each of the microcomputers receives the power source relay drive signal Vpr1 or Vpr2 from the other microcomputer but does not receive any signal from the other microcomputer by means of the communication between the microcomputers, the other microcomputer is determined as being normal and the communication between the microcomputers is determined as being abnormal.

In another case where each of the microcomputers does not receive the power source relay drive signal Vpr1 or Vpr2 from the other microcomputer and does not receive any signal from the other microcomputer by means of the communication between the microcomputers, the other microcomputer is determined as being abnormal.

The first motor drive circuit 701 is a three-phase inverter including the multiple switching elements 241, and converts electric power to be supplied to the first coil set 801. The switching elements 241 of the first motor drive circuit 701 are controlled to be turned ON and OFF in accordance with the motor drive signal Dr1 outputted from the first microcomputer 401.

The second motor drive circuit 702 is a three-phase inverter including the multiple switching elements 242, and converts electric power to be supplied to the second coil set 802. The switching elements 242 of the second motor drive circuit 702 are controlled to be turned ON and OFF in accordance with the motor drive signal Dr2 outputted from the second microcomputer 402.

The first power source relay 141 is provided between the first power source connector 131 and the first motor drive circuit 701, and is controlled in accordance with the first power source relay drive signal Vpr1 from the first microcomputer 401. In a case where the first power source relay 141 is ON, electrification is permitted between the first power source 111 and the first motor drive circuit 701. In another case where the first power source relay 141 is OFF, electrification is blocked between the first power source 111 and the first motor drive circuit 701.

The second power source relay 142 is provided between the second power source connector 132 and the second motor drive circuit 702, and is controlled in accordance with the second power source relay drive signal Vpr2 from the second microcomputer 402. In a case where the second power source relay 142 is ON, electrification is permitted between the second power source 112 and the second motor drive circuit 702. In another case where the second power source relay 142 is OFF, electrification is blocked between the second power source 112 and the second motor drive circuit 702.

Each of the power source relays 141 and 142 according to the present embodiment is a semiconductor relay such as a MOSFET. If each of the power source relays 141 and 142 has a parasitic diode as in the MOSFET, it is desired to provide a reverse connection protective relay (not depicted) that is connected in series to the power source relays 141 and 142 to allow the parasitic diodes to be directed reversely to each other. The power sources relays 141 and 142 can be mechanical relays.

The first motor relay 731 is provided on an each-phase power path between the first motor drive circuit 701 and the first coil set 801, and is controlled in accordance with the first motor relay drive signal Vmr1 from the first microcomputer 401. In a case where the first motor relay 731 is ON, electrification is permitted between the first motor drive circuit 701 and the first coil set 801. In another case where the first motor relay 731 is OFF, electrification is blocked between the first motor drive circuit 701 and the first coil set 801.

The second motor relay 732 is provided on an each-phase power path between the second motor drive circuit 702 and the second coil set 802, and is controlled in accordance with the second motor relay drive signal Vmr2 from the second microcomputer 402. In a case where the second motor relay 732 is ON, electrification is permitted between the second motor drive circuit 702 and the second coil set 802. In another case where the second motor relay 732 is OFF, electrification is blocked between the second motor drive circuit 702 and the second coil set 802.

There is provided a first current sensor 741 that detects current Im1 flowing to each phase of the first coil set 801 and transmits the detected current Im1 to the first microcomputer 401. There is provided a second current sensor 742 that detects current Im2 flowing to each phase of the second coil set 802 and transmits the detected current Im2 to the second microcomputer 402.

In a case where the rotation angle sensors 251 and 252 are provided redundantly, the first rotation angle sensor 251 detects the electrical angle θ1 of the motor 80 and transmits the detected electrical angle θ1 to the first microcomputer 401. The second rotation angle sensor 252 detects the electrical angle θ2 of the motor 80 and transmits the detected electrical angle θ2 to the second microcomputer 402.

In another case where the rotation angle sensors are not provided redundantly, the electrical angle θ2 of the second system can be calculated in accordance with an equation "θ2=θ1+30 degrees" from the electrical angle θ1 of the first system detected by the first rotation angle sensor 251.

(Configuration of ECU)

The ECU according to each embodiment will be described below in terms of the configuration and the functional effect thereof. FIG. 6 depicts the two redundant systems including configurations not to be described where appropriate. The ECU according to each embodiment will be denoted by a reference sign of a three-digit number including "10" followed by the ordinal number of the embodiment.

First Embodiment

The first embodiment will be described with reference to FIGS. 7 to 18.

Figure 7:
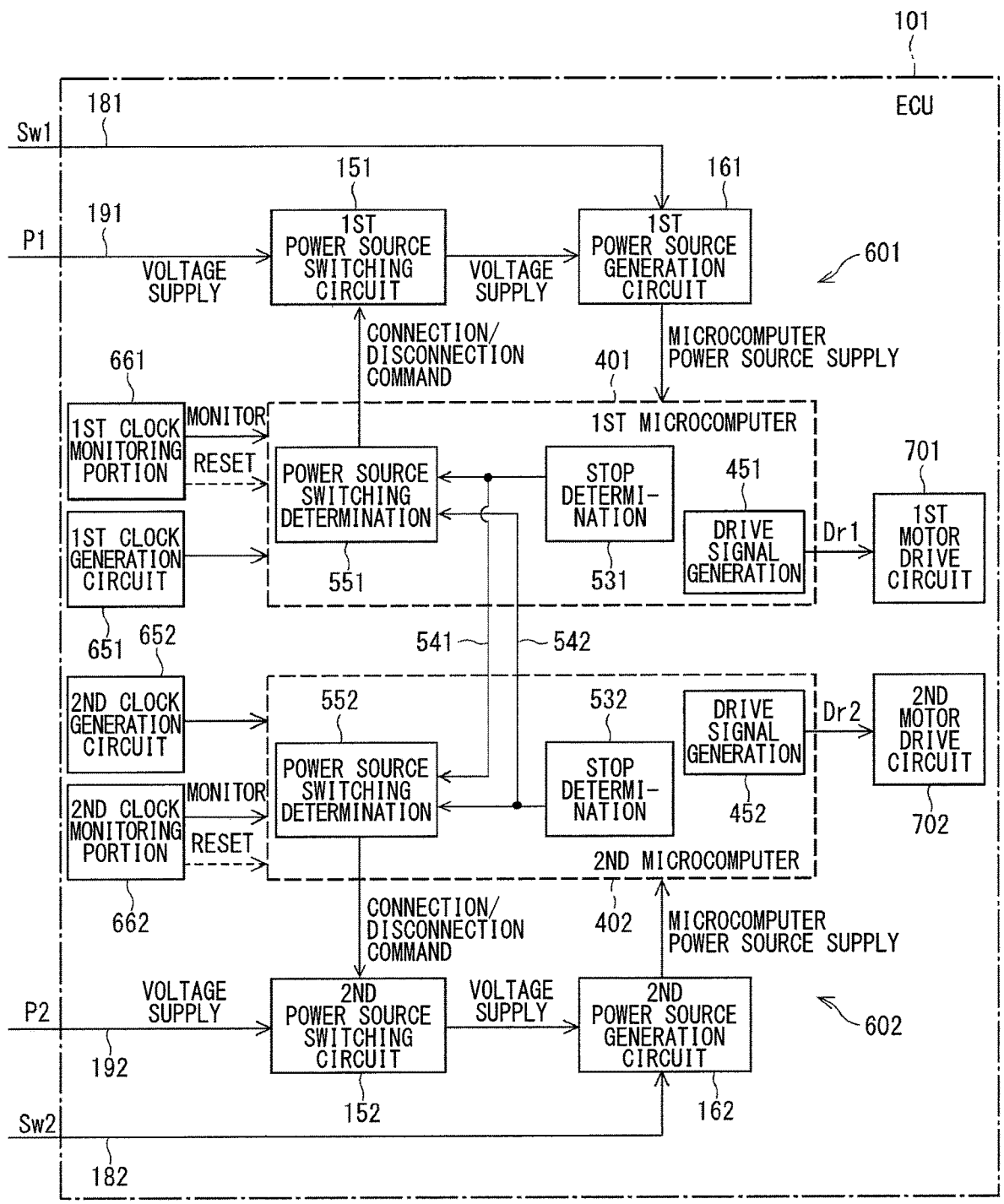
FIG. 7 is a configuration diagram of an ECU (a motor control apparatus) according to a first embodiment.

FIG. 7 depicts an ECU 101 including a first system controller 601 that controls electrification to the first coil set 801, and a second system controller 602 that controls electrification to the second coil set 802.

The controllers 601 and 602 of the respective systems include power source switching circuits 151 and 152, power source generation circuits 161 and 162, the clock generation circuits 651 and 652, the clock monitoring portions 661 and 662, the microcomputers 401 and 402, and the motor drive circuits 701 and 702, respectively. In other words, a "system" corresponds to a unit of constituent elements including the power source switching circuit, the power source generation circuit, the clock generation circuit, the microcomputer, and the motor drive circuit provided in association with one another.

The power source switching circuits 151 and 152 are provided at intermediate portions of power source paths 191 and 192, respectively. The power source switching circuits 151 and 152 are each configured by a MOSFET or the like, and are connected or disconnected in accordance with commands from power source switching determiners 551 and 552 included in the microcomputers 401 and 402, respectively.

The power source generation circuits 161 and 162 receive vehicle switch signals Sw1 and Sw2 via vehicle switch signal paths 181 and 182, respectively. Examples of the vehicle switch signals include an ignition ON/OFF signal for an engine vehicle and a ready ON/OFF signal for a hybrid vehicle. The microcomputers 401 and 402 each recognize whether or not the corresponding power source generation circuit 161 or 162 has received the vehicle switch signal Sw1 or Sw2.

When the power source switching circuits 151 and 152 are connected, power source voltage P1 and P2 is supplied to the power source generation circuits 161 and 162, respectively. The power source generation circuits 161 and 162 generate microcomputer power sources for operation of the microcomputers 401 and 402 with use of the power source voltage P1 and P2 thus supplied, respectively.

The first clock generation circuit 651 and the second clock generation circuit 652 independently generate reference clocks as operation reference of the first microcomputer 401 and the second microcomputer 402, respectively.

The first clock monitoring portion 661 monitors the reference clock generated by the first clock generation circuit 651 and transmitted to the first microcomputer 401. The second clock monitoring portion 662 monitors the reference clock generated by the second clock generation circuit 652 and transmitted to the second microcomputer 402. The clock monitoring portion 661 or 662 transmits a reset signal (denoted by "RESET" in the figure) to the microcomputer 401 or 402 upon detection of abnormality of the reference clock.

The microcomputers 401 and 402 receive vehicle information transmitted via the CANs 301 and 302, information such as the steering torque trq1 and the steering torque trq2, the phase current Im1 and the phase current Im2, and the electrical angles θ1 and θ2, which are transmitted from the corresponding sensors, respectively. The microcomputers 401 and 402 generate the motor drive signals Dr1 and Dr2 through control arithmetic according to the various received information, and transmit the motor drive signals Dr1 and Dr2 to the motor drive circuits 701 and 702, respectively. The control arithmetic is executed at timing determined by the clock generated by each of the clock generation circuits 651 and 652.

The motor drive circuits 701 and 702 electrify the coil sets 801 and 802 in accordance with the motor drive signals Dr1 and Dr2 transmitted as commands from the microcomputers 401 and 402, respectively. Each of the motor drive circuits 701 and 702 is typically exemplified by a power converter circuit including multiple switching elements such as MOSFETs having bridge connection. The motor drive signals Dr1 and Dr2 are switching signals for turning ON or OFF the switching elements. In the present embodiment exemplifying driving the three-phase brushless motor, the motor drive circuits 701 and 702 are three-phase inverters.

The microcomputers 401 and 402 include drive signal generators 451 and 452, stop determiners 531 and 532, and the power source switching determiners 551 and 552, respectively.

Each of the microcomputers 401 and 402 independently includes a ROM that stores a control program and fixed values such as parameters, a RAM that temporarily stores an arithmetic processing result, and the like, and is not configured to refer to the ROM or the RAM in the other microcomputer. On this assumption, the microcomputers 401 and 402 are provided therebetween with signal lines 541 and 542.

The drive signal generators 451 and 452 compare the PWM carrier wave with a DUTY ratio of a voltage command signal or the like to generate the motor drive signals Dr1 and Dr2 as PWM signals, and transmit the motor drive signals Dr1 and Dr2 as commands to the motor drive circuits 701 and 702, respectively.

The stop determiners 531 and 532 determine that "operation of the own microcomputer is about to be stopped" in accordance with voltage reduction of the vehicle switch signals Sw1 and Sw2 received by the power source generation circuits 161 and 162, respectively. The stop determiners 531 and 532 each determine not a state where operation of the own microcomputer has already stopped but a state where forthcoming operation stop is expected.

The stop determiners 531 and 532 notify the power source switching determiners 551 and 552 each installed in the own microcomputer of such information as a stop determination signal, and transmit the signal to the other microcomputer via the signal lines 541 and 542, respectively.

Specifically, the stop determination signal from the stop determiner 531 of the first microcomputer 401 is transmitted to the power source switching determiner 551 of the first microcomputer 401, and is also transmitted to the power source switching determiner 552 of the second microcomputer 402 via the signal line 541. The stop determination signal from the stop determiner 532 of the second microcomputer 402 is transmitted to the power source switching determiner 552 of the second microcomputer 402, and is also transmitted to the power source switching determiner 551 of the first microcomputer 401 via the signal line 542.

The signal lines 541 and 542 can each be used in common with a signal line for a different purpose or can be provided dedicatedly. The stop determination signal is transmitted or received by means of serial communication between the microcomputers that exchange information on current and the like. The stop determination signal is alternatively transmitted or received not via the signal line but by means of a microcomputer port output level.

The power source switching determiners 551 and 552 each output a command for connection or disconnection to the corresponding power source generation circuit 161 or 162. In a normally opened configuration in which the power source generation circuits 161 and 162 each have an initial value of a disconnected state, no connection command output is regarded as disconnection command output. In a normally closed configuration in which the power source generation circuits 161 and 162 each have an initial value of a connected state, no disconnection command output is regarded as connection command output.

In the first embodiment, the power source switching determiners 551 and 552 of both the first microcomputer 401 and the second microcomputer 402 are each notified of the stop determination signal from the own microcomputer and also receives the stop determination signal from the other microcomputer. The power source switching determiners 551 and 552 each output a disconnection command to the corresponding power source switching circuit 151 or 152 in accordance with the stop determination signal from the own microcomputer and the stop determination signal received from the other microcomputer. Each of the power source generation circuits 161 and 162 accordingly stops generating a microcomputer power source to actually stop operation of the own microcomputer. Specifically, the power source switching determiners 551 and 552 each output the disconnection command to the corresponding power source switching circuit 151 or 152 to actually stop operation of the own microcomputer.

Before operation of the ECU 101 according to the first embodiment is described, operation of an ECU according to a comparative example will be described next with reference to FIGS. 8 to 14 for comprehension of a difficulty to be solved by this embodiment. FIGS. 8 to 13 do not depict the drive signal generators 451 and 452 in the microcomputers 401 and 402. These figures include frames of blocks and arrows between the blocks, some of which are drawn by thin lines or thin broken lines and indicate an OFF state, and others of which are drawn by bold lines and indicate an ON state.

The comparative example provides an ECU 109 including the microcomputers 401 and 402 that are not provided therebetween with the signal lines 541 and 542 unlike the ECU 101 according to the first embodiment, and each of the microcomputers 401 and 402 independently stops operation thereof only in accordance with the stop determination signal from the own microcomputer.

FIGS. 8 to 13 depict an exemplary configuration including the individual power sources 111 and 112 as a power source system that supplies an operation power source of the ECU 109.

The first power source 111 is connected to the first power source generation circuit 161 via the first vehicle switch signal path 181 provided with a first vehicle switch 121. When the first vehicle switch 121 is turned ON, the first power source generation circuit 161 receives the first vehicle switch signal Sw1.

The first power source 111 is also connected to the first power source switching circuit 151 via the first power source path 191 branching from the first vehicle switch signal path 181 at a position before the first vehicle switch 121. The first power source switching circuit 151 has an input end constantly supplied with the first power source voltage P1.

Similarly, the second power source 112 is connected to the second power source generation circuit 162 via the second vehicle switch signal path 182 provided with a second vehicle switch 122. The second vehicle switch 122 receives an ON/OFF signal SS from the first vehicle switch 121 and is turned ON/OFF along with the first vehicle switch 121. When the second vehicle switch 122 is turned ON, the second power source generation circuit 162 receives the second vehicle switch signal Sw2.

The second power source 112 is also connected to the second power source switching circuit 152 via the second power source path 192 branching from the second vehicle switch signal path 182 at a position before the second vehicle switch 122. The second power source switching circuit 152 has an input end constantly supplied with the second power source voltage P2.

The power source system is not limited to this exemplary configuration. For example, the first vehicle switch 121 and the second vehicle switch 122 can be connected parallel to a single common power source, and the power source paths 191 and 192 can branch from the vehicle switch signal paths 181 and 182 at positions before the vehicle switches 121 and 122, respectively.

Provision of the individual power sources 111 and 112 can cause difference in voltage itself between the power sources 111 and 112. The microcomputers 401 and 402 can have difference in recognized voltage due to wiring resistance, variation in A/D conversion characteristic of a voltage detection circuit, or the like, even when the single common power source is provided. Such influence of voltage difference will be described later.

Operation 1 According to Comparative Example

Figure 8:
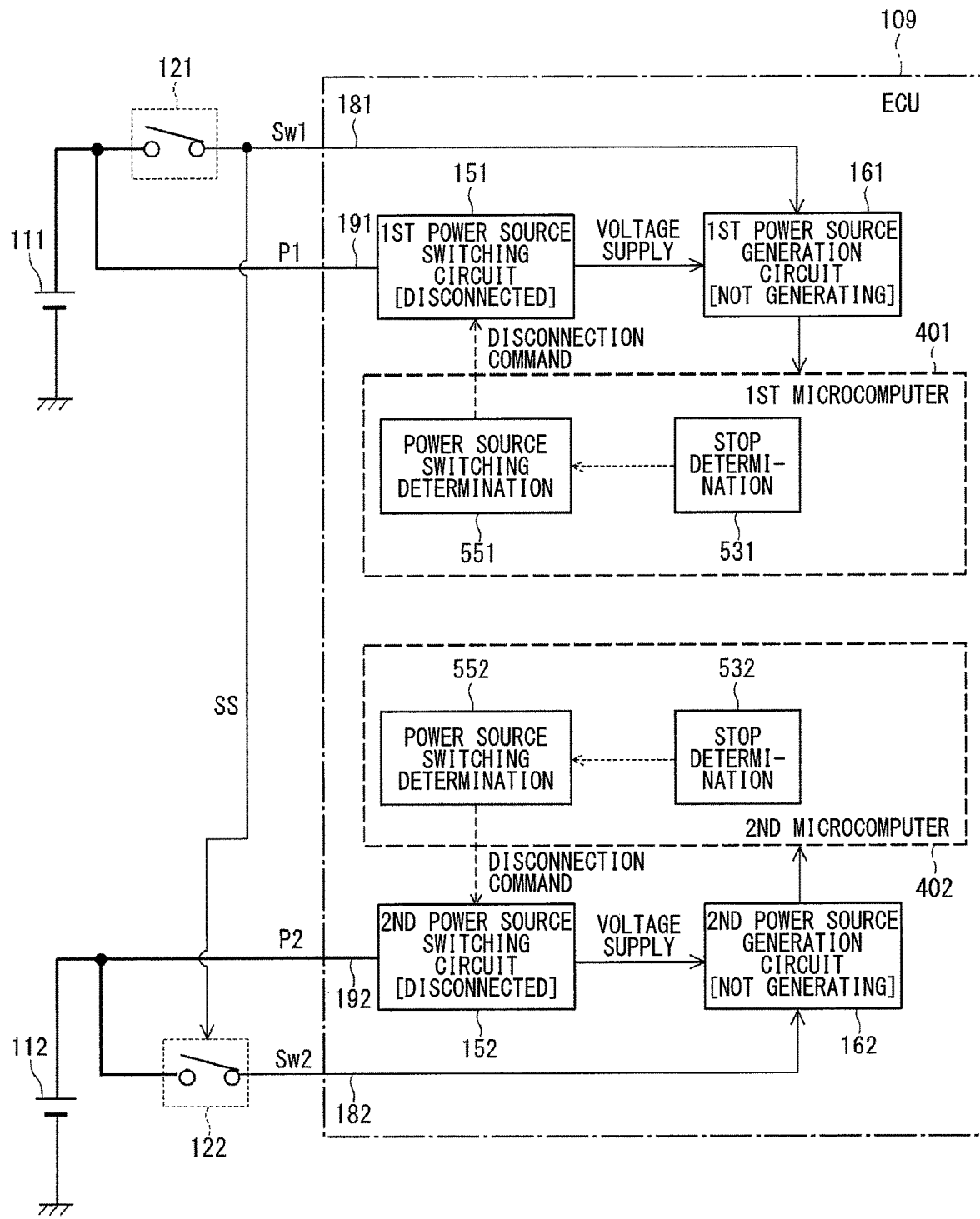
FIG. 8 is an explanatory diagram of operation 1 according to a comparative example.

Reference is made to FIG. 8. The first vehicle switch 121 and the second vehicle switch 122 are initially OFF. The vehicle switch signals Sw1 and Sw2 are not inputted to the power source generation circuits 161 and 162 in this case.

The power source switching determiners 551 and 552 are each assumed to output a disconnection command as an initial value to the corresponding power source generation circuit 161 or 162. The power source switching circuits 151 and 152 each have the connected/disconnected state indicated as [connected] or [disconnected] in each block in the figure.

When the power source switching circuits 151 and 152 are disconnected, the power source generation circuits 161 and 162 are not supplied with the power source voltage P1 and P2 and thus do not generate microcomputer power sources. Each of the power source generation circuits 161 and 162 in blocks of the figure is indicated as [generating] in the state of generating a microcomputer power source, or as [not generating] in the state of generating no microcomputer power source.

In the case where the power source switching determiners 551 and 552 are each configured to output a connection command as an initial value to the corresponding power source generation circuit 161 or 162, operation 2 and operation 3 to be described next are achieved once.

Operation 2 According to Comparative Example

Figure 9:
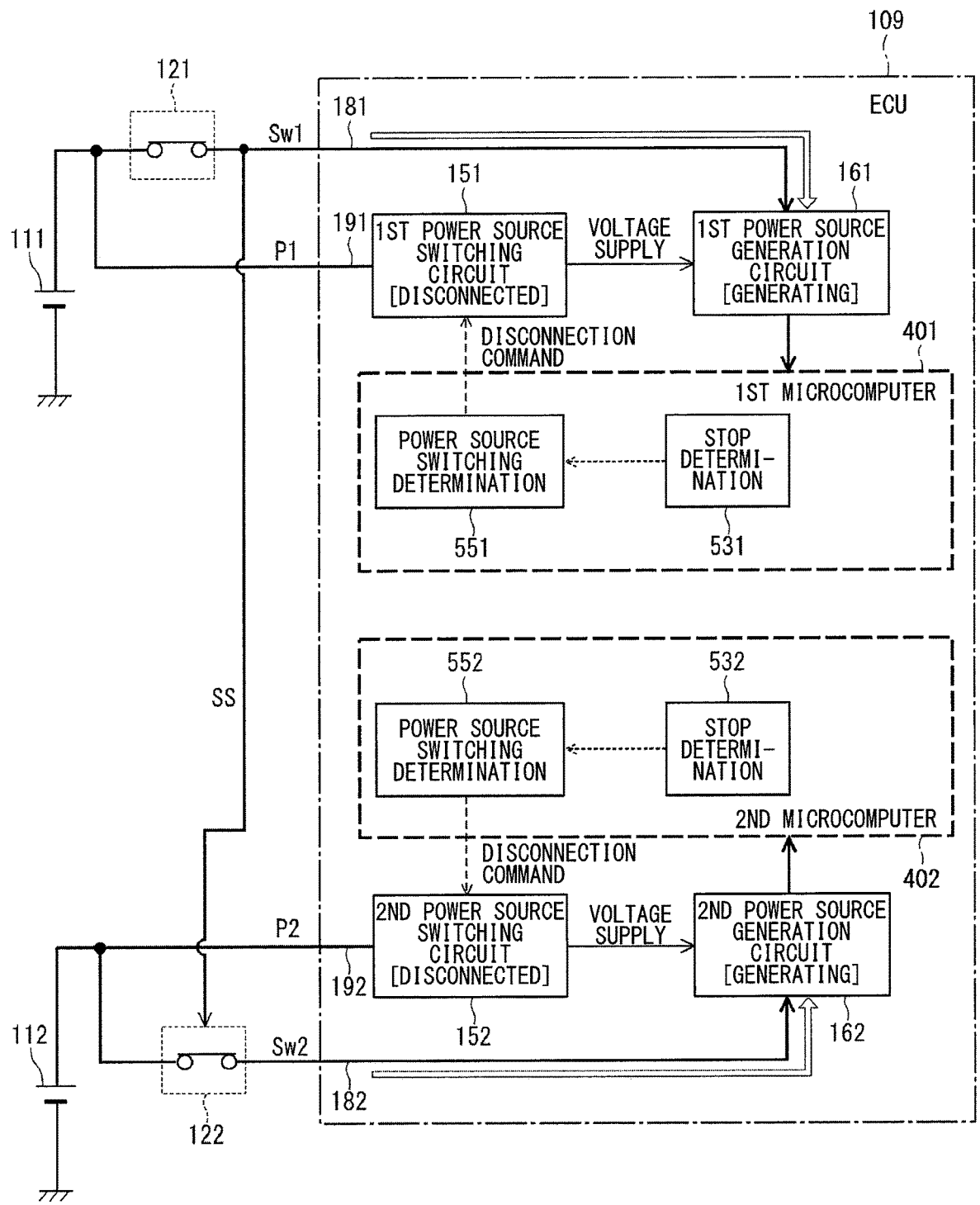
FIG. 9 is an explanatory diagram of operation 2 according to the comparative example.

Reference is made to FIG. 9. When the first vehicle switch 121 is turned ON, the first power source generation circuit 161 receives the first vehicle switch signal Sw1. The second vehicle switch 122 is turned ON along with the first vehicle switch 121, and the second power source generation circuit 162 receives the second vehicle switch signal Sw2.

Assume that input of the vehicle switch signals Sw1 and Sw2 to the power source generation circuits 161 and 162 achieves only signal communication with no supply of power source voltage.

Operation 3 According to Comparative Example

Figure 10:
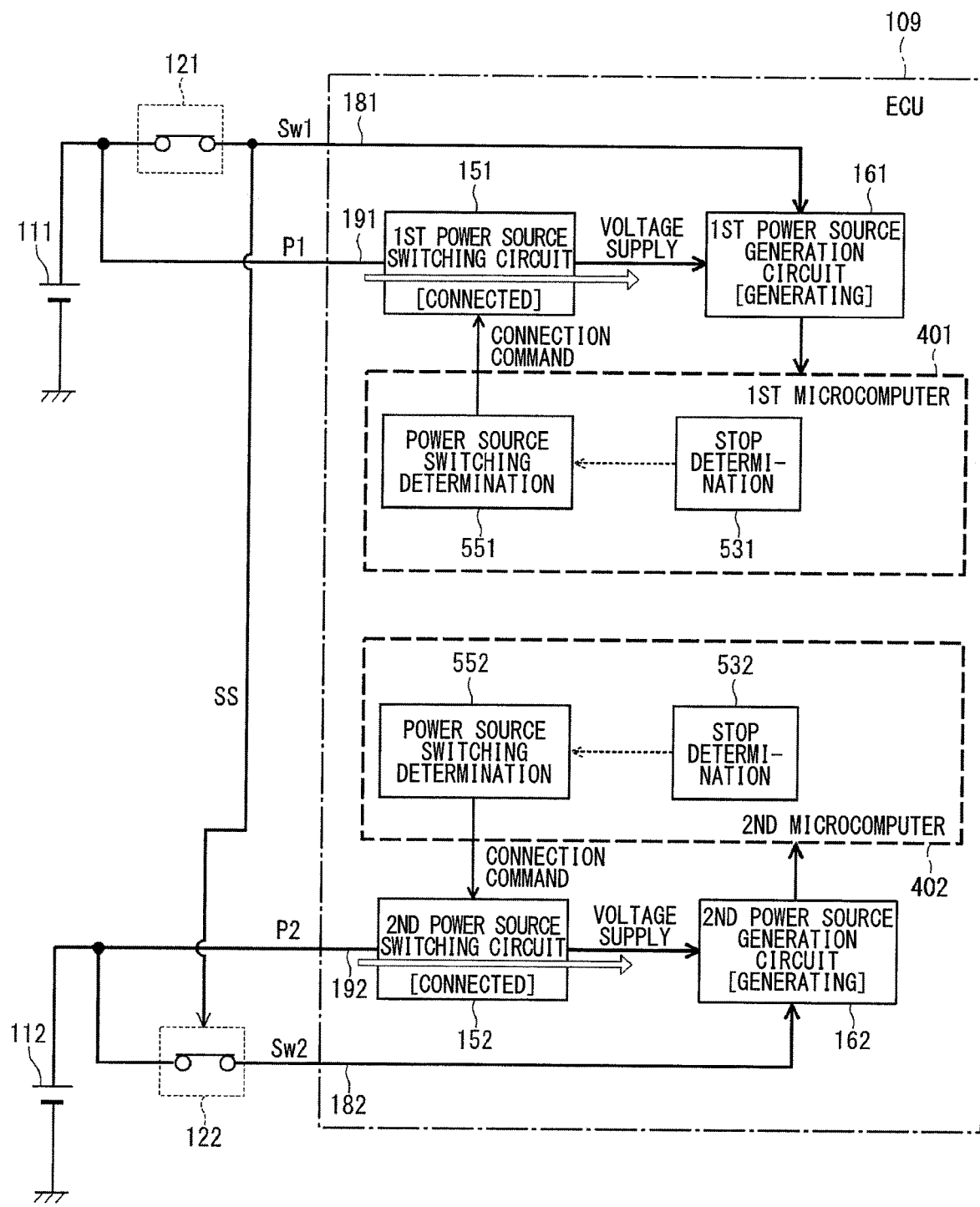
FIG. 10 is an explanatory diagram of operation 3 according to the comparative example.

Reference is made to FIG. 10. When the microcomputers 401 and 402 detect input of the vehicle switch signals Sw1 and Sw2 to the power source generation circuits 161 and 162 in the operation 2, the power source switching determiners 551 and 552 thereafter output connection commands to the power source switching circuits 151 and 152 at appropriate timing, respectively.

The power source voltage P1 and P2 is thus supplied to the power source generation circuits 161 and 162 via the power source switching circuits 151 and 152 as indicated by block arrows, respectively. The power source generation circuits 161 and 162 generate microcomputer power sources with use of the power source voltage P1 and P2 thus supplied, to boot the microcomputers 401 and 402, respectively.

Alternatively, voltage of the power sources 111 and 112 can be supplied to the power source generation circuits 161 and 162 via the vehicle switch signal paths 181 and 182 upon input of the vehicle switch signals Sw1 and Sw2, respectively.

In this case, the power source voltage is supplied to the power source generation circuits 161 and 162 during the operation 2, as indicated by block arrows in FIG. 9. The power source generation circuits 161 and 162 generate microcomputer power sources to boot the microcomputers 401 and 402, respectively. During the operation 3, the power source generation circuits 161 and 162 are supplied with the power source voltage via the vehicle switch signal paths 181 and 182 as well as the power source paths 191 and 192, respectively. FIG. 9 indicates as [generating] in the blocks of the power source generation circuits 161 and 162, assuming this case.

Operation 4 According to Comparative Example

Figure 11:
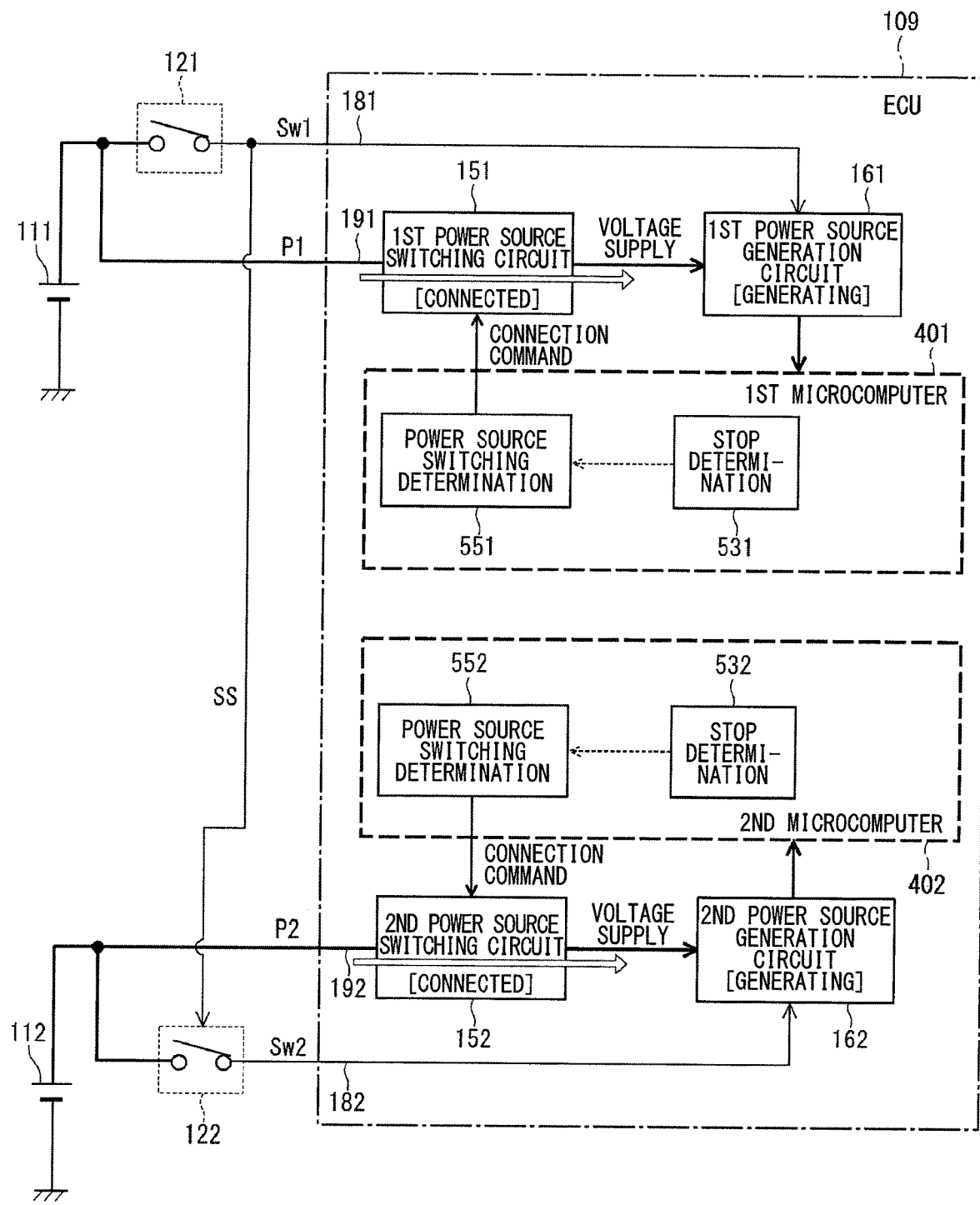
FIG. 11 is an explanatory diagram of operation 4 according to the comparative example.

Reference is made to FIG. 11. When the first vehicle switch 121 is turned OFF, the second vehicle switch 122 is also turned OFF. This stops input of the vehicle switch signals Sw1 and Sw2 to the power source generation circuits 161 and 162, respectively. The power source switching circuits 151 and 152 are connected, so that the power source voltage P1 and P2 keeps being supplied to the power source generation circuits 161 and 162 via the power source switching circuits 151 and 152 as indicated by block arrows, respectively.

Operation 5a According to Comparative Example

Figure 12:
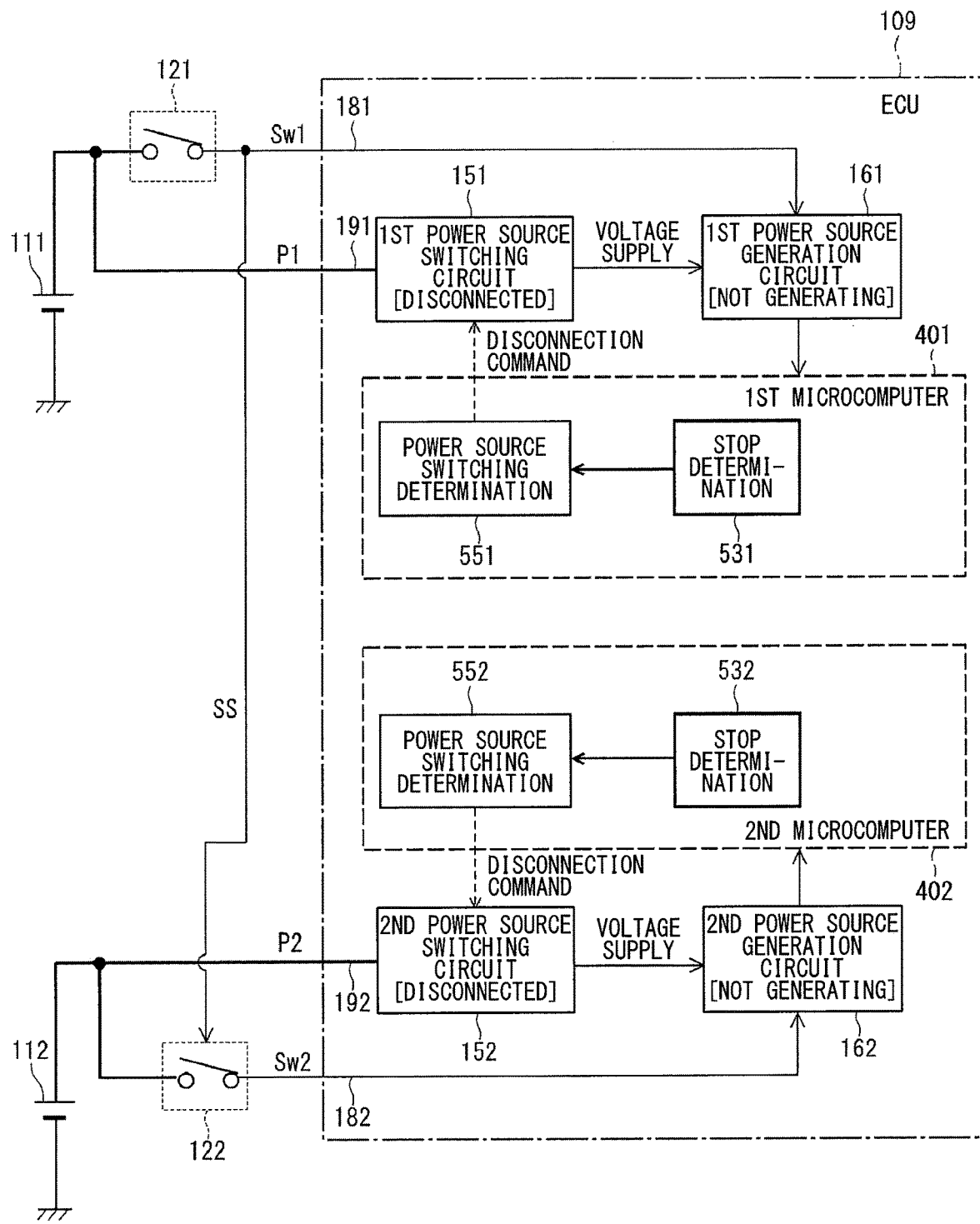
FIG. 12 is an explanatory diagram of operation 5A according to the comparative example.

Reference is made to FIG. 12. Upon input stop of the vehicle switch signals Sw1 and Sw2, the stop determiners 531 and 532 of the microcomputers 401 and 402 transmit the stop determination signals for notification to the power source switching determiners 551 and 552 of the own microcomputers, respectively. The power source switching determiner 551 and 552 then output disconnection commands to the power source switching circuit 151 and 152, respectively. Supply of the power source voltage P1 and P2 to the power source generation circuits 161 and 162 is then blocked to stop generation of microcomputer power sources and stop operation of the microcomputers 401 and 402, respectively.

Assuming that the multiple microcomputers 401 and 402 have ideally matched stop determination timing and ideally matched power source switching determination timing, the microcomputers 401 and 402 will stop operation simultaneously.

If the microcomputers 401 and 402 have stop determination or power source switching determination unmatched at certain timing, the following difficulty will arise.

Operation 5B According to Comparative Example

Figure 13:
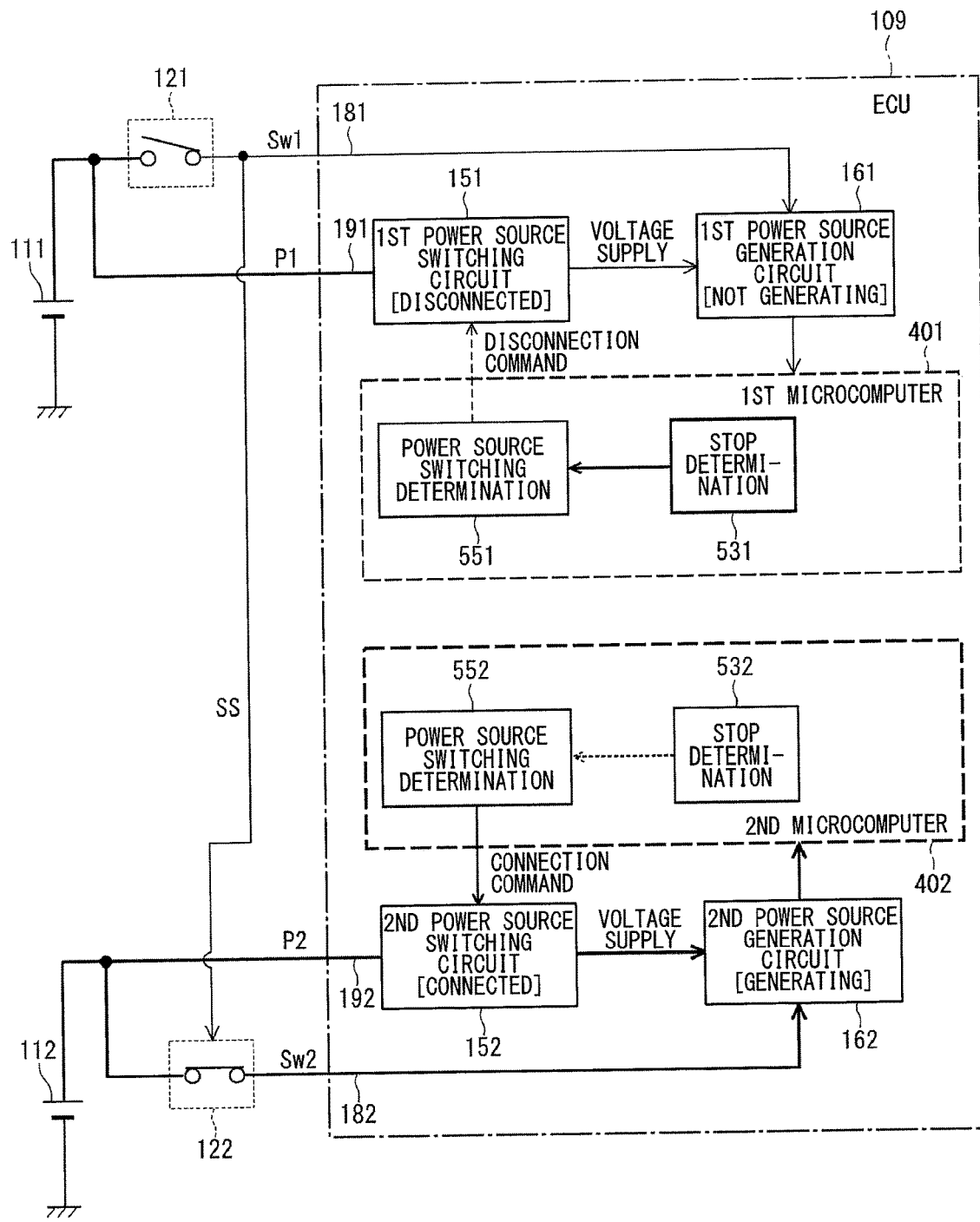
FIG. 13 is an explanatory diagram of operation 5B according to the comparative example.

Reference is made to FIG. 13. Assume a format that the first microcomputer 401 detects voltage reduction of the first vehicle switch signal Sw1 and executes stop determination and the second microcomputer 402 detects voltage reduction of the second vehicle switch signal Sw2 and executes stop determination. Voltage difference between the vehicle switch signals Sw1 and Sw2 may cause difference in determination result between the microcomputers 401 and 402 in this format.

FIG. 13 exemplifies a case where the second vehicle switch signal Sw2 is kept ON when the first vehicle switch signal Sw1 is turned OFF. In this case, stop determination is executed only for the first microcomputer 401 and the second microcomputer 402 continues voltage supply and microcomputer power source generation without stop determination.

As described above, voltage difference between the vehicle switch signals Sw1 and Sw2 is not caused only by voltage difference between the two power sources 111 and 112. Also in a format of branched voltage supply from a single power source, wiring resistance or characteristic variation between the power source generation circuits 161 and 162 may cause difference in reference voltage for stop determination.

Figure 14:
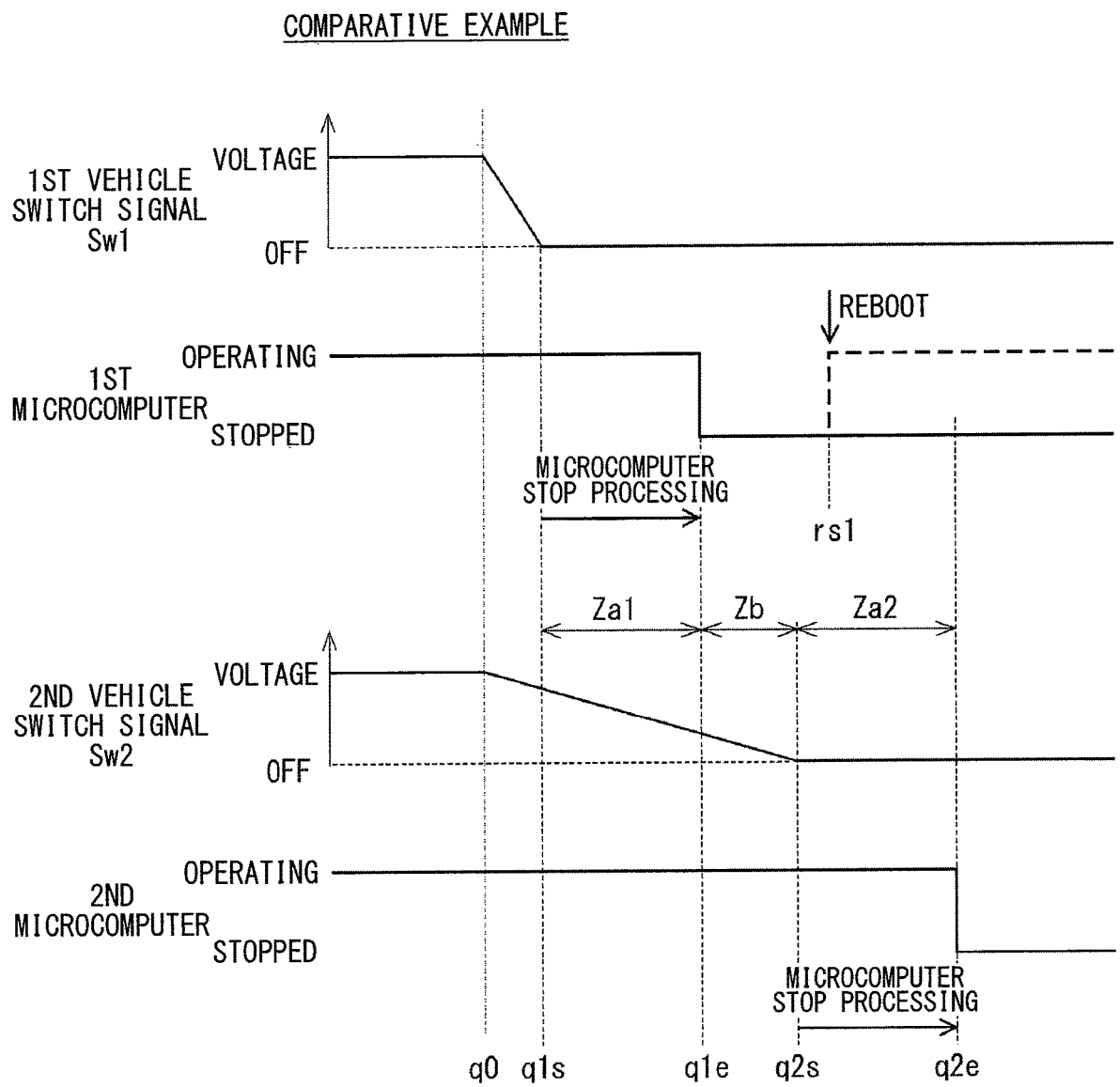
FIG. 14 is a timing chart of the operation 5B according to the comparative example.

Reference is made also to FIG. 14. FIG. 14 indicates timing of voltage reduction of the vehicle switch signals Sw1 and Sw2 and operation stop of the microcomputers 401 and 402. Voltage of each of the vehicle switch signals Sw1 and Sw2 exceeding an OFF level corresponds to the ON state.

The first vehicle switch signal Sw1 and the second vehicle switch signal Sw2 simultaneously start voltage reduction at time q0. The first vehicle switch signal Sw1 firstly completes voltage reduction at time q1s to come into the OFF state, whereas the second vehicle switch signal Sw2 secondly completes voltage reduction at time q2s to come into the OFF state.

The first microcomputer 401 starts microcomputer stop processing at the time q1s and stops operation at time q1e after elapse of a processing period Za1. The second microcomputer 402 starts microcomputer stop processing at the time q2s after elapse of standby time Zb from the time q1e and stops operation at time q2e after elapse of a processing period Za2. During the standby time Zb, only the first microcomputer 401 is stopped and the second microcomputer 402 is operating. In this case, the second microcomputer 402 cannot receive a signal expected to be received from the first microcomputer 401 such as a synchronization signal. In a case where abnormality determination is executed through monitoring synchronization signal reception stop, the ECU 109 may be erroneously determined as being abnormal despite the fact that abnormality is caused by external voltage.

When the first vehicle switch 121 is turned ON again during the standby time Zb or at time rs1 during the processing period Za2 of the second microcomputer 402, the first microcomputer 401 boots with the second microcomputer 402 is already operating. The microcomputers 401 and 402 have a timing shift of operation start therebetween in this case.

As depicted in FIG. 7, the ECU 101 according to the first embodiment includes the signal lines 541 and 542 between the two microcomputers 401 and 402 to achieve mutual communication of the stop determination signal from the stop determiner 531 or 532 of the own microcomputer to the other microcomputer.

Operation of ECU According to First Embodiment

Operation of the ECU 101 according to the first embodiment will be described next with reference to FIGS. 15 and 16.

Figure 15:
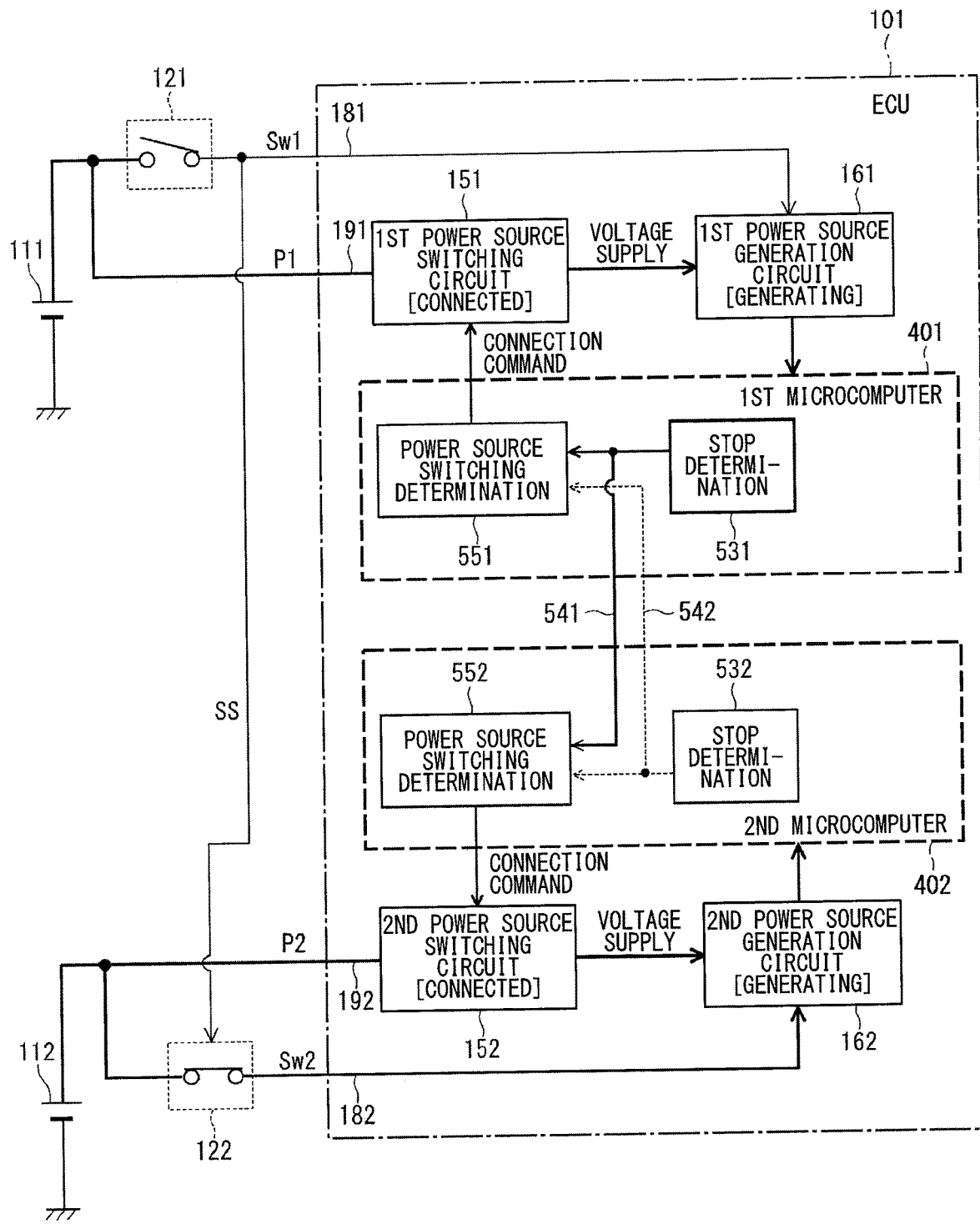
FIG. 15 is an explanatory diagram of operation according to the first embodiment.

Similarly to the operation 5B according to the comparative example in FIG. 13, FIG. 15 assumes that the first vehicle switch signal Sw1 is turned OFF and the second vehicle switch signal Sw2 is kept ON.

In this case, the stop determiner 531 of the first microcomputer 401 outputs the stop determination signal whereas the stop determiner 532 of the second microcomputer 402 does not output the stop determination signal. The power source switching determiner 551 of the first microcomputer 401 accordingly does not receive any stop determination signal from the second microcomputer 402 as the other microcomputer, and outputs a connection command to the first power source switching circuit 151. The first power source generation circuit 161 is then continuously supplied with voltage, and the first power source generation circuit 161 generates a microcomputer power source for the first microcomputer 401.

The power source switching determiner 552 of the second microcomputer 402 does not receive any stop determination signal from the own microcomputer, and thus outputs a connection command to the second power source switching circuit 152.

In summary, the first microcomputer 401 continues operation until receipt of the stop determination signal from the second microcomputer 402, and actually stops operation upon receipt of the stop determination signal from the second microcomputer 402.

Figure 16:
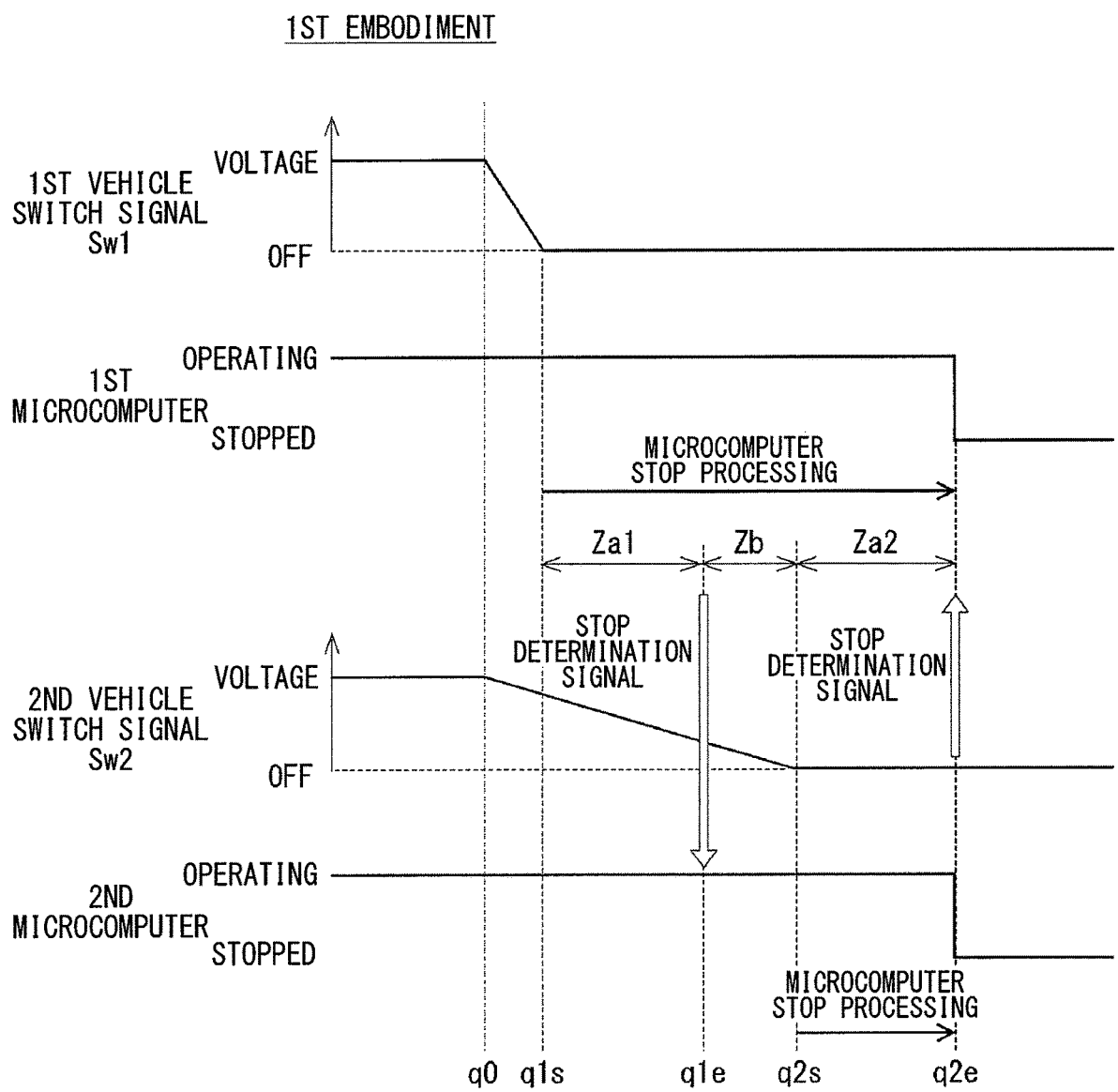
FIG. 16 is a timing chart of the operation according to the first embodiment.

FIG. 16 indicates, in a manner similar to that in FIG. 14, timing of voltage reduction of the vehicle switch signals Sw1 and Sw2 and operation stop of the microcomputers 401 and 402 in the first embodiment.

Similarly to the comparative example, the first microcomputer 401 starts microcomputer stop processing at the time q1s upon completion of voltage reduction of the first vehicle switch signal Sw1, and the second microcomputer 402 starts microcomputer stop processing at the time q2s upon completion of voltage reduction of the second vehicle switch signal Sw2.

According to the first embodiment, the first microcomputer 401 continues operation also after outputting the stop determination signal at the time q1e after elapse of the processing period Za1 from the time q1s, and stops operation upon receipt of the stop determination signal from the second microcomputer 402 at the time q2e. The second microcomputer 402 starts microcomputer stop processing at the time q2s and transmits the stop determination signal to the first microcomputer 401 at the time q2e. The second microcomputer 402 stops operation of the own microcomputer without standby because already having received the stop determination signal from the first microcomputer 401.

In this manner, operation is stopped simultaneously between the first microcomputer 401 as one of the microcomputers included in the ECU 101, and the second microcomputer 402 as one microcomputer other than the first microcomputer 401. The ECU 101 can thus match actual operation stop timing between the multiple microcomputers 401 and 402 even when the vehicle switch signals Sw1 and Sw2 have a voltage reduction timing shift.

In a case where at least one of the microcomputers included in the motor control apparatus and at least one microcomputer other than this microcomputer simultaneously stop operation, such a microcomputer control device is regarded as corresponding to the ECU according to the present embodiment. Simultaneous operation stop of the multiple microcomputers can be determined through detection of dark current or the like.

The ECU 101 can thus match actual operation stop timing even when the microcomputers 401 and 402 have a stop determination timing shift due to difference in supplied voltage or characteristic between the power source generation circuits. It is thus possible to secure consistency upon operation stop of the multiple microcomputers.

For example, the first microcomputer 401 can keep outputting the synchronization signal to the second microcomputer 402 to prevent erroneous determination of reception stop abnormality of the synchronization signal by the second microcomputer 402.

Figure 17:
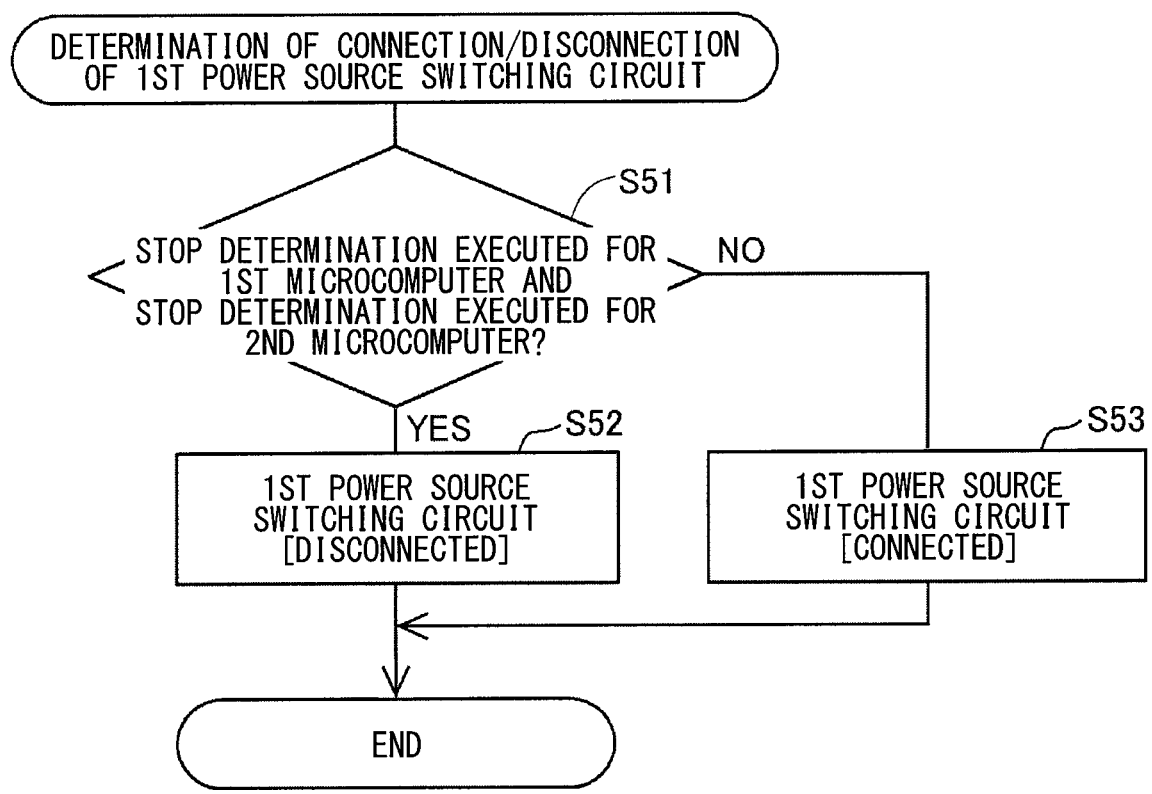
FIG. 17 is a simplified flowchart of determination of connection/disconnection of a first power source switching circuit.
Figure 18:
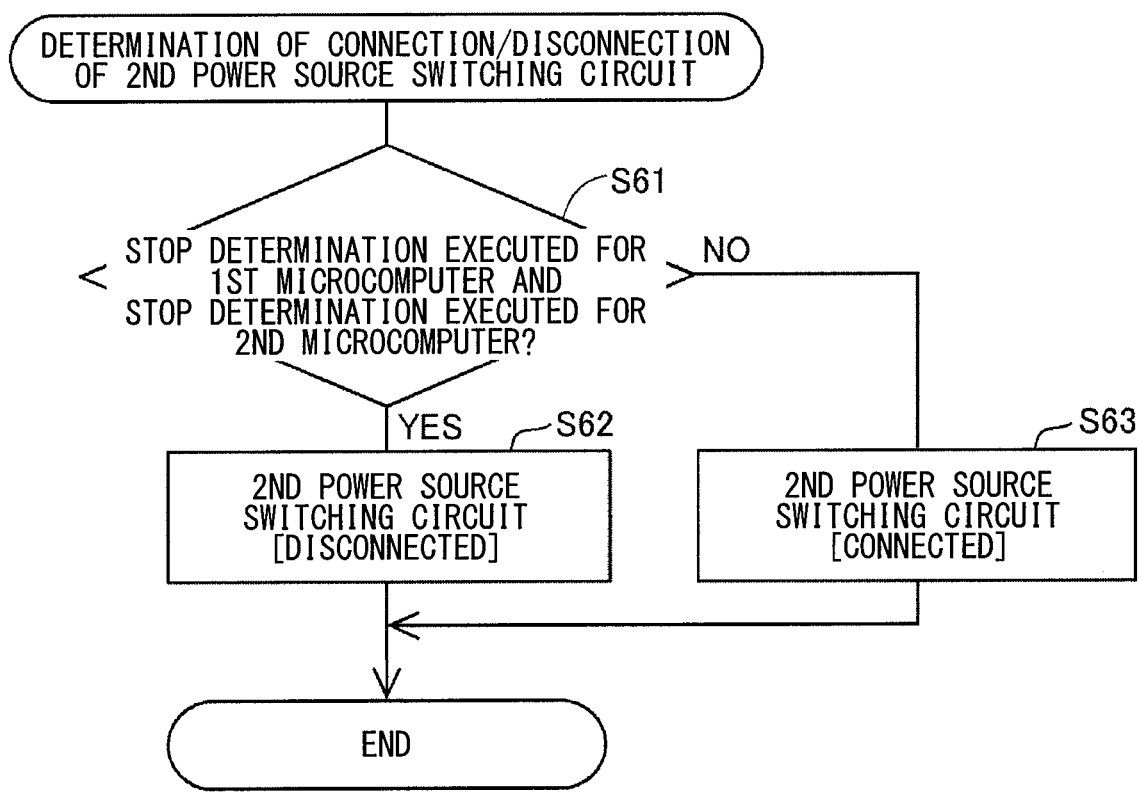
FIG. 18 is a simplified flowchart of determination of connection/disconnection of a second power source switching circuit.

FIGS. 17 and 18 are simplified flowcharts of determination processing of connection/disconnection of the power source switching circuits 151 and 152 according to the first embodiment, respectively.

In the connection/disconnection determination of the first power source switching circuit 151 depicted in FIG. 17, the power source switching determiner 551 of the first microcomputer 401 determines whether or not both of the stop determination signal from the first microcomputer 401 and the stop determination signal from the second microcomputer 402 are received in S51.

If YES in S51, the power source switching determiner 551 outputs a disconnection command to the first power source switching circuit 151 in S52.

If NO in S51, the power source switching determiner 551 outputs a connection command to the first power source switching circuit 151 in S53.

Similarly, in the connection/disconnection determination of the second power source switching circuit 152 depicted in FIG. 18, the power source switching determiner 552 of the second microcomputer 402 determines whether or not both of the stop determination signal from the first microcomputer 401 and the stop determination signal from the second microcomputer 402 are received in S61.

If YES in S61, the power source switching determiner 552 outputs a disconnection command to the second power source switching circuit 152 in S62.

If NO in S61, the power source switching determiner 552 outputs a connection command to the second power source switching circuit 152 in S63.

The configuration according to the first embodiment may fail to stop the own microcomputer in a case where hardware failure causes a specific other microcomputer to fail in normal stop determination. There can thus be provided an upper limit to standby time for reception of the stop determination signal from the other microcomputer after the own microcomputer outputs the stop determination signal.

Figure 19:
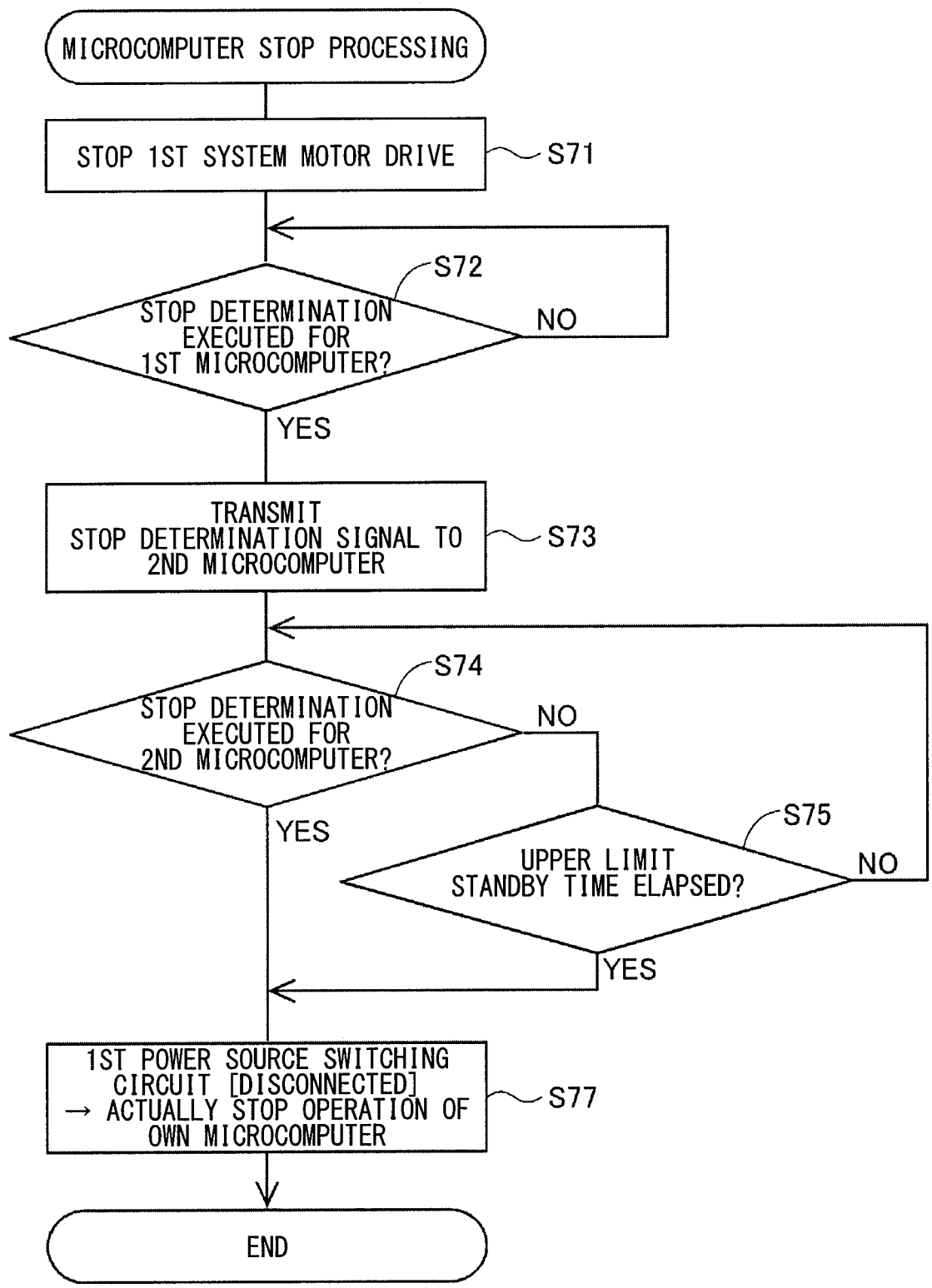
FIG. 19 is a flowchart (1) of microcomputer stop processing in a case where reception of a stop determination signal from another microcomputer has upper limit standby time.
Figure 20:
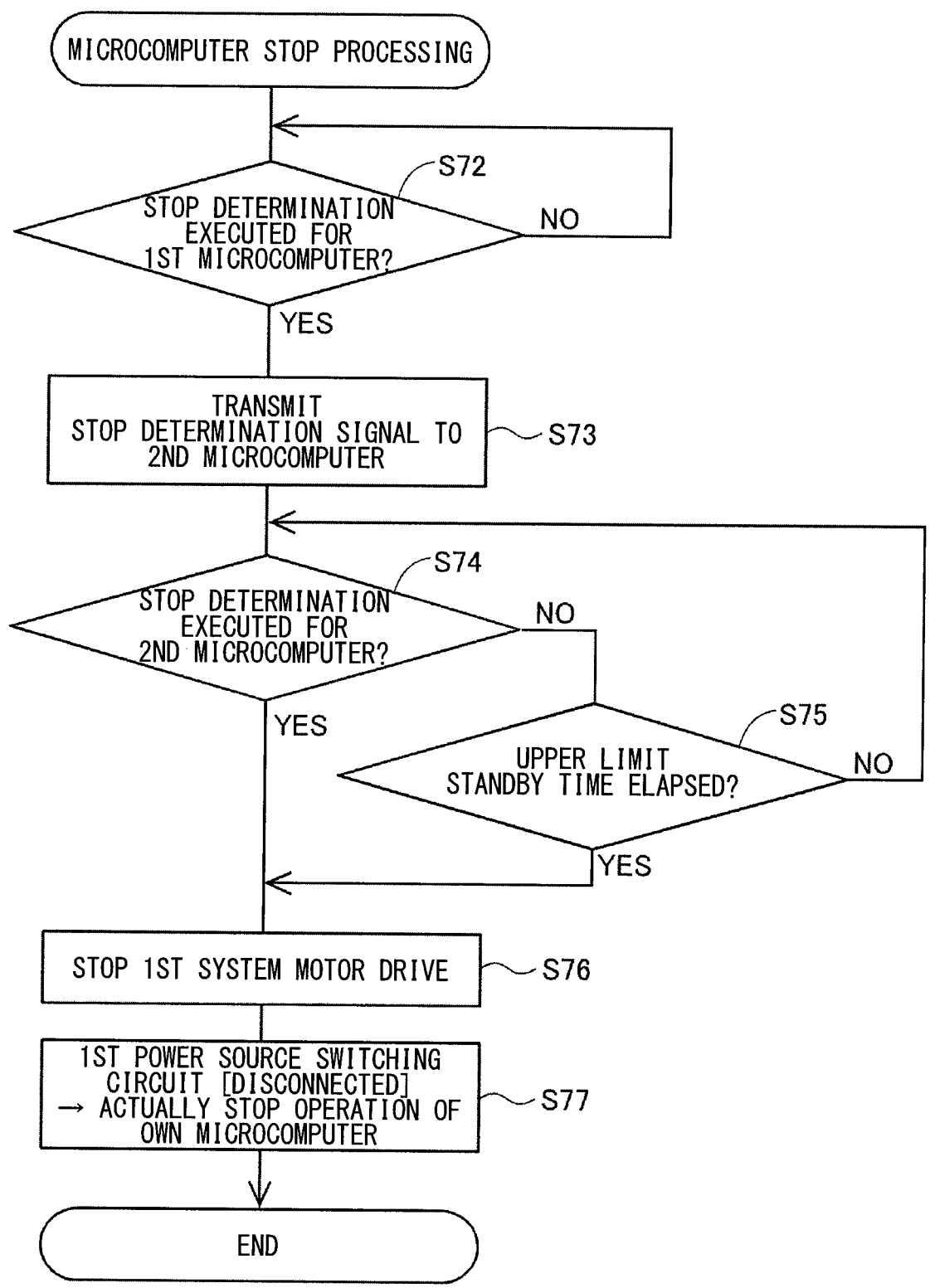
FIG. 20 is a flowchart (2) of the microcomputer stop processing.

Each of FIGS. 19 and 20 is a flowchart of microcomputer stop processing with standby time having an upper limit. According to the operation indicated in FIGS. 13 to 16, assume that the first microcomputer 401 as the own microcomputer initially executes stop determination and the second microcomputer 402 as the other microcomputer subsequently executes stop determination. Microcomputer stop processing starts when the first vehicle switch signal Sw1 is turned OFF from an initial state where the first power source switching circuit 151 is connected and the first system is driving the motor.

Timing of motor drive stop by the respective systems can be shifted from microcomputer operation stop timing. FIGS. 19 and 20 depict microcomputer stop processing different from each other in motor drive stop timing.

FIG. 19 exemplifies a case where, when the first vehicle switch signal Sw1 is turned OFF and the first microcomputer 401 starts stop processing, the first system initially stops driving the motor in S71. The first microcomputer 401 initially stops driving the motor by the own system before transmitting the stop determination signal to the second microcomputer 402.

In an own microcomputer stop determination S72, the stop determiner 531 of the first microcomputer 401 determines whether or not operation of the own microcomputer is about to be stopped. If YES or "first microcomputer stop determined" in S72, the first microcomputer 401 transmits the stop determination signal to the second microcomputer 402 in a stop determination signal transmission S73.

When the first microcomputer 401 subsequently receives the stop determination signal from the second microcomputer 402, the first microcomputer 401 determines YES in another microcomputer stop determination S74.

NO is determined in S74 and YES is determined in S75 if the upper limit standby time elapses before the stop determination signal is received from the second microcomputer 402. The process flow proceeds to S77 in both of these cases. In an operation stop S77, the first microcomputer 401 transmits a disconnection command to the first power source switching circuit 151 in accordance with the stop determination signal from the second microcomputer 402 and actually stops operation of the own microcomputer.

Processing of actually stopping the own microcomputer in the operation stop S77 after determination as YES in S75 can be regarded as "voluntary stop due to timeout of the other microcomputer". When the specific other microcomputer fails in normal stop determination due to some failure, the own microcomputer can voluntarily stop the power source and reduce electric power consumption.

The microcomputer stop processing depicted in FIG. 20 is different from the processing depicted in FIG. 19 only in that S76 is executed in place of S71. After YES is determined in S74 or YES is determined in S75, the first microcomputer 401 stops motor drive by the first system in S76. Except for a case where the upper limit standby time elapses, after the first microcomputer 401 transmits the stop determination signal to the second microcomputer 402 and receives the stop determination signal from the second microcomputer 402, the first microcomputer 401 stops motor drive by the own system immediately before actually stopping operation of the own microcomputer. In the operation stop S77 after determination as YES in the other microcomputer stop determination S74, motor drive by the both systems will stop simultaneously after both the own microcomputer and the other microcomputer achieve stop determination.

In a case where at least one of the microcomputers included in the motor control apparatus and at least one microcomputer other than this microcomputer simultaneously stop driving the motor, such a microcomputer control device is regarded as corresponding to the ECU according to a mode of the present embodiment.

Second Embodiment

The second embodiment will be described with reference to FIG. 21.

Unlike the ECU 101 depicted in FIG. 7 according to the first embodiment, the second embodiment provides an ECU 102 not including the signal line 541 for transmission of the stop determination signal from the first microcomputer 401 to the second microcomputer 402.

The respective microcomputers do not mutually transmit the stop determination signals therebetween, but the second microcomputer 402 transmits the stop determination signal to the first microcomputer 401 unidirectionally.

Assume that the first microcomputer 401 always executes stop determination before the second microcomputer 402 executes stop determination when the first vehicle switch 121 is turned OFF, due to difference in characteristic between the power source generation circuits 161 and 162.

On this assumption, the power source switching determiner 551 of the first microcomputer 401 determines to disconnect the first power source switching circuit 151 if receiving the stop determination signal from the stop determiner 532 of the second microcomputer 402 after receipt of the stop determination signal from the stop determiner 531 of the own microcomputer.

Simultaneously when the stop determiner 532 of the second microcomputer 402 transmits the stop determination signal to the first microcomputer 401, the power source switching determiner 552 acquires the stop determination signal from the own microcomputer and determines to disconnect the second power source switching circuit 152. The first and second power source switching circuits 151 and 152 are then disconnected simultaneously and the first and second microcomputers 401 and 402 stops operation simultaneously.

The second embodiment is similar to the first embodiment in that the first microcomputer 401 having received the stop determination signal from the second microcomputer 402 actually stops operation of the own microcomputer in accordance with the stop determination signal from the second microcomputer 402 as the other microcomputer and the stop determination signal from the own microcomputer. The second microcomputer 402 corresponds to "at least one microcomputer including the stop determiner 532 that transmits the stop determination signal to the other microcomputer". The first microcomputer 401 corresponds to "the microcomputer having received the stop determination signal from at least one other microcomputer".

In the case where the first microcomputer 401 is set to initially execute stop determination, the device configuration can be simplified by limiting transmission of the stop determination signal to unidirectional transmission from the second microcomputer 402 to the first microcomputer 401.

The first microcomputer 401 as the receiver of the stop determination signal is configured to execute the processing of "voluntary stop due to timeout of the other microcomputer" depicted in FIGS. 19 and 20.

Third Embodiment

Figure 22:
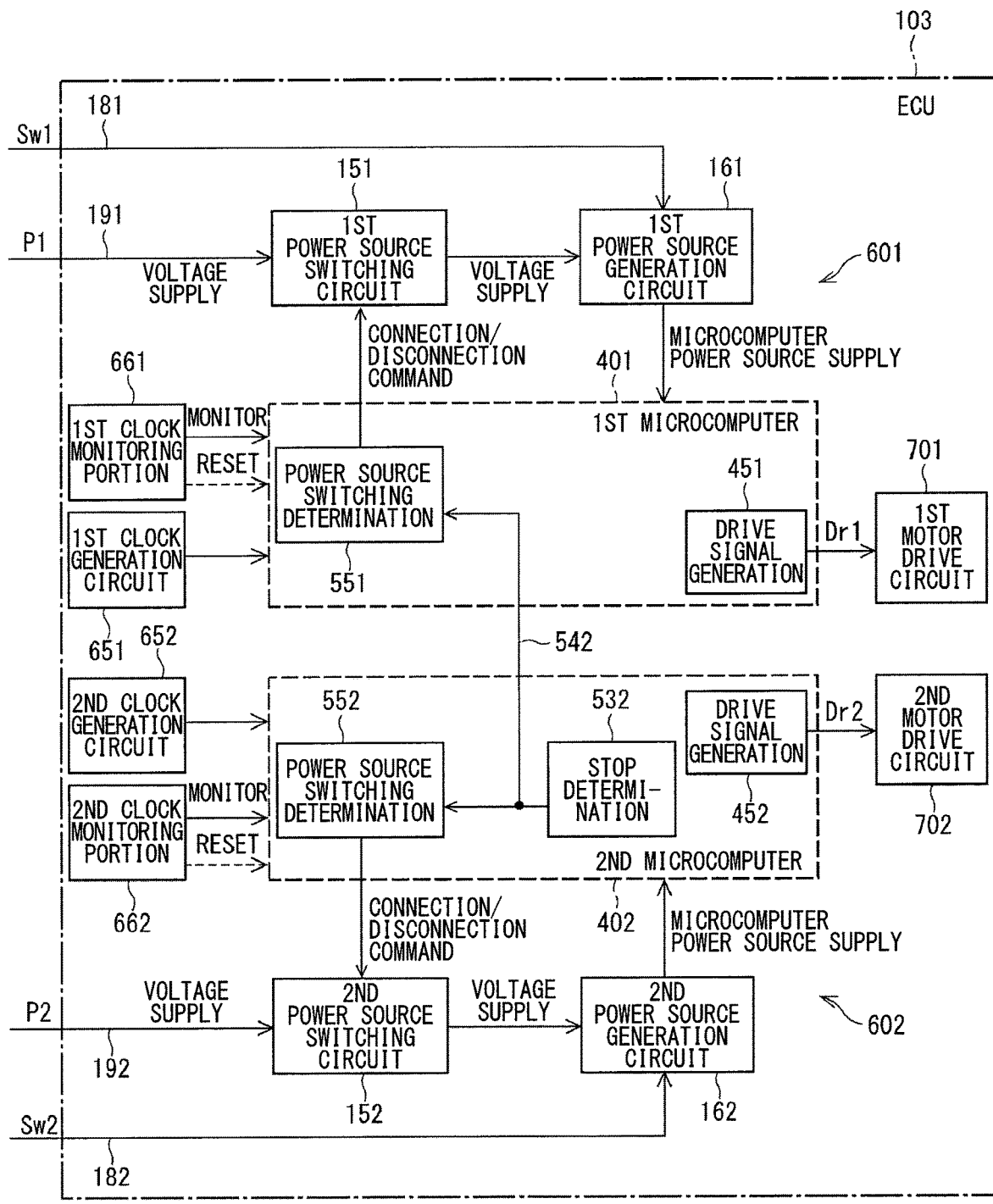
FIG. 22 is a configuration diagram of an ECU (a motor control apparatus) according to a third embodiment.

The third embodiment will be described with reference to FIG. 22.

Figure 21:
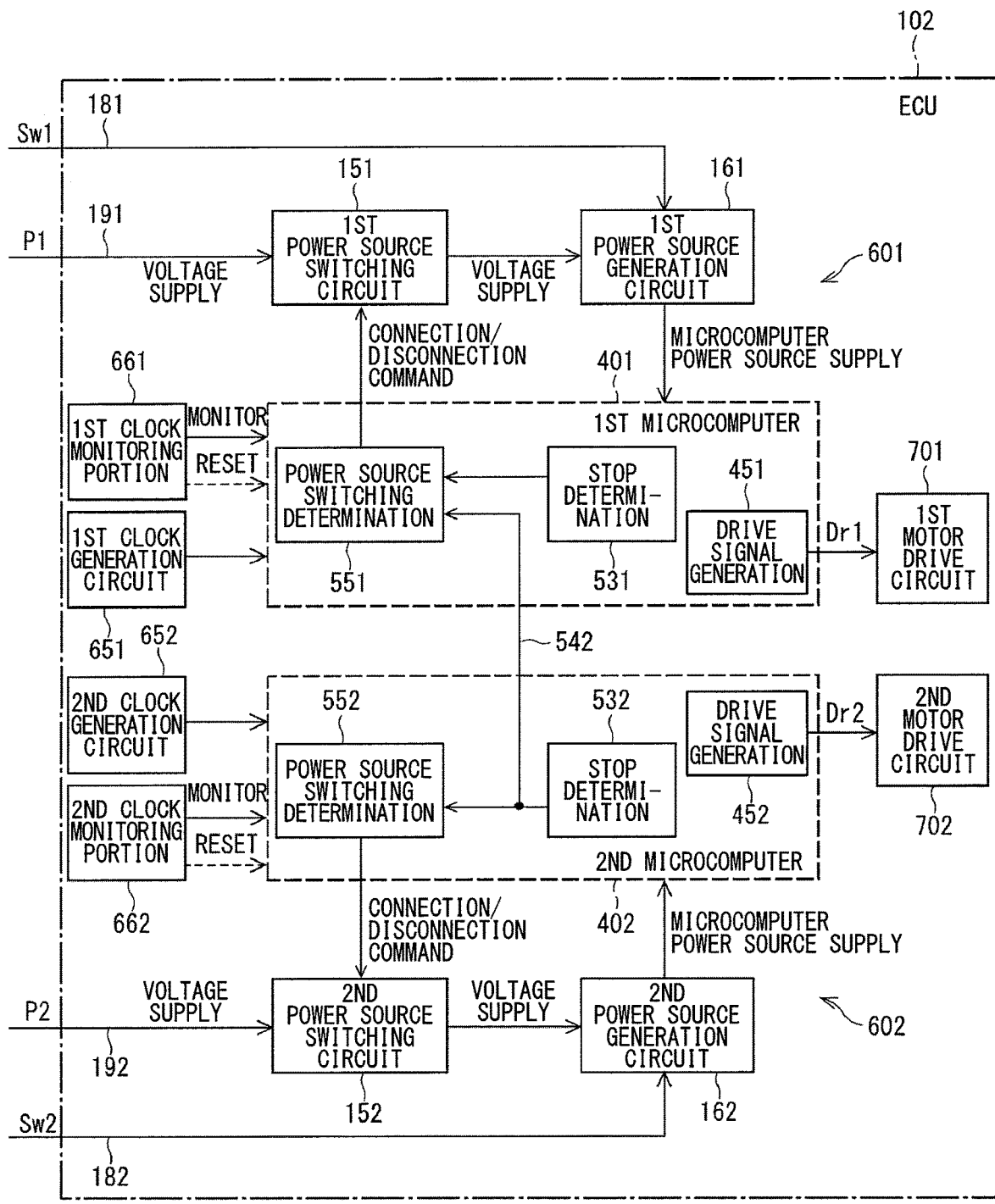
FIG. 21 is a configuration diagram of an ECU (a motor control apparatus) according to a second embodiment.

Unlike the ECU 102 depicted in FIG. 21 according to the second embodiment, the third embodiment provides an ECU 103 including the first microcomputer 401 not including the stop determiner 531.

The microcomputers 401 and 402 include the stop determiners 531 and 532 in the first and second embodiments, whereas only the second microcomputer 402 includes the stop determiner 532 in the third embodiment.

Similarly to the second embodiment, assume that the first microcomputer 401 always executes stop determination before the second microcomputer 402 executes stop determination when the first vehicle switch 121 is turned OFF. Furthermore, assume that the stop determiner 532 of the second microcomputer 402 reliably outputs the stop determination signal within a predetermined period after the first vehicle switch signal Sw1 to the first power source generation circuit 161 is turned OFF.

On this assumption, the power source switching determiner 551 of the first microcomputer 401 determines to disconnect the first power source switching circuit 151 if receiving the stop determination signal from the stop determiner 532 of the second microcomputer 402.

Simultaneously when the stop determiner 532 of the second microcomputer 402 transmits the stop determination signal to the first microcomputer 401, the power source switching determiner 552 acquires the stop determination signal from the own microcomputer and determines to disconnect the second power source switching circuit 152.

The first and second power source switching circuits 151 and 152 are then disconnected simultaneously and the first and second microcomputers 401 and 402 stops operation simultaneously.

In the third embodiment, the first microcomputer 401 having received the stop determination signal from the second microcomputer 402 actually stops operation of the own microcomputer in accordance with the stop determination signal from the second microcomputer 402 as the other microcomputer, not in accordance with the stop determination signal from the own microcomputer.

On the above assumption, the device configuration can be further simplified by limiting transmission of the stop determination signal to unidirectional transmission from the second microcomputer 402 to the first microcomputer 401 and excluding the stop determiner from the first microcomputer 401.

Fourth Embodiment

The fourth embodiment will be described with reference to FIGS. 23 and 24.

Assume that, in the ECU 101 according to the first embodiment, the power source generation circuits 161 and 162 are supplied with power source voltage upon input of the vehicle switch signals Sw1 and Sw2, respectively. After the vehicle switch signals Sw1 and Sw2 are turned OFF, the vehicle switch signals Sw1 and Sw2 are assumed to be turned ON again when the power source switching determiners 551 and 552 command power source disconnection.

Before supplied voltage from the power source switching circuits 151 and 152 to the power source generation circuits 161 and 162 is reduced sufficiently, the power source generation circuits 161 and 162 may continue generation of microcomputer voltage with use of the supplied voltage according to the vehicle switch signals Sw1 and Sw2.

In this case, due to difference between the first power source voltage P1 and the second power source voltage P2, only microcomputer voltage for one of the microcomputers may be generated continuously whereas generation of microcomputer voltage for the other microcomputer may be stopped once and be restarted.

In order to avoid such a situation, the microcomputers 401 and 402 can be provided with measures to reset the microcomputers 401 and 402 in addition to command disconnection of the power source generation circuits 161 and 162.

Figure 23:
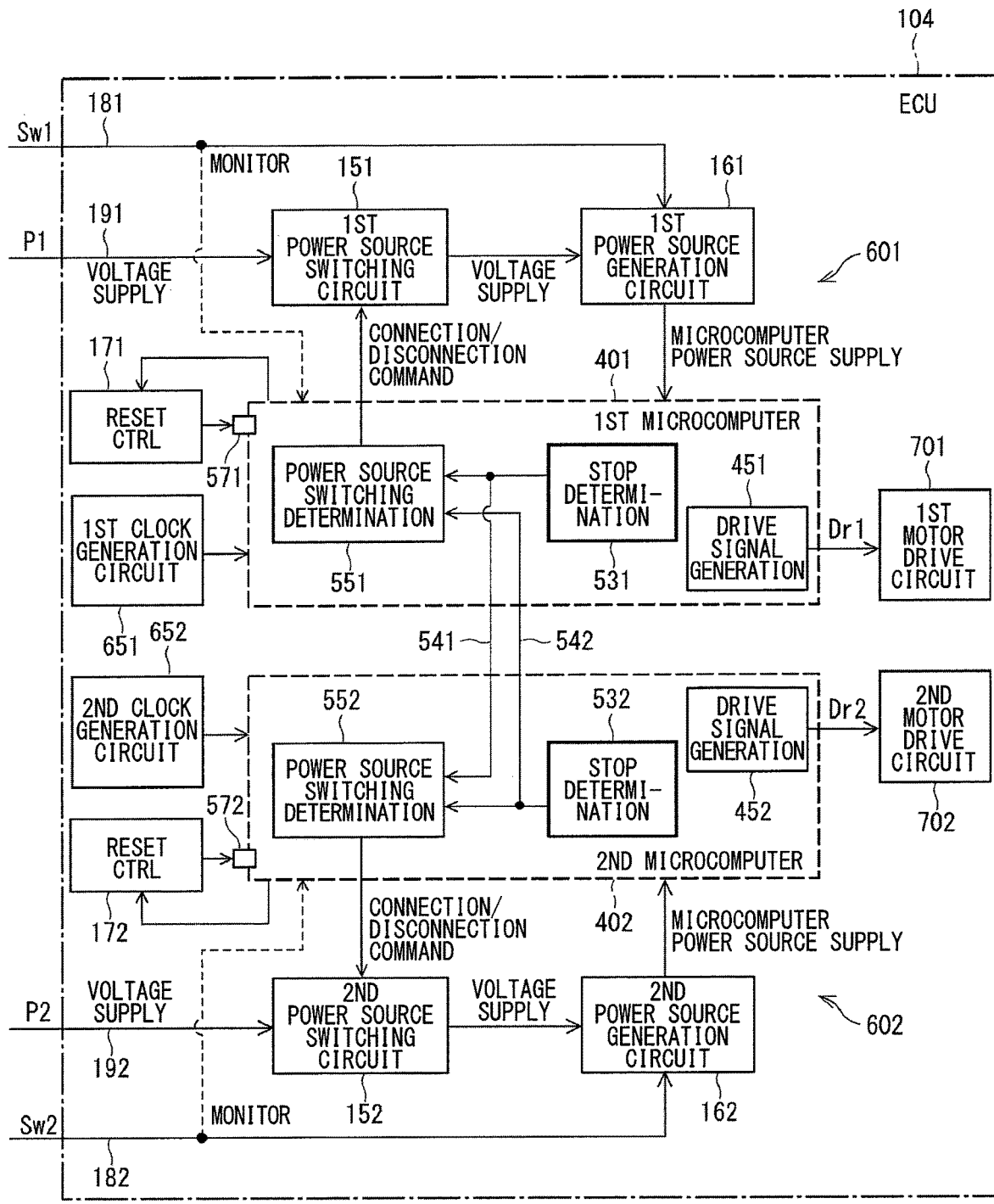
FIG. 23 is a configuration diagram of an ECU (a motor control apparatus) according to a fourth embodiment.

FIG. 23 depicts an ECU 104 according to the fourth embodiment further including reset controllers (each indicated as a "reset CTRL" in the FIGS. 171 and 172 for the microcomputers 401 and 402, respectively, in addition to the configuration of the ECU 101 according to the first embodiment. This figure does not depict the clock monitoring portions 661 and 662. The reset controllers 171 and 172 each stop the corresponding microcomputer 401 or 402 in accordance with the stop determination signal outputted from the corresponding microcomputer 401 and 402.

The reset controllers 171 and 172 according to this embodiment are provided outside the microcomputers 401 and 402 and are configured as ICs that operate contacts of reset terminals 571 and 572 of the microcomputers 401 and 402 and control the reset terminals 571 and 572. Another embodiment can provide a reset controller included in each of the microcomputers.

Figure 24:
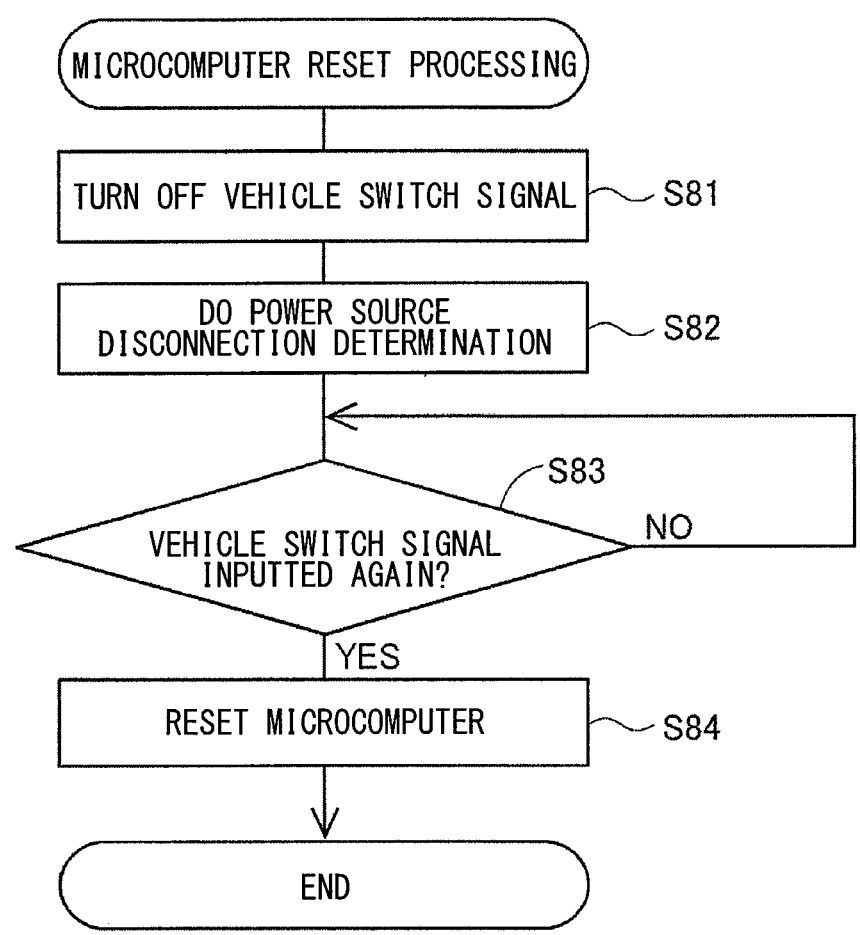
FIG. 24 is a flowchart of microcomputer reset processing according to the fourth embodiment.

FIG. 24 exemplarily depicts microcomputer reset processing.

The microcomputers 401 and 402 monitor input of the vehicle switch signals Sw1 and Sw2, respectively. When the vehicle switch signals Sw1 and Sw2 are once turned OFF in S81, the power source switching determiners 551 and 552 determine to disconnect the power sources in accordance with the stop determination signals in S82, respectively.

If the vehicle switch signals Sw1 and Sw2 are then inputted again and YES is determined in S83, the microcomputers 401 and 402 notify the reset controllers 171 and 172 of reset commands, respectively. The reset controllers 171 and 172 having received the reset commands reset the microcomputers 401 and 402 in S84, respectively.

Matching reset timing between the microcomputers 401 and 402 achieves control while avoiding influence of remaining assist power upon initial check of the electric power steering apparatus 90 or the like.

Provision of a format for initial synchronization achieves prevention of a synchronization timing shift caused by stop and restart of operation of one of the microcomputers while only the other microcomputer keeps operating. Examples of the format for initial synchronization can include permitting first synchronization without any condition after microcomputer booting and reset cancellation.

Fifth Embodiment

Figure 25:
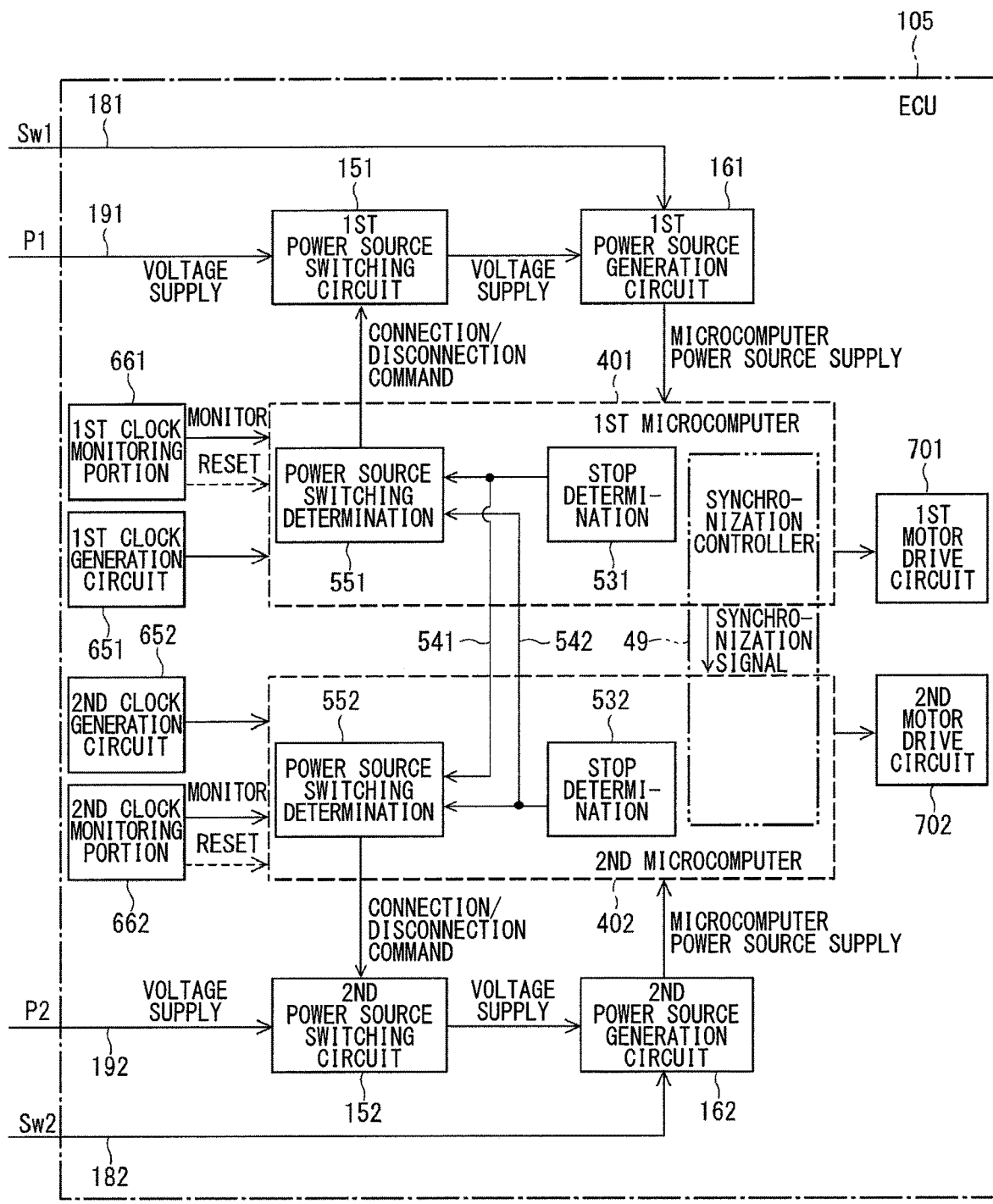
FIG. 25 is a configuration diagram of an ECU (a motor control apparatus) according to a fifth embodiment.

Unlike the first embodiment, the first microcomputer 401 and the second microcomputer 402 according to the fifth embodiment each include a configuration that transmits and receives a synchronization signal. As depicted in FIG. 25, the fifth embodiment provides an ECU 105 including a synchronization controller 49 bridged over the microcomputers 401 and 402. The synchronization controller 49 includes the drive signal generators 451 and 452 in the ECU 101 according to the first embodiment. The synchronization controller 49 will be described later in terms of a detailed configuration according to a basic mode of the fifth embodiment.

Figure 26:
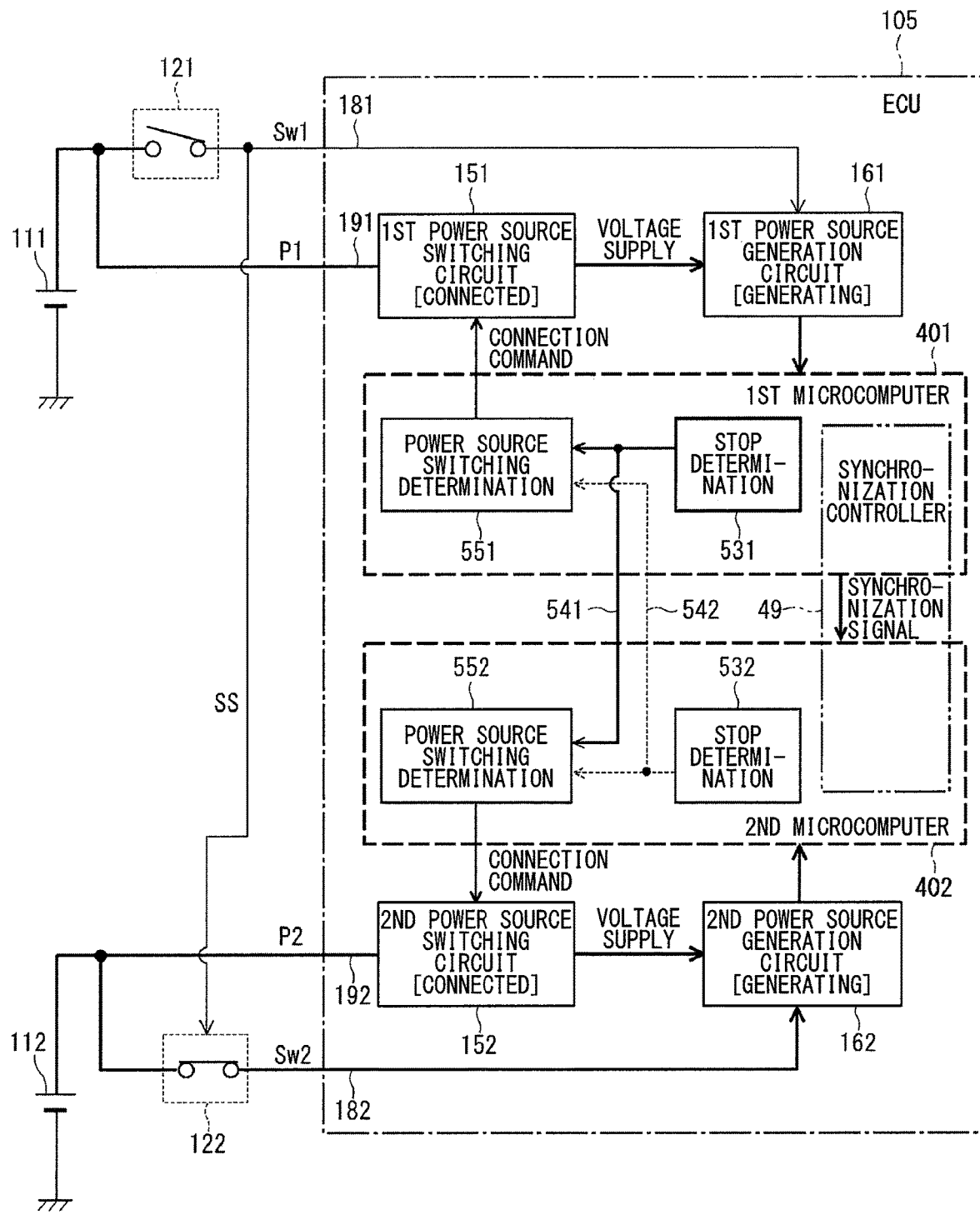
FIG. 26 is an explanatory diagram of operation according to the fifth embodiment.

Description of the first embodiment with reference to FIGS. 8 to 20 is applied to a comparative example of the fifth embodiment and operation according to the fifth embodiment. For example, operation according to the fifth embodiment is depicted in FIG. 26 corresponding to FIG. 15 according to the first embodiment. The signal lines 541 and 542 according to the first embodiment can be expressed as "stop determination signal communication lines 541 and 542" in the fifth embodiment for distinction from a synchronization signal line. In the ECUs 102 to 104 according to the second to fourth embodiments, the microcomputers 401 and 402 can be similarly configured to transmit and receive a synchronization signal.

Prior to description of the fifth embodiment, the basic mode having a main idea of the fifth embodiment will initially be described in terms of a configuration and a functional effect thereof with reference to FIGS. 27 to 38.

Figure 27:
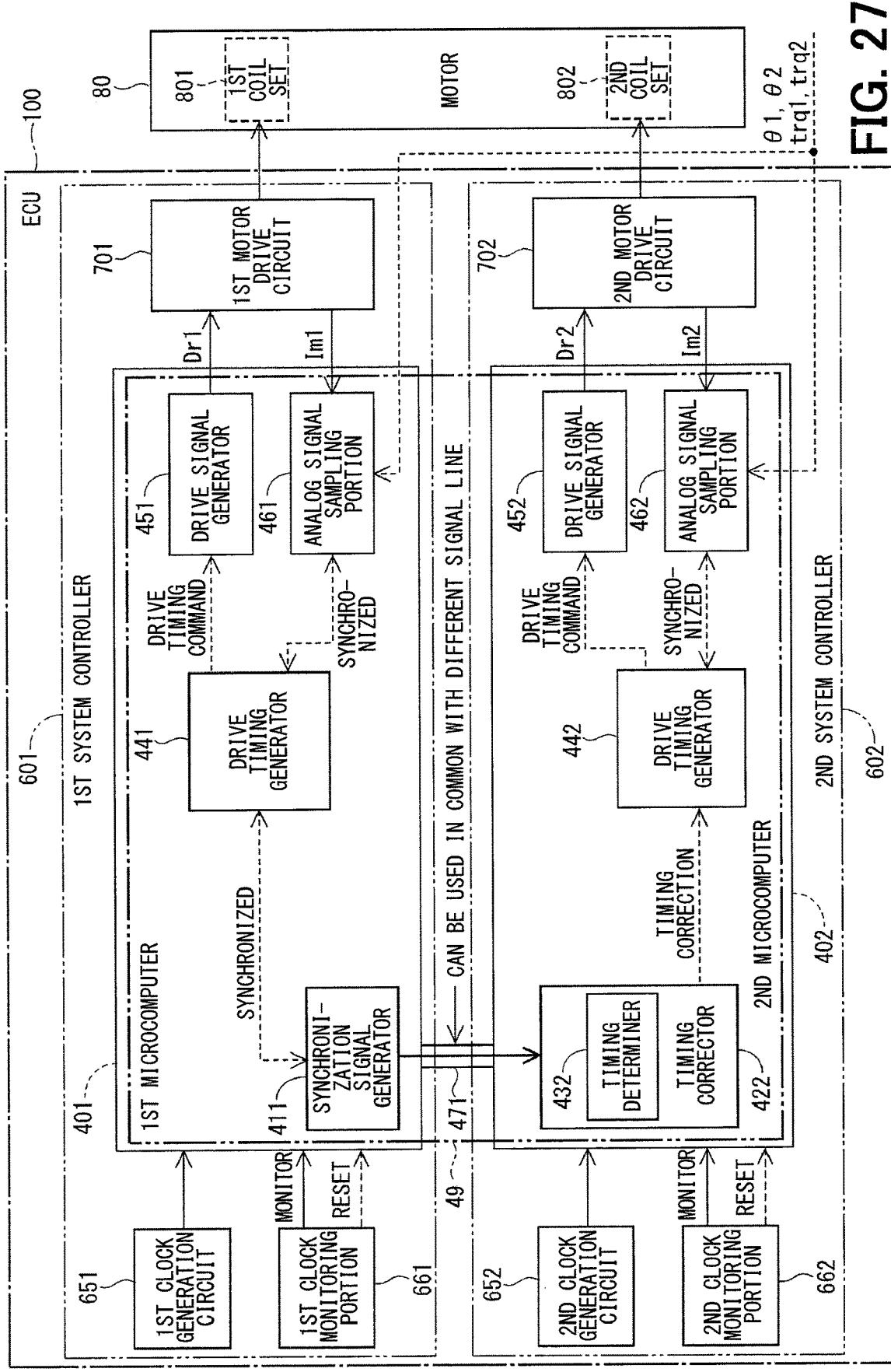
FIG. 27 is a detailed configuration diagram of an ECU (a motor control apparatus) according to a basic mode of the fifth embodiment.

FIG. 27 depicts a configuration particularly relevant to the synchronization controller 49 in the configurations included in the ECU 105 depicted in FIG. 25 according to the fifth embodiment. FIG. 27 depicts the ECU according to the basic mode, denoted by reference sign "100".

FIG. 27 depicts the ECU 100 including the first system controller 601 that controls electrification to the first coil set 801, and the second system controller 602 that controls electrification to the second coil set 802. The controllers 601 and 602 of the respective systems include the clock generation circuits 651 and 652, the clock monitoring portions 661 and 662, the microcomputers 401 and 402, and the motor drive circuits 701 and 702, respectively. In other words, a "system" corresponds to a unit of constituent elements including the clock generation circuit, the microcomputer, and the motor drive circuit provided in association with one another.

The first clock generation circuit 651 and the second clock generation circuit 652 independently generate reference clocks as operation reference of the first microcomputer 401 and the second microcomputer 402, respectively.

The first clock monitoring portion 661 monitors the reference clock generated by the first clock generation circuit 651 and transmitted to the first microcomputer 401. The second clock monitoring portion 662 monitors the reference clock generated by the second clock generation circuit 652 and transmitted to the second microcomputer 402. The clock monitoring portion 661 or 662 transmits a reset signal (denoted by "RESET" in the figure) to the microcomputer 401 or 402 upon detection of abnormality of the reference clock.

The microcomputers 401 and 402 receive vehicle information transmitted via the CANs 301 and 302, information such as the steering torque trq1 and the steering torque trq2, the phase current Im1 and the phase current Im2, and the electrical angles θ1 and θ2, which are transmitted from the corresponding sensors, respectively. The microcomputers 401 and 402 generate the motor drive signals Dr1 and Dr2 through control arithmetic according to the various received information, and transmit the motor drive signals Dr1 and Dr2 to the motor drive circuits 701 and 702, respectively. The control arithmetic is executed at timing determined by the clock generated by each of the clock generation circuits 651 and 652.

The motor drive circuits 701 and 702 electrify the coil sets 801 and 802 in accordance with the motor drive signals Dr1 and Dr2 transmitted as commands from the microcomputers 401 and 402, respectively. Each of the motor drive circuits 701 and 702 is typically exemplified by a power converter circuit including multiple switching elements such as MOS-FETs having bridge connection. The motor drive signals Dr1 and Dr2 are switching signals for turning ON or OFF the switching elements. In the present embodiment exemplifying driving the three-phase brushless motor, the motor drive circuits 701 and 702 are three-phase inverters.

The synchronization controller 49 bridged over the two microcomputers 401 and 402 will be described in terms of the configuration thereof.

Each of the microcomputers 401 and 402 independently includes a ROM that stores a control program and fixed values such as parameters, a RAM that temporarily stores an arithmetic processing result, and the like, and is not configured to refer to the ROM or the RAM in the other microcomputer.

On this assumption, the two microcomputers 401 and 402 are connected to each other via a synchronization signal line 471. FIG. 27 exemplifies provision of the single synchronization signal line 471. The sixth embodiment to be described later or another embodiment providing three or more microcomputers may exemplify provision of multiple synchronization signal lines. In other words, the ECU according to the basic mode of the fifth embodiment ordinarily includes at least one synchronization signal line.

The synchronization signal line is not limited to a dedicated line for transmission of a synchronization signal to be described later, but can also be used in common with a signal line for communication of information other than the synchronization signal, such as a clock line for the communication between the microcomputers, or a serial communication line for communication of information such as current.

As disclosed in JP 2011-148498 A, the synchronization signal can be provided for notification, not by means of communication via the synchronization signal line, but by means of level change of a port signal from the first microcomputer 401 to the second microcomputer 402.

The first microcomputer 401 and the second microcomputer 402 are commonly configured by including drive timing generators 441 and 442, drive signal generators 451 and 452, and analog signal sampling portions 461 and 462, respectively.

The drive timing generators 441 and 442 generate drive timing as pulse timing of the motor drive signals Dr1 and Dr2 with use of a PWM carrier wave commonly applicable to the respective phases or the like, and command the drive timing to the drive signal generators 451 and 452, respectively. The drive signal generators 451 and 452 compare the PWM carrier wave with a DUTY ratio of a voltage command signal or the like to generate the motor drive signals Dr1 and Dr2 as PWM signals, and transmit the motor drive signals Dr1 and Dr2 as commands to the motor drive circuits 701 and 702, respectively.

Each of the analog signal sampling portions 461 and 462 samples an analog signal.

Mainly assumed examples of the analog signal include detection values of the motor current Im1 and the motor current Im2 of the respective systems. The three-phase motor has the motor current Im1 and the motor current Im2 corresponding to U-phase current, V-phase current, and W-phase current of the coil sets 801 and 802, respectively. FIG. 27 includes arrows assuming a case where the acquired motor current Im1 and the acquired motor current Im2 are detected by shunt resistors included in the motor drive circuits 701 and 702. FIG. 27 can further include arrows directed from outside the ECU 100 to the analog signal sampling portions 461 and 462, assuming a case where the motor current Im1 and the motor current Im2 are acquired by current sensors provided at the motor 80. As indicated by broken lines, the analog signal sampling portions 461 and 462 can acquire analog signals of the electrical angles θ1 and θ2, the steering torque trq1, and the steering torque trq2.

The analog signal sampling portions 461 and 462 are synchronized with the drive timing generators 441 and 442, and sample the analog signals at timing different from switch timing of the motor drive signals Dr1 and Dr2, respectively.

Figure 28:
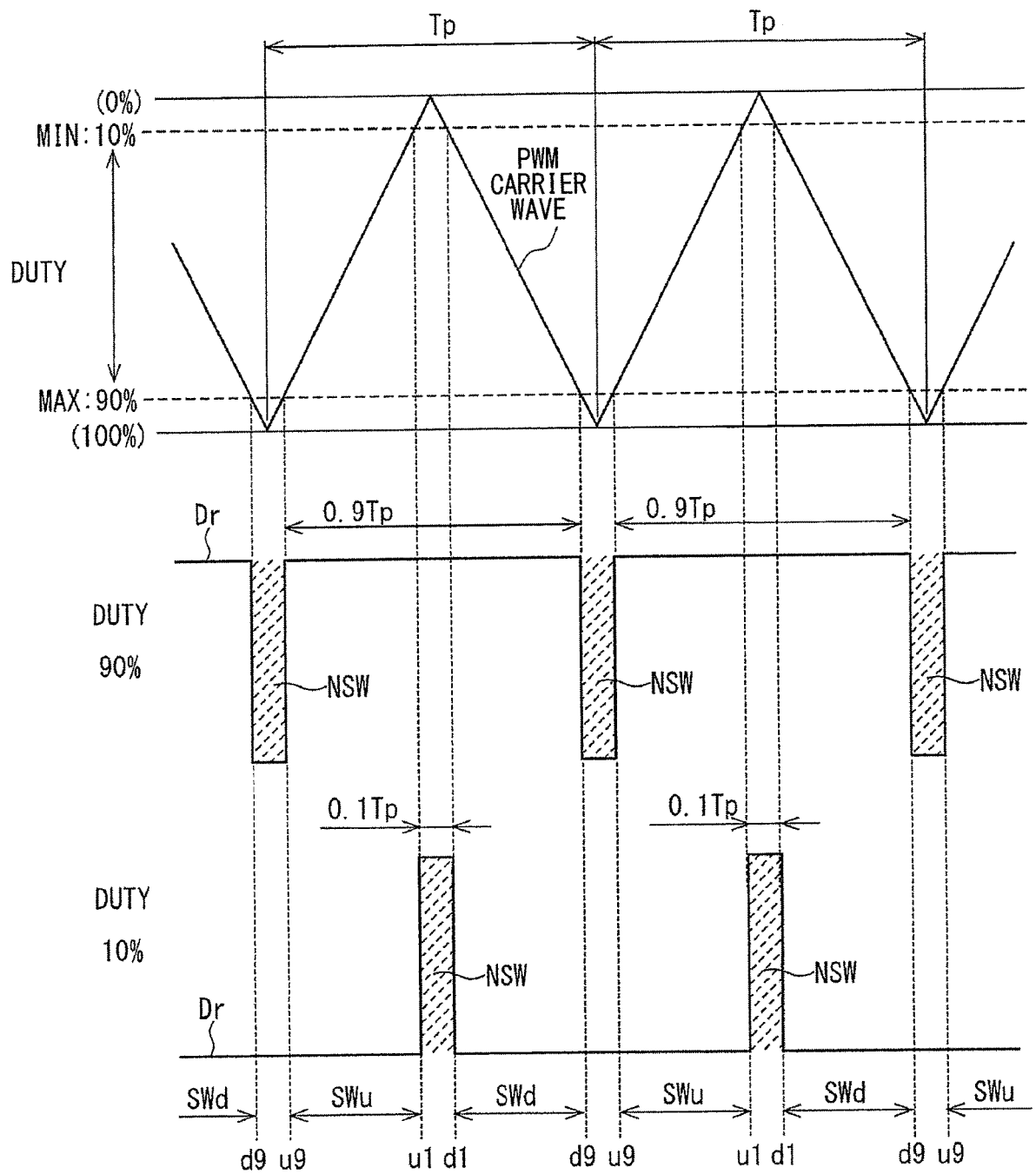
FIG. 28 is a diagram indicating a relation between motor drive signals and analog signal sample timing.

FIG. 28 indicates generation of the motor drive signals Dr with use of a PWM carrier wave having a cycle Tp commonly applied to the respective phases. Examples of the assumed DUTY ratio include a value within a range from 10% to 90%, 0%, and 100%. The present description assumes that the DUTY ratio of 0% corresponds to peaks of the PWM carrier wave and the DUTY ratio of 100% corresponds to bottoms of the PWM carrier wave. The cycle Tp of the PWM carrier wave corresponds to a pulse cycle of the motor drive signal Dr.

At the DUTY ratio of 90%, the motor drive signal Dr has a pulse rising at time u9 and falling at time d9 with an ON period expressed as 0.9 Tp.

At the DUTY ratio of 10%, the motor drive signal Dr has a pulse rising at time u1 and falling at time d1 with the ON period expressed as 0.1 Tp.

At the DUTY ratio in the range from 10% to 90%, the motor drive signal Dr has a pulse rising during a period SWu from the time u9 to the time u1 and falling during a period SWd from the time d1 to the time d9. While the DUTY ratio is 0% or 100%, the pulse has neither rising nor falling. During "non-switching periods NSW" hatched by broken lines, the switching elements of all the phases have no switching of the motor drive signal Dr. The non-switching periods NSW in PWM control each correspond to a minute period including timing of the bottom or the peak of the carrier wave.

The pulse has rising or falling upon switching from the DUTY ratio other than 0% to 0% or switching from the DUTY ratio other than 100% to 100%. Switching can be avoided at carrier wave peak timing during the non-switching periods NSW by setting DUTY ratio switch timing at carrier wave bottom timing. In contrast, switching can be avoided at carrier wave bottom timing during the non-switching periods NSW by fixing the DUTY ratio switch timing at carrier wave peak timing. Furthermore, in a case where the DUTY ratio is set to be switched once in N times of bottom or peak timing of the PWM carrier wave, switching will not occur during (N−1) times of bottom or peak timing with no DUTY ratio switching.

In view of this, the analog signal sampling portions 461 and 462 are synchronized with the drive timing generators 441 and 442 and sample at timing with no DUTY ratio switching to 0% or 100% during the non-switching periods NSW. This suppresses influence of switching noise to a sampled signal to improve sampling accuracy.

More specifically, sampling is preferably executed after elapse of decay time of surge voltage generated by switching.

According to the basic mode of the fifth embodiment, the first microcomputer 401 includes a synchronization signal generator 411 whereas the second microcomputer 402 includes a timing corrector 422. The first microcomputer 401 functions as a "synchronization signal transmitter microcomputer" that transmits a synchronization signal whereas the second microcomputer 402 functions as a "synchronization signal receiver microcomputer" that receives the synchronization signal. Each of the microcomputers 401 and 402 will call the microcomputer itself by the "own microcomputer".

The synchronization signal generator 411 in the first microcomputer 401 generates a synchronization signal that is synchronized with the drive timing generated by the drive timing generator 441 in the own microcomputer and synchronizes drive timing of the two microcomputers 401 and 402. The synchronization signal generator 411 transmits the synchronization signal to the second microcomputer 402 via the synchronization signal line 471.

The timing corrector 422 in the second microcomputer 402 receives the synchronization signal from the first microcomputer 401, and corrects the drive timing generated by the drive timing generator 442 in the own microcomputer to be synchronized with the received synchronization signal. This correction will be called "timing correction". As indicated by broken lines in the second microcomputer 402 in FIG. 27, timing correction includes transmission of a timing correction command from the timing corrector 422 to the drive timing generator 442, and correction of the drive timing according to the timing correction command by the drive timing generator 442.

JP 5412095 B2 discloses an example of a configuration in which "the second microcomputer 402 corrects the drive timing in accordance with the synchronization signal transmitted from the first microcomputer 401".

This related art will be described below.

There has been known a motor control apparatus including multiple microcomputers that is provided redundantly, drive-controls a motor, and operates in accordance with clocks generated by independent clock generation circuits. In a case where all the microcomputers are operated with a single clock generation circuit, motor drive is stopped when the clock generation circuit is in failure. Provision of the clock generation circuits independently for the respective microcomputers leads to reliability improvement.

There is a difficulty that an arithmetic control timing shift between the microcomputers due to production tolerance or the like between the clock generation circuits occurs.

In view of this, the related art discloses an electric motor control apparatus including multiple microcomputers that transmit and receive a synchronization signal therebetween, and the microcomputer having received the synchronization signal corrects the arithmetic control timing in accordance with the synchronization signal. The arithmetic control timing of the multiple microcomputers is synchronized with each other in this manner to suppress motor torque pulsation.

In comparison to this related art, the basic mode of the fifth embodiment provides a timing determiner 432 that is further included in the timing corrector 422 and functions as a "received signal determiner".

Before the timing determiner 432 is described next, points solved by this related art and a difficulty unsolved will be described with reference to FIGS. 29 to 31.

Figure 29:
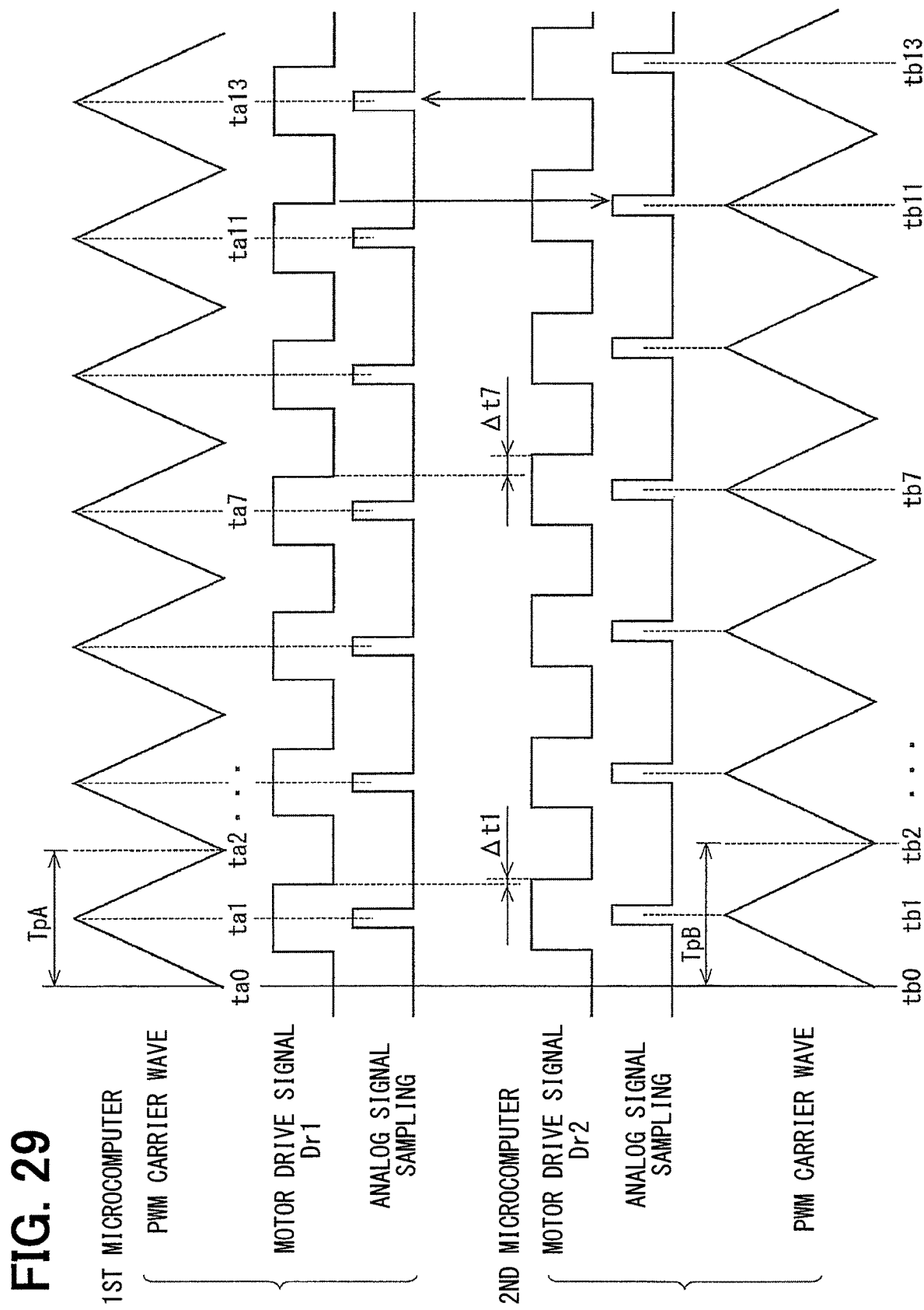
FIG. 29 is a timing chart indicating a clock shift between microcomputers of two systems.

FIG. 29 indicates a gradual shift of timing of the motor drive signals Dr1 and Dr2 of the two microcomputers 401 and 402 due to production tolerance or the like between the clock generation circuits 651 and 652.

Timing charts in FIG. 29 and subsequent figures indicate a pulse cycle of the first motor drive signal Dr1 denoted by TpA and a pulse cycle of the second motor drive signal Dr2 denoted by TpB. The first microcomputer 401 has a PWM carrier wave having bottom timing and peak timing alternately appearing from reference time ta0 and denoted in sequence by ta1, ta2, .... Similarly, the second microcomputer 402 has a PWM carrier wave having bottom timing and peak timing alternately appearing from reference time tb0 and denoted in sequence by tb1, tb2, .... The reference time ta0 and the reference time tb0 agree with each other.

The pulse cycles have a relation expressed as TpA<TpB after the reference time ta0 and tb0, so that the second motor drive signal Dr2 is gradually delayed from the first motor drive signal Dr1. A first cycle causes a relatively small timing shift Δt1. Such a timing shift gradually cumulates to be as large as Δt7 in a fourth cycle. Increase in timing shift causes torque pulsation.

After timing ta11 in FIG. 29, the first motor drive signal Dr1 has fall timing matching analog signal sample timing of the second microcomputer 402. After the timing tb11, the second motor drive signal Dr2 has a rise timing matching analog signal sample timing of the first microcomputer 401. Sample timing matching a pulse edge of the motor drive signal Dr1 or Dr2 has deterioration in sampling accuracy due to switching noise.

The related art discloses connecting the two microcomputers 401 and 402 via the synchronization signal line 471 and correcting an arithmetic timing shift in accordance with a synchronization signal. This method is indicated in FIG. 30.

Figure 30:
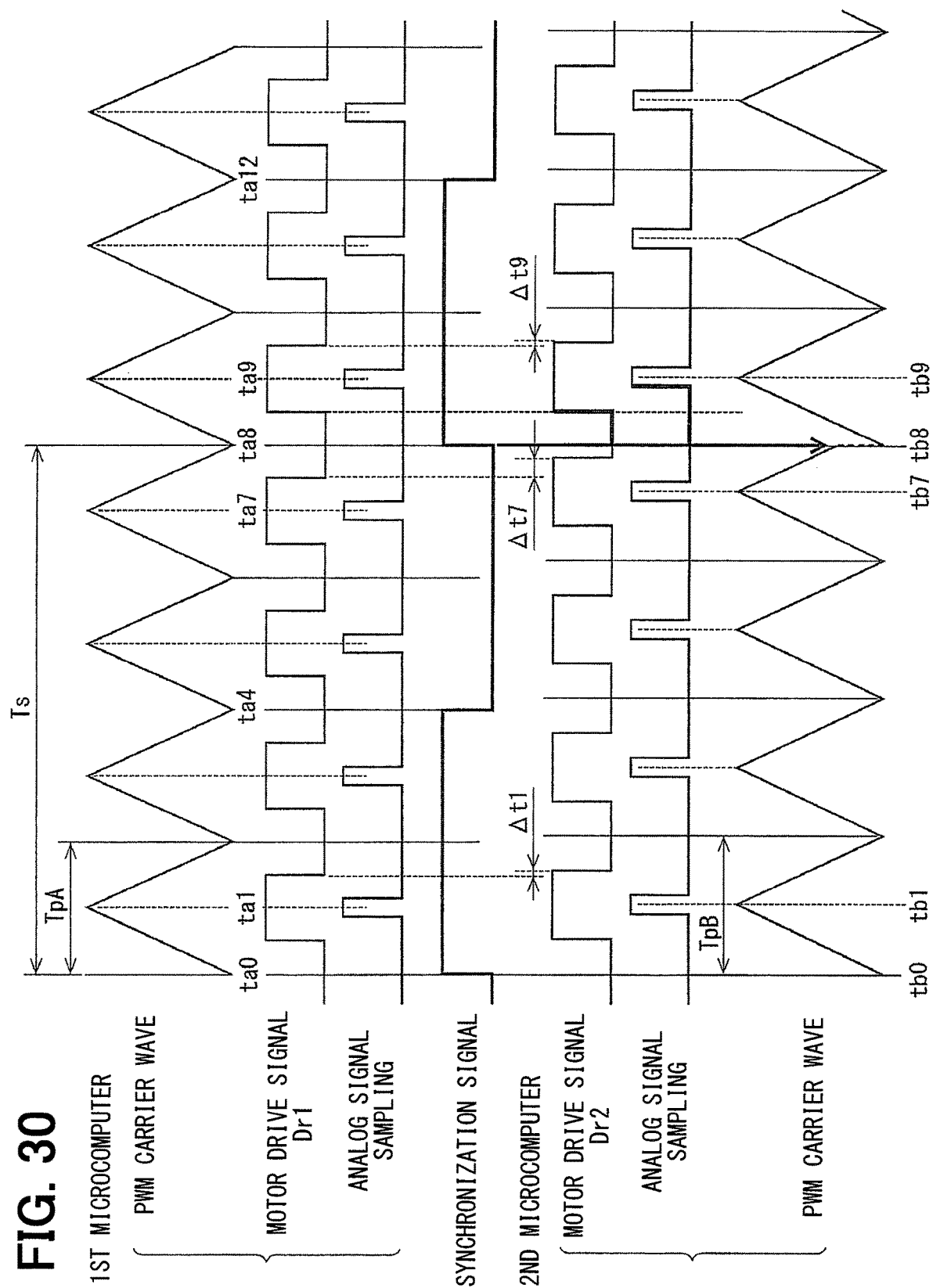
FIG. 30 is an explanatory timing chart indicating timing correction according to a synchronization signal (a related art)

As in FIG. 30, the synchronization signal is generated as a pulse signal having a cycle Ts corresponding to four times of the pulse cycle TpA of the first motor drive signal Dr1. The pulse repetitively rises or falls at every fourth one of bottom timing and peak timing of the PWM carrier wave. The pulse rises at the timing ta0 and timing ta8 and falls at timing ta4 and ta12. FIG. 30 exemplifies timing correction of the second microcomputer 402 to be synchronized with the pulse rise timing ta0 and ta8.

Specifically, timing correction is executed after the timing shift Δt7 cumulates as in FIG. 29, to match timing tb8 of the second microcomputer 402 with the pulse rise timing ta8 of the synchronization signal.

The timing shift is reset to zero at the timing tb8, so that a subsequent single cycle causes a timing shift Δt9 suppressed to be substantially equal to the initial timing shift Δt1. Drive timing is corrected to be synchronized before a timing shift grows to cause torque pulsation or affect sampling accuracy, for continuation of excellent motor drive. A specific synchronization method is not limited to that exemplified in FIG. 30 and can be set appropriately.

In this manner, in the ECU including the multiple microcomputers that operates in accordance with the clocks generated by the clock generation circuits independent from each other, timing correction is executed between the multiple microcomputers with use of the synchronization signal to achieve motor drive with control timing synchronized between the multiple microcomputers. This configuration suppresses torque pulsation. This configuration further prevents analog signal sample timing from matching the switch timing of the motor drive signals Dr1 and Dr2.

The transmitted synchronization signal is, however, not always normal. Specifically, the first clock generation circuit 651 configured to operate the first microcomputer 401, the synchronization signal generator 411 in the first microcomputer 401, or the synchronization signal line 471 may be in failure or the like to cause abnormality of the transmitted synchronization signal itself. A difficulty arising upon reception of an abnormal synchronization signal by the second microcomputer 402 will be described next.

Figure 31:
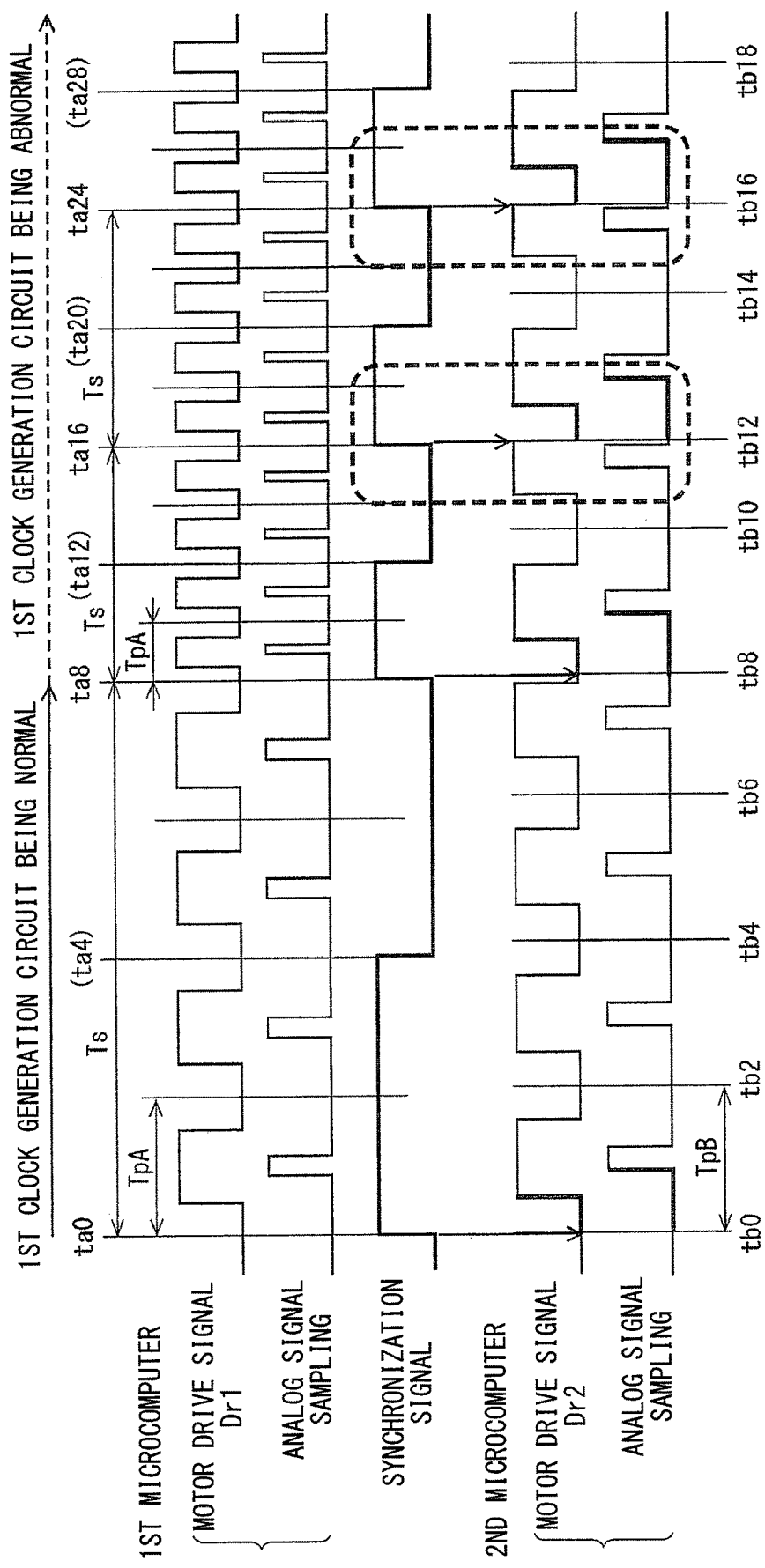
FIG. 31 is an explanatory timing chart indicating a difficulty of the related art upon synchronization signal abnormality.

FIG. 31 indicates an assumed defect upon abnormality of the first clock generation circuit 651 configured to operate the first microcomputer 401.

As indicated in FIG. 31, the clock generation circuit 651 operates normally from the reference time ta0 to the timing ta8, but has increase in clock frequency from the timing ta8 to abnormally shorten the pulse cycle TpA of the first motor drive signal Dr1. Along therewith, a synchronization signal generated in accordance with the clock generated by the clock generation circuit 651 is increased in frequency to shorten the cycle Ts.

If control arithmetic fails to follow such an increased clock frequency in this case, the first microcomputer 401 has control breakdown to cause unavoidable motor drive stop.

Meanwhile, the second microcomputer 402 operates normally and the pulse cycle TpB of the second motor drive signal Dr2 is kept constant. Assume a case of correcting drive timing of the second microcomputer 402 at synchronization signal pulse rise timing ta0, ta8, ta16, and ta24. At the timing ta16 and ta24 surrounded with broken lines, timing correction is executed while the second motor drive signal Dr2 is ON to be forcibly switched OFF.

This may cause generation of an unintended pulse and unstable switching control of the second motor drive circuit 702. This may also cause uneven analog signal sampling intervals to adversely affect sampling accuracy.

Such a situation where failure caused at the first system controller 601 affects operation of the microcomputer 402 in the other system will be referred to as "failure propagation". FIG. 31 exemplifies a serious situation where the second microcomputer 402 executes timing correction according to the abnormal synchronization signal transmitted from the first microcomputer 401 to disable motor drive that should be executed normally only by the second system.

The motor control apparatus is redundantly configured to include the two systems originally in order to achieve continuous motor drive according to operation of a normal one of the systems even in a case where another one of the systems has abnormality. However, such an object is never achieved upon failure propagation.

The electric power steering apparatus 90 particularly requires continuous motor drive for prevention of assist function stop, even upon torque pulsation and deterioration in analog signal sampling accuracy. The related art may cause failure propagation.

The technique according to the related art does not assume a case where the synchronization signal transmitted and received between the multiple microcomputers has abnormality. When the transmitted synchronization signal has abnormality, a synchronization signal receiver microcomputer will execute timing correction in accordance with the abnormal synchronization signal. The synchronization signal receiver microcomputer may have control breakdown depending on a degree of synchronization signal abnormality. This may lead to a worse situation than occurrence of torque pulsation due to a clock shift. For example, a vehicle electric power steering apparatus having an assist function stopped due to motor drive stop will make a driver to feel anxious. There is thus required determination of synchronization signal abnormality and execution of an appropriate procedure against the abnormality.

In order to solve such a difficulty, in the ECU 100 according to the basic mode of the fifth embodiment, the timing corrector 422 in the second microcomputer 402 includes the timing determiner 432 that functions as the "received signal determiner" and executes "received signal determination" of whether a received synchronization signal is normal or abnormal.

The second microcomputer 402 permits timing correction in a case where the timing determiner 432 determines normality of the received synchronization signal. In another case where the synchronization signal is determined as being abnormal, the second microcomputer 402 prohibits timing correction and drives the motor asynchronously with the first microcomputer 401.

In summary, the synchronization signal receiver microcomputer initially determines whether or not the synchronization signal transmitted from the synchronization signal transmitter microcomputer and possibly causing failure propagation is normal. In a case where the synchronization signal is determined as being normal, drive timing of the synchronization signal receiver microcomputer is corrected to be synchronized with drive timing of the synchronization signal transmitter microcomputer to achieve excellent motor drive.

In another case where the synchronization signal is determined as being abnormal, timing correction is not executed to preferentially prevent failure propagation. The synchronization signal receiver microcomputer should be disconnected from the synchronization signal transmitter microcomputer and continue asynchronous motor drive, for continuation of the minimum assist function.

A format of "timing determination" executed as "received signal determination" by the timing determiner 432 will be described next with reference to FIGS. 32 to 34.

The basic mode of the fifth embodiment provides a method of determining whether or not the received synchronization signal has a pulse edge, i.e. rise or fall timing, included in a "synchronization permissive interval". The "synchronization permissive interval" can alternatively be called "correction permissive interval". Hereinafter, "reception timing of the pulse edge of the synchronization signal" will simply be called "synchronization signal reception timing".

Figure 32:
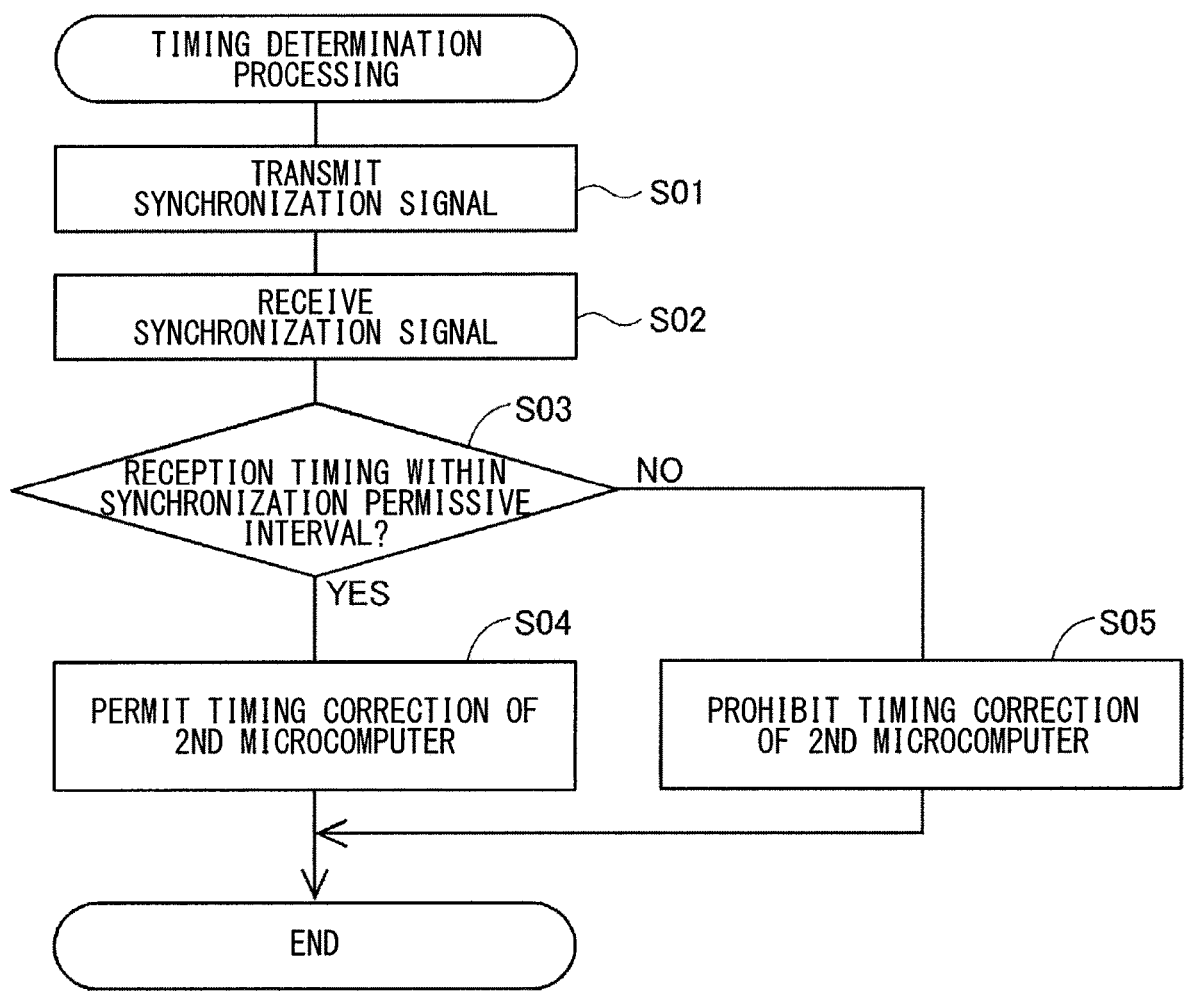
FIG. 32 is a flowchart of timing determination processing according to the basic mode of the fifth embodiment.

FIG. 32 is a flowchart of such timing determination processing in a motor control method. The flowcharts to be referred to hereinafter include sign "S" indicating a step. Assume that steps in the flowcharts of FIGS. 32 and 35 to 38 excluding S01 in FIG. 32 are executed by the timing corrector and the timing determiner in the synchronization signal receiver microcomputer, or the entire synchronization signal receiver microcomputer.

In a synchronization signal transmission S01 in FIG. 32, the synchronization signal generator 411 in the first microcomputer 401 transmits a synchronization signal to the second microcomputer 402.

In a synchronization signal reception S02, the timing corrector 422 receives the synchronization signal.

In a received signal determination S03, the timing determiner 432 determines whether or not synchronization signal reception timing is included in the synchronization permissive interval, for determination of whether the synchronization signal is normal or abnormal.

If YES in S03, the second microcomputer 402 permits timing correction of the second microcomputer 402 in a timing correction permission S04. The first microcomputer 401 and the second microcomputer 402 then synchronously drive the motor 80.

If NO in S03, the received synchronization signal is determined as being abnormal. The second microcomputer 402 prohibits timing correction of the second microcomputer 402 in a timing correction prohibition S05, and drives the motor 80 asynchronously with the first microcomputer 401.

Exemplary setting of the synchronization permissive interval will be described next. Assume a case in FIG. 30 or the like of generating a pulse of the synchronization signal at bottom or peak timing of the PWM carrier wave. As indicated in FIG. 28, timing of the synchronization signal does not match switch timing of the motor drive signals Dr in this case.

In a case where the motor drive signals Dr1 and Dr2 have a timing shift ideally equal to zero, the timing corrector 422 receives the synchronization signal at timing matching bottom or peak timing of the PWM carrier wave of the second microcomputer 402. The maximum range of a clock shift while the clock generation circuits 651 and 652 operate normally is estimated in such an ideal state.

Assume an exemplary case where the clock generation circuits 651 and 652 generate clocks varied at most by $\pm x$ % and timing is corrected in accordance with the synchronization signal at the cycle Ts [s].

In this case, the microcomputer 401 and 402 have internally counted time varied from the original clocks generated by the clock generation circuits 651 and 652 within a range from at least "(100−x)/100" times to at most "(100+x)/100" times.

The microcomputers 401 and 402 thus have a maximum shift amount $\Delta Tmax$ [s] generated in a single synchronization cycle and expressed by Equation 1.

$$\Delta Tmax = Ts \times \{(100 + x) - (100 - x)\}/100 \qquad \text{(Equation 1)}$$
$$= Ts \times 2x/100$$

The synchronization permissive interval needs to be set to be equal to or more than the shift amount $\Delta Tmax$ for prevention of erroneous correction prohibition during normal drive. The synchronization permissive interval is set to be also within system permissive time to enable appropriate timing determination processing.

Assume an exemplary case where the synchronization cycle Ts is 1 ms and the clock generation circuits 651 and 652 generate clocks varied maximally within ±1%. The maximum shift amount $\Delta Tmax$ [s] generated from certain synchronization to subsequent synchronization is 0.02 [ms] as obtained in accordance with Equation 1.

$$\Delta Tmax = 1 \text{ [ms]} \times (2 \times 1/100) = 0.02 \text{ [ms]}$$

Figure 33:
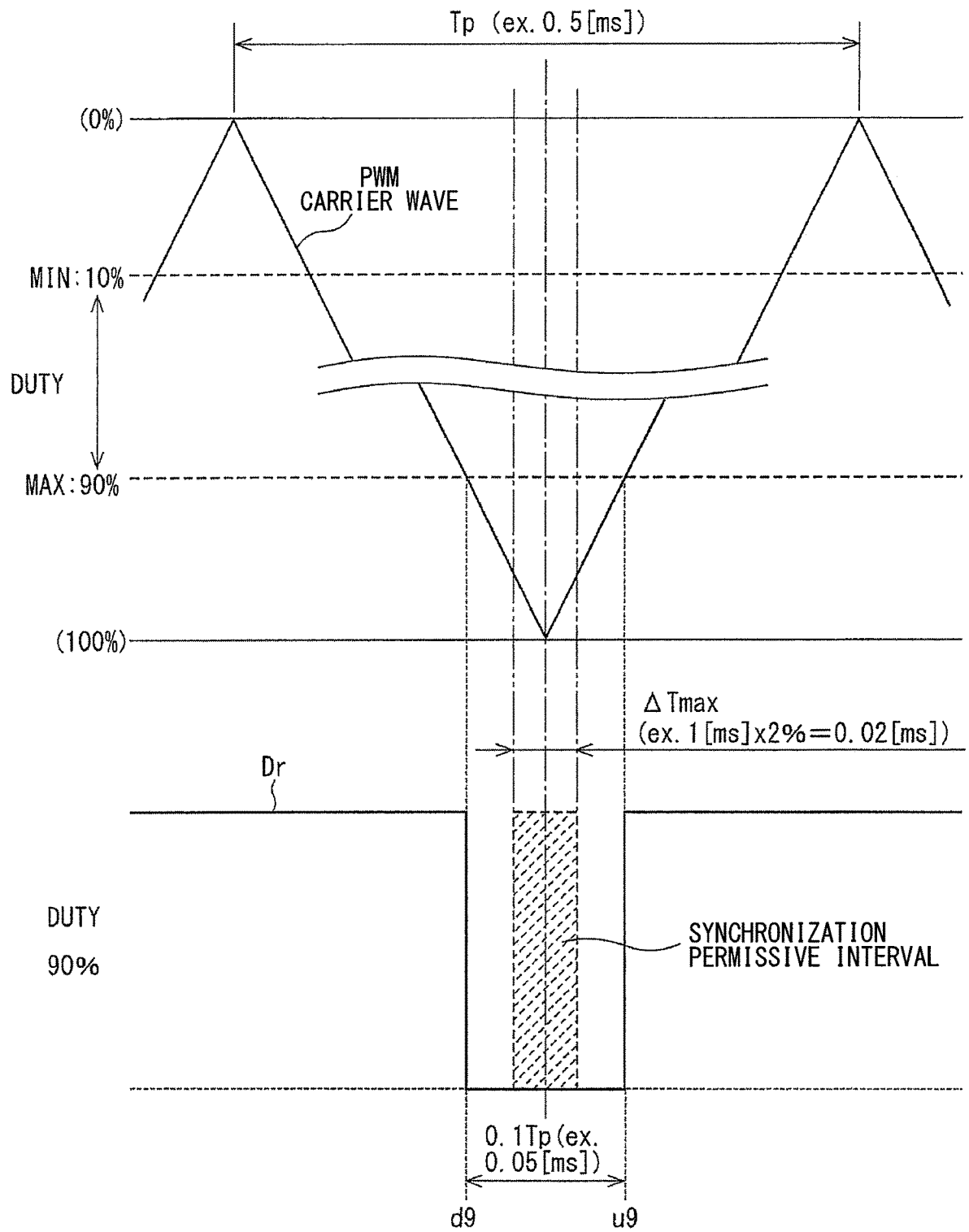
FIG. 33 is an explanatory diagram indicating a synchronization permissive interval exemplarily set in accordance with the basic mode of the fifth embodiment.

As indicated in FIG. 33, assume that the PWM carrier wave cycle Tp is 0.5 [ms] and the DUTY ratio is in the range from 10% to 90%. In a case of driving at the DUTY ratio of 90%, the non-switching period from the falling time d9 to the subsequent rising time u9 of the motor drive signal Dr is 0.1 Tp or 0.05 [ms].

In another case where the synchronization permissive interval is set to have 0.02 [ms] as the maximum shift amount $\Delta Tmax$, having 0.01 [ms] each before and after bottom timing of the PWM carrier wave, the synchronization permissive interval is reliably included in the non-switching period of 0.05 [ms].

In view of this, if the clock generation circuits 651 and 652 generate clocks varied maximally within ±1%, the synchronization permissive interval is set to at least 2% of the synchronization signal cycle Ts to prevent erroneous correction prohibition during normal drive. The microcomputers 401 and 402 can keep driving synchronously with each other while drive timing is synchronized therebetween.

Variation between the clocks exceeding ±1% due to failure of the second clock generation circuit 652 can be detected by the second clock monitoring portion 662. The second microcomputer 402 is thus assumed to have a correctly set synchronization permissive interval.

The synchronization permissive interval, which is set during the non-switching period of the motor drive signal Dr at the maximum DUTY ratio, prevents a pulse being ON from being forcibly switched OFF due to timing correction. Even if an abnormal synchronization signal enters the synchronization permissive interval at timing different from expected synchronization timing, the motor drive signal Dr can secure a pulse width at the maximum DUTY ratio for achievement of unproblematic operation.

Overmodulation control of output at a DUTY ratio in the range from 10% to 90% as well as at 0% and at 100% may match synchronization signal reception timing with DUTY ratio switch timing. Such a case has simple synchronization with DUTY ratio switch timing. The DUTY ratio kept at 100% or the like has no switch OFF timing, and synchronization at any timing thus has no actual influence.

In a case where DUTY ratio is switched from a value other than 100% to 100%, a normal pulse width ends completely at the DUTY ratio before the switching, and output at the DUTY ratio of 100% then starts simply at earlier or later timing. In another case where DUTY ratio is switched from 100% to a value other than 100%, output at the DUTY ratio of 100% ends at earlier or later timing with no influence on a period of output at the subsequent DUTY ratio. None of these cases has output at an abnormal DUTY ratio with slight influence on motor drive. The same applies to output at the DUTY ratio of 0% with output simply switched between ON and OFF at the DUTY ratio of 100%.

Figure 34:
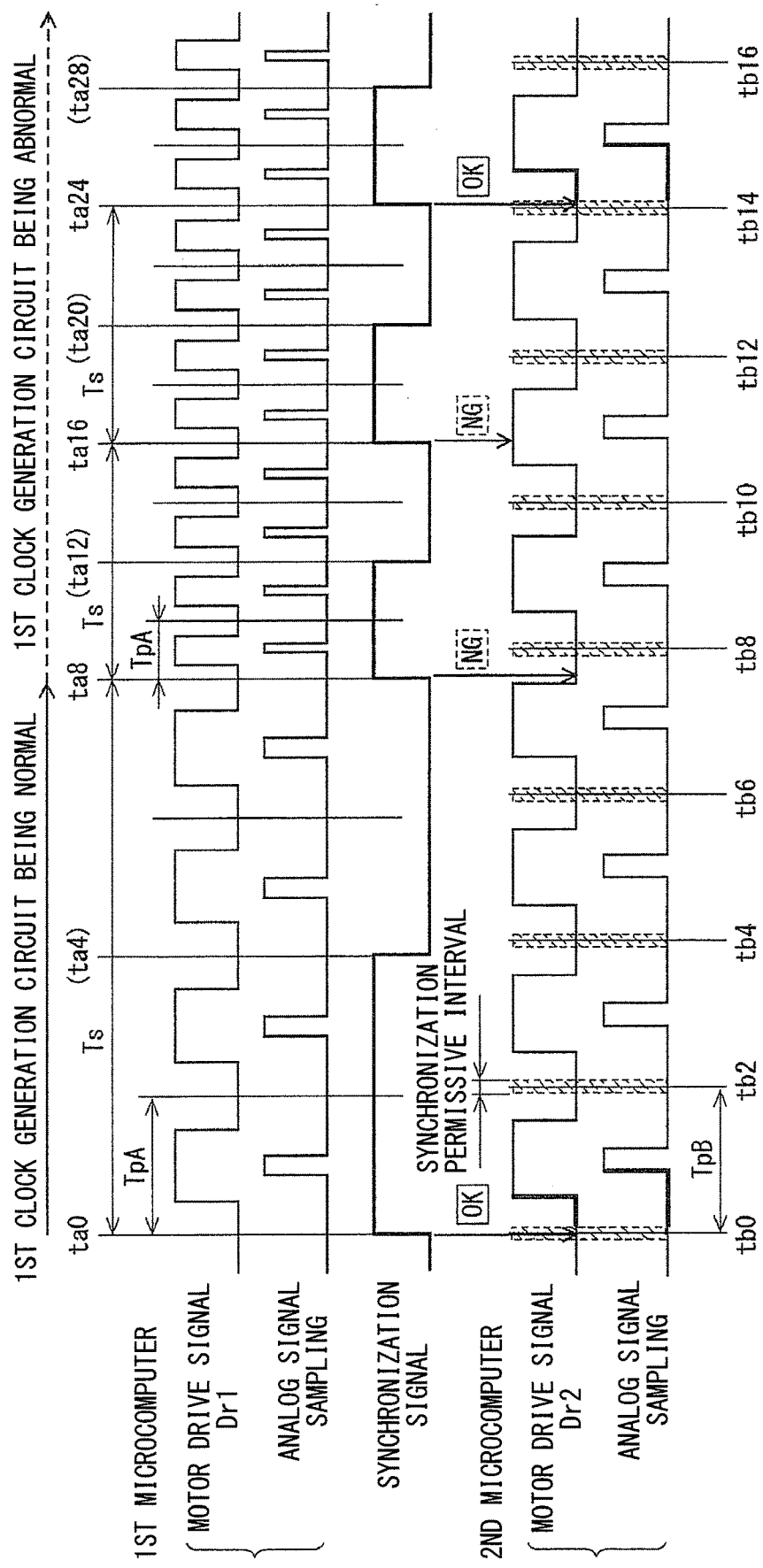
FIG. 34 is a timing chart upon synchronization signal abnormality according to the basic mode of the fifth embodiment.

FIG. 34 is a timing chart indicating timing determination upon synchronization signal abnormality according to the synchronization permissive interval exemplified above. FIG. 34 indicates results of timing determination at the pulse rise timing ta8, ta16, and ta24 of the synchronization signal when the first clock generation circuit 651 has abnormality as in FIG. 31. Timing of the synchronization signal within one of the synchronization permissive intervals is indicated by "OK" whereas timing outside the synchronization permissive intervals is indicated by "NG".

Synchronization signal reception timing is out of the synchronization permissive interval at the timing ta8 and ta16, so that the timing corrector 422 does not execute timing correction. The second microcomputer 402 drives the motor 80 asynchronously with the first microcomputer 401 in this case.

The second microcomputer 402 can thus prevent failure propagation from the first microcomputer 401. Particularly at the timing ta16, the motor drive signal Dr2 being ON is prevented from being forcibly switched OFF due to timing correction according to the abnormal synchronization signal.

Synchronization signal reception timing is included in the synchronization permissive interval at the timing ta24, so that the timing corrector 422 executes timing correction. Even if the cycle Ts of the synchronization signal is abnormal, rise itself at the timing ta24 is substantially at normal timing. Even if the timing corrector 422 executes timing correction in accordance with the received synchronization signal, such timing correction will have substantially no influence on the motor drive signal Dr2.

As described above, according to the basic technical idea of the basic mode of the fifth embodiment, the timing determiner 432 in the second microcomputer 402 determines normality or abnormality of the synchronization signal transmitted from the first microcomputer 401.

When the received synchronization signal is determined as being normal, the second microcomputer 402 permits timing correction and drives the motor 80 synchronously with the first microcomputer 401. This suppresses torque pulsation of the motor 80. This also prevents sample timing of the analog signal sampling portions 461 and 462 from matching switch timing of the motor drive signals Dr1 and Dr2. In a case where the synchronization signal has a square wave at the DUTY ratio of 50%, its rise timing and fall timing are included in the non-switching periods NSW, with side effect of reduction in influence of synchronization signal switching to the analog signals.

In another case where the synchronization signal is determined as being abnormal, the second microcomputer 402 prohibits timing correction and drives the motor asynchronously with the first microcomputer 401. This prevents control breakdown of the second microcomputer 402 due to failure propagation from the first microcomputer 401.

Particularly in the electric power steering apparatus 90, at least the normal second microcomputer 402 continuously drives the motor for continuation of the assist function.

Switching of the motor drive signals Dr1 and Dr2 may affect analog signal sampling as well as the synchronization signal. Assume a case where the synchronization signal is affected by switching of the motor drive signal Dr1 or Dr2 and has an erroneous pulse edge. In an ordinary format having no synchronization permissive interval, the synchronization signal receiver microcomputer recognizes pulse rise at unexpected timing to cause erroneous timing correction.

The format according to the basic mode of the fifth embodiment with the synchronization permissive interval being set during the non-switching period NSW is expected to be effective also to this difficulty. Specifically, the motor drive signals Dr1 and Dr2 are always switched outside the synchronization permissive interval in the format according to the basic mode of the fifth embodiment. Even when the synchronization signal is affected to cause an erroneous pulse edge, the pulse edge has timing expected to be out of the synchronization permissive interval. Even when the synchronization signal receiver microcomputer recognizes such a pulse edge of the synchronization signal caused by switching of the motor drive signal Dr1 or Dr2, the pulse edge is out of the synchronization permissive interval and can thus be determined as abnormal synchronization timing. This prevents the synchronization signal receiver microcomputer from executing timing correction at erroneous timing.

Various application processing according to the basic mode of the fifth embodiment will be described next with reference to FIGS. 35 to 38.

(Processing Upon Booting)

Assume a case where the microcomputers boot independently and start driving the motor at different drive timing. Even when the motor is driven normally, synchronization signal reception timing is not included in the synchronization permissive interval and timing correction may thus not be permitted. Processing upon booting depicted in FIGS. 35 and 36 will accordingly be executed upon booting the synchronization signal receiver microcomputer.

Figure 35:
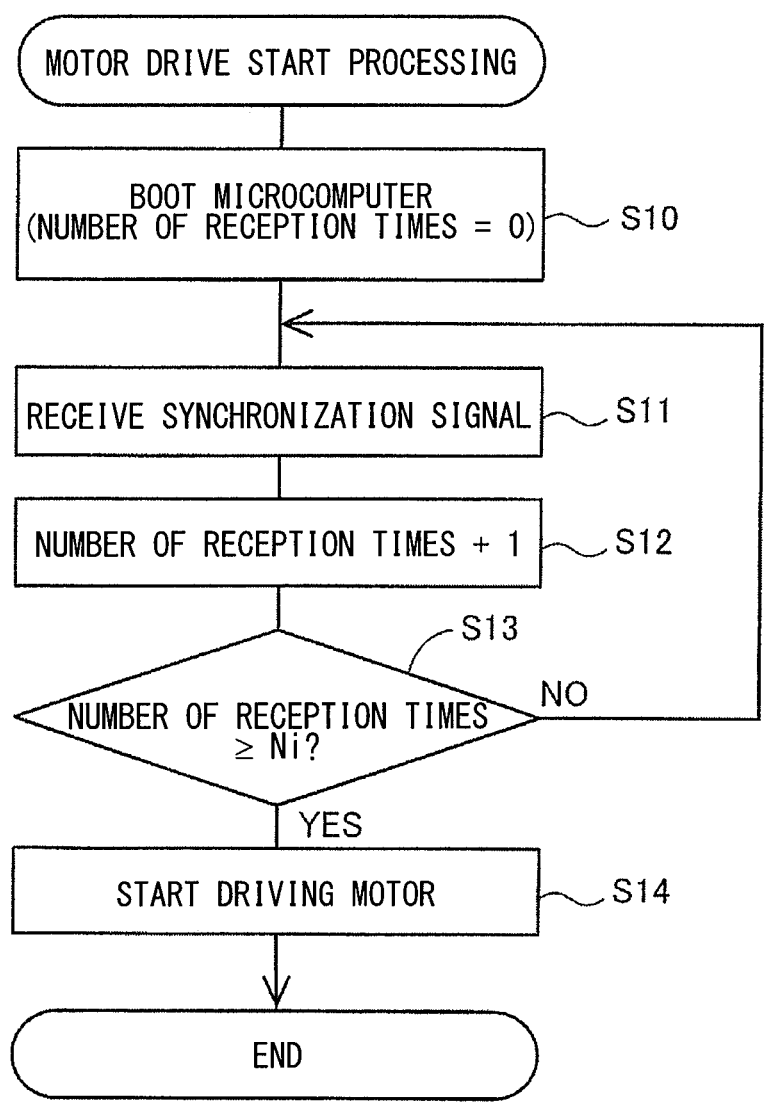
FIG. 35 is a flowchart of motor drive start processing upon microcomputer booting.

FIG. 35 is a flowchart of motor drive start processing upon microcomputer booting.

In S10, the second microcomputer 402 as the receiver microcomputer boots. The number of reception times upon booting has an initial value of zero. The timing corrector 422 receives a synchronization signal in S11 and increments the number of reception times in S12.

S13 includes determination of whether or not the number of reception times has reached an initial number of times Ni 2).

If YES in S13, the second microcomputer 402 starts driving the motor in S14. If NO in S13, the process flow returns to before S11.

The synchronization signal receiver microcomputer stands by for motor drive start until receiving the synchronization signal from the synchronization signal transmitter microcomputer Ni times, and starts driving the motor synchronously with the synchronization signal transmitter microcomputer when receiving the synchronization signal Ni times. This enables appropriate synchronous drive start after the multiple microcomputers get ready for synchronization.

Figure 36:
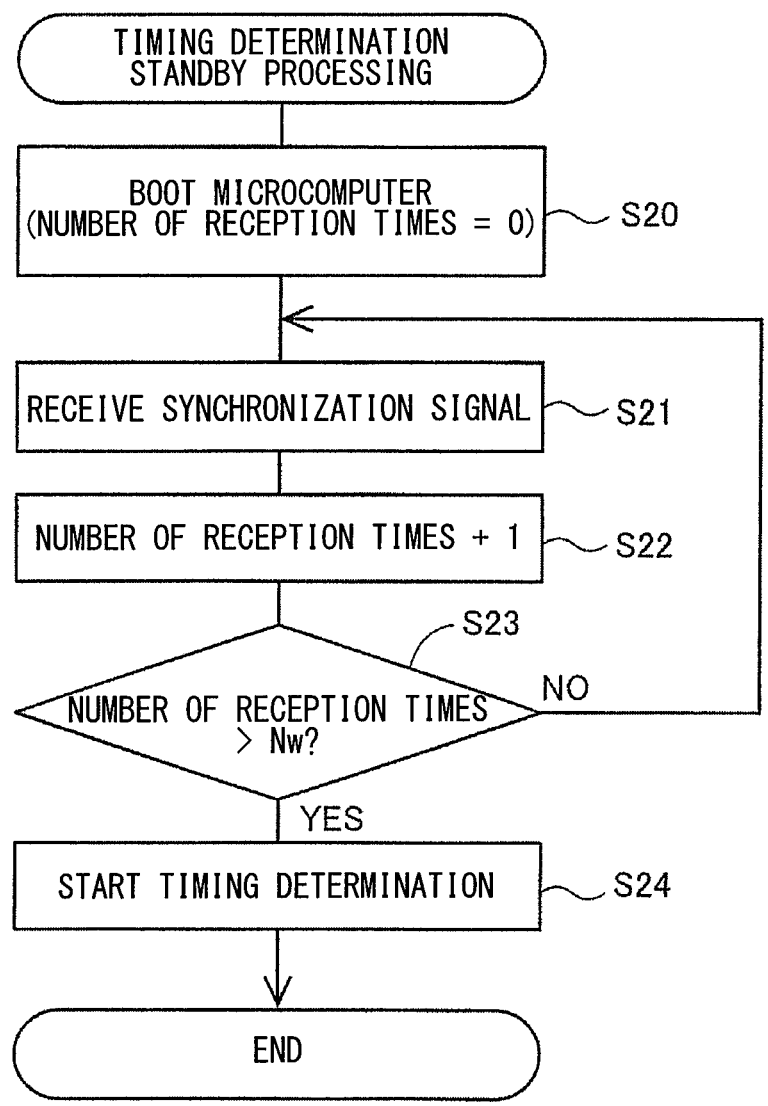
FIG. 36 is a flowchart of timing determination standby processing upon microcomputer booting.

FIG. 36 is a flowchart of timing determination standby processing upon microcomputer booting.

S20 to S22 are similar to S10 to S12 depicted in FIG. 35.

S23 includes determination of whether or not the number of reception times has exceeded a predetermined number of standby times Nw (≥1).

If YES in S23, the timing determiner 432 starts timing determination in S24. If NO in S23, the process flow returns to before S21.

The synchronization signal receiver microcomputer having booted permits timing correction without any condition until the synchronization signal is received Nw times. Timing determination is started as to the synchronization signals received (Nw+1)-th time and later. This appropriately prevents excessive prohibition of timing correction immediately after booting.

(Restoration Processing)

Even in a case where the synchronization signal transmitter microcomputer is reset or reinitialized to operate normally after transition to asynchronous drive due to temporary synchronization signal abnormality, synchronous drive will not restart directly. Restoration processing depicted in FIG. 37 will accordingly be executed.

Figure 37:
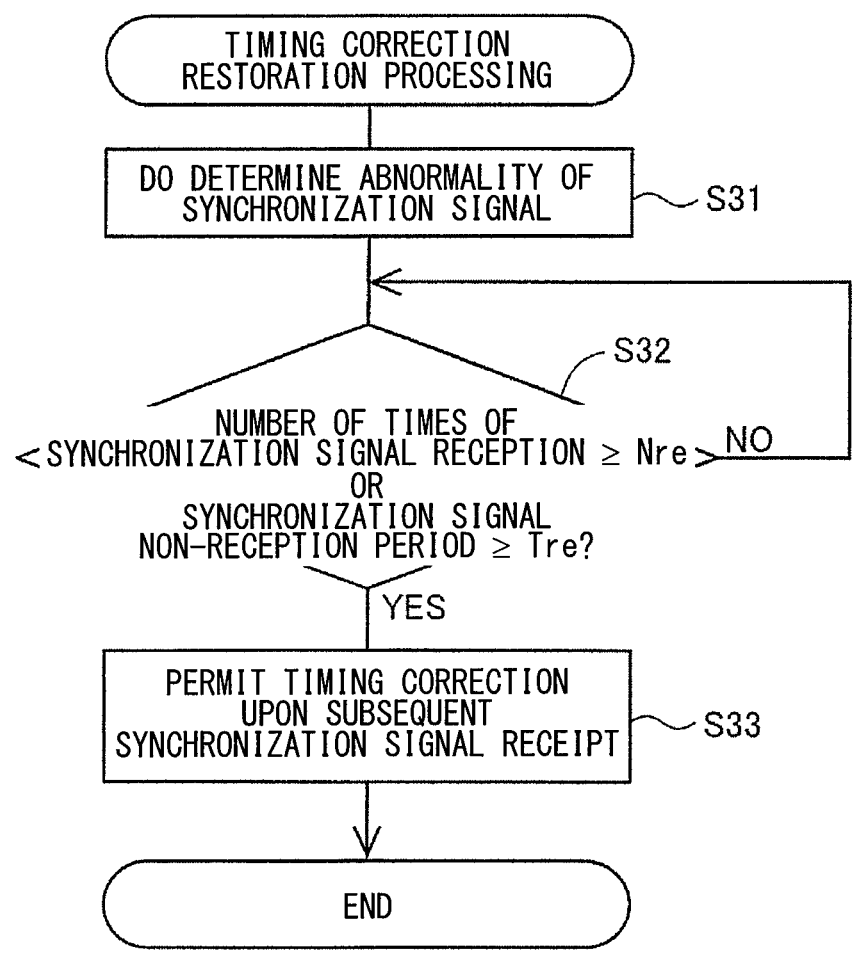
FIG. 37 is a flowchart of timing correction restoration processing after synchronization signal abnormality determination.

FIG. 37 is a flowchart of timing correction restoration processing after synchronization signal abnormality determination.

In S31, the timing corrector 422 determines the synchronization signal as being abnormal because synchronization signal reception timing is out of the synchronization permissive interval.

S32 includes determination of whether the number of times of synchronization signal reception after abnormality determination has reached a predetermined number of restoration times Nre (≥2), or whether or not no synchronization signal is received for predetermined restoration time Tre.

If YES in S32, the timing corrector 422 cancels timing correction prohibition in S33. Timing correction is permitted if reception timing is included in the synchronization permissive interval and the synchronization signal is determined as being normal after subsequent synchronization signal reception.

(Abnormality Confirmation Processing)

The synchronization signal can be erroneously determined as being abnormal because synchronization signal reception timing is out of the synchronization permissive interval due to temporary synchronization signal pulse disorder or the like, even though the synchronization signal transmitter microcomputer has no substantial abnormality. Timing correction may be prohibited excessively in this case. Abnormality confirmation processing depicted in FIG. 38 will accordingly be executed.

Figure 38:
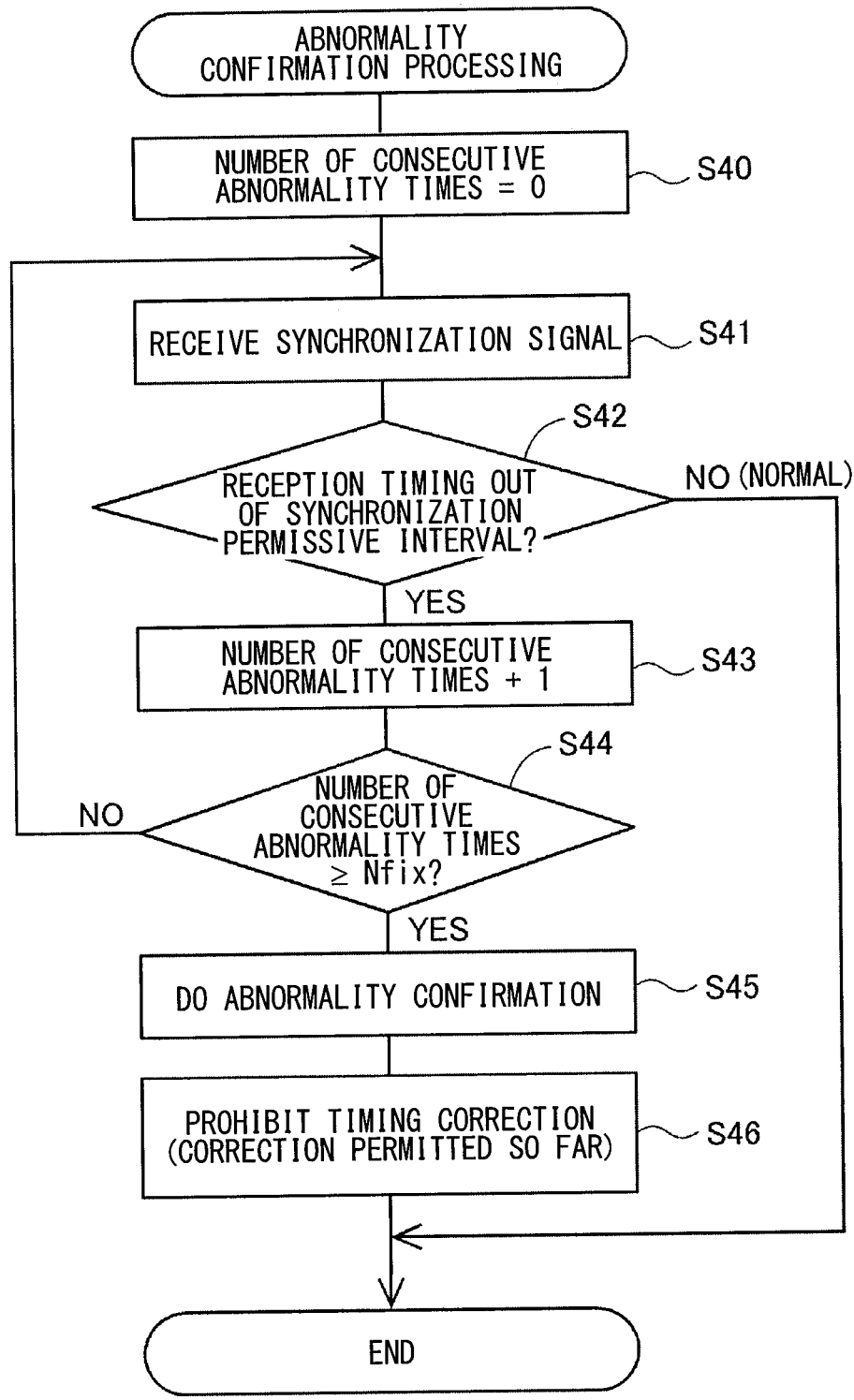
FIG. 38 is a flowchart of synchronization signal abnormality confirmation processing.

FIG. 38 is a flowchart of synchronization signal abnormality confirmation processing.

In S40, the timing determiner 432 sets, to zero, an initial value of the number of consecutive abnormality times as "the number of consecutive times of synchronization signal abnormality determination".

In S41, the timing corrector 422 receives the synchronization signal.

In S42, the timing determiner 432 determines whether or not synchronization signal reception timing is out of the synchronization permissive interval. If the synchronization signal is normal and if NO in S42, the processing ends. In this case, timing correction is executed in S04 in FIG. 32.

If YES in S42, the number of consecutive abnormality times is incremented in S43.

S44 includes determination of whether or not the number of consecutive abnormality times has reached a predetermined number of confirmation times Nfix. If YES in S44, the process flow proceeds to S45. If NO in S44, the process flow returns to before S41.

When the timing determiner 432 confirms synchronization signal abnormality in S45, the timing corrector 422 prohibits timing correction in S46. In other words, timing correction can be permitted and the second microcomputer 402 can continuously drive synchronously with the first microcomputer 401 until abnormality is confirmed. This prevents erroneous timing determination.

The various application processing according to the basic mode of the fifth embodiment is described above.

In the ECU 100 according to the basic mode of the fifth embodiment, the timing corrector 422 in the second microcomputer 402 as the synchronization signal receiver includes the timing determiner 432 that executes received signal determination of whether the received synchronization signal is normal or abnormal.

When the synchronization signal is determined as being normal in the received signal determination, the second microcomputer 402 permits the timing correction. When the synchronization signal is determined as being abnormal in the received signal determination, the second microcomputer 402 prohibits the timing correction and drives the motor asynchronously with the first microcomputer 401.

The timing determiner 432 of the second microcomputer 402 in this configuration is configured to determine abnormality of the synchronization signal. If the synchronization signal is determined as being abnormal in the received signal determination, the second microcomputer 402 prohibits the timing correction and drives the motor asynchronously with the first microcomputer 401. This configuration thus prevents control breakdown of the synchronization signal receiver microcomputer due to abnormality of the synchronization signal.

In this case, the motor can be at least driven continuously even if torque pulsation occurs. This configuration is thus effective specifically in a motor drive system like an electric power steering apparatus, which is highly required for continuation of an assist function through motor drive.

The related art may further have the following difficulty.

When the multiple microcomputers stop operation, the microcomputers may have a timing shift of stop determination according to power source OFF due to difference between supplied voltage to the microcomputers, characteristic variation between the power source generation circuits, or the like. If the microcomputers each determine operation stop independently, one of the microcomputers may keep operation whereas the other microcomputer may stop operation.

This may lead to erroneous failure determination due to stop of the signal expected to be received from the other microcomputer or failure in synchronization with the other microcomputer. Furthermore, if the multiple microcomputers stop operation in unmatched motor drive/stop states, one of the microcomputers may start driving the motor while the other microcomputer may execute initial check when the power sources are turned ON again. The related art never refers to such a difficulty that synchronization is not achieved upon operation stop of the multiple microcomputers.

The fifth embodiment provides a solution to this difficulty. The ECU 105 according to the fifth embodiment includes the configuration of the synchronization controller 49 according to the basic mode, and operates similarly to the ECU 101 according to the first embodiment.

Particularly in the operation 5B according to the comparative example indicated in FIG. 14, when the first vehicle switch 121 is turned ON again during the standby time Zb or at the time rs1 during the processing period Za2 of the second microcomputer 402, the microcomputers 401 and 402 have an operation start timing shift therebetween. Synchronization is thus highly possibly unsuccessful when timing determination is executed with provision of the synchronization permissive interval for the synchronization signal. The comparative example fails to achieve the objects of the basic mode of reducing influence on analog signal sampling through synchronization between the microcomputers.

If the microcomputers 401 and 402 stop operation simultaneously as in the fifth embodiment, synchronization is secured upon operation stop of the multiple microcomputers.

Sixth Embodiment

The sixth embodiment will be described with reference to FIGS. 39 and 40.

Figure 39:
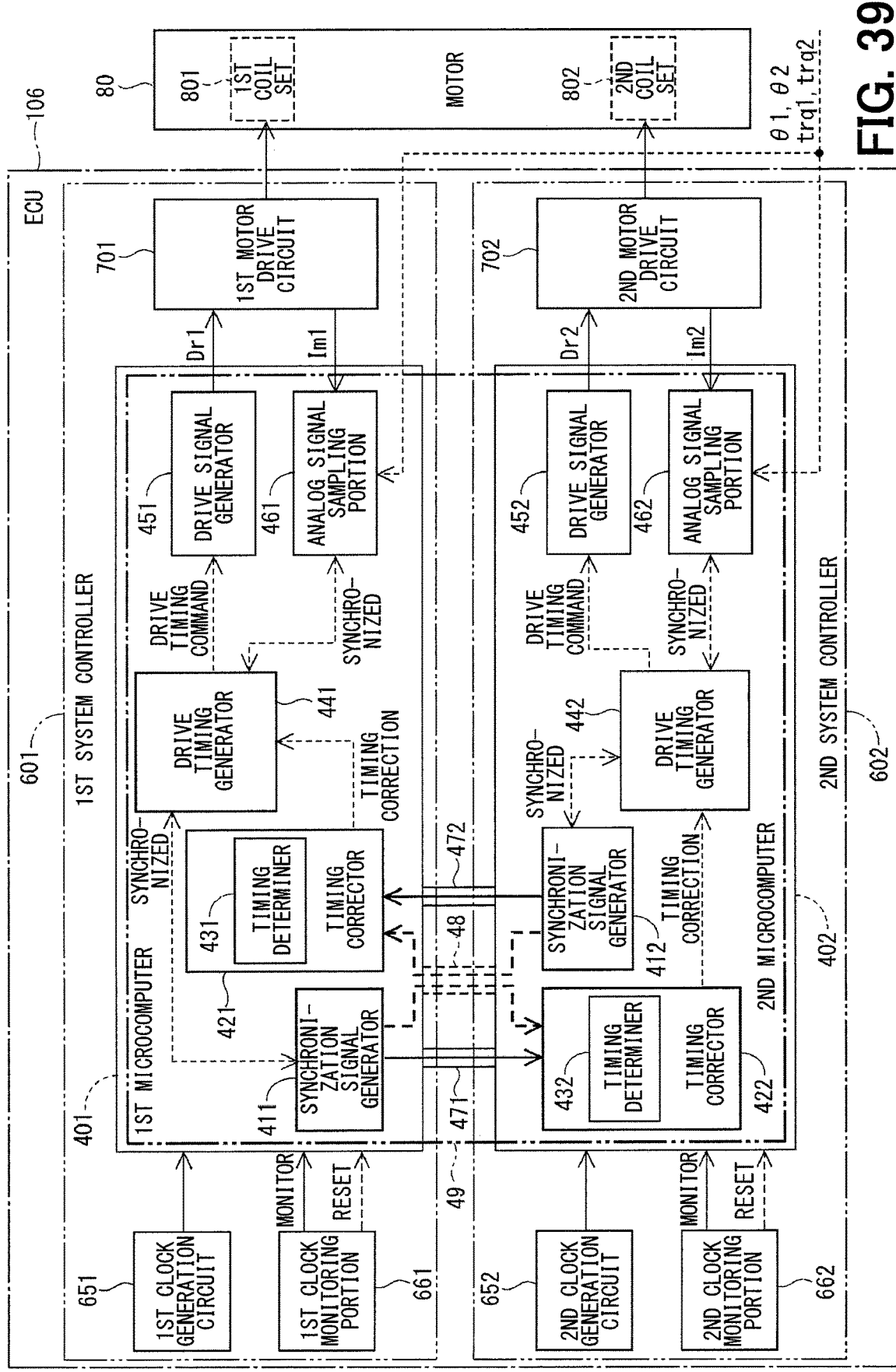
FIG. 39 is a configuration diagram of an ECU (a motor control apparatus) according to a sixth embodiment.

FIG. 39 depicts another configuration relevant to communication of the synchronization signal in a portion corresponding to the ECU 100 according to the basic mode of the fifth embodiment.

As depicted in FIG. 39, the sixth embodiment provides an ECU 106 including the first and second microcomputers 401 and 402 provided with synchronization signal generators 411 and 412 and timing correctors 421 and 422, respectively. The first microcomputer 401 and the second microcomputer 402 function as the "synchronization signal transmitter microcomputer" and the "synchronization signal receiver microcomputer", respectively, and mutually transmit and receive the synchronization signals.

A synchronization signal line according to this mode can include, as depicted by solid lines, a first synchronization signal line 471 for transmission from the first microcomputer 401 to the second microcomputer 402, and a separate second synchronization signal line 472 for transmission from the second microcomputer 402 to the first microcomputer 401. These synchronization signal lines can alternatively be replaced with a synchronization signal line 48 for bidirectional communication as depicted by a broken line. The synchronization signal line 48 for bidirectional communication, or at least one of the synchronization signal lines 471 and 472 for unidirectional communication, can be used in common with any other signal line for communication between the microcomputers.

Figure 40:
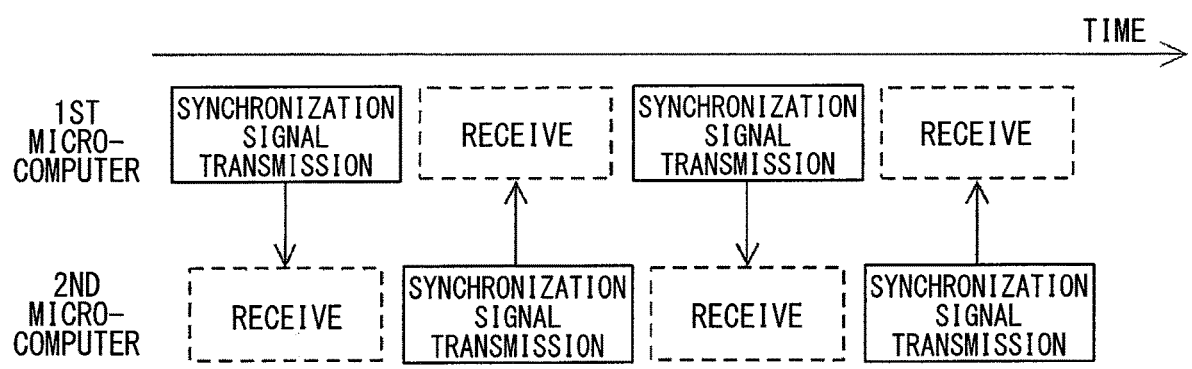
FIG. 40 is a diagram indicating bidirectional synchronization signal transmission/reception timing according to the sixth embodiment.

When the common synchronization signal line 48 is adopted as a bidirectional signal line, as indicated in FIG. 40, timing of synchronization signal transmission from the first microcomputer 401 to the second microcomputer 402 is set not to match timing of reverse synchronization signal transmission. FIG. 40 particularly exemplifies a case where the microcomputers 401 and 402 alternately transmit the synchronization signals.

As in the basic mode of the fifth embodiment, the synchronization signals can be provided bidirectionally for notification not by means of bidirectional communication via the synchronization signal line but by means of level change of a port signal from the synchronization signal transmitter microcomputer to the synchronization signal receiver microcomputer.

In a case where the microcomputers 401 and 402 are boot at different timing, the initially booted microcomputer can transmit the synchronization signal to the subsequently booted microcomputer.

Still alternatively, the first microcomputer 401 can mainly transmit the synchronization signal to the second microcomputer 402, and the synchronization signal can be transmitted reversely only in a certain case. For example, the first microcomputer 401 can be booted synchronously with the synchronization signal from the second microcomputer 402 upon booting, and the second microcomputer 402 can then operate synchronously with the synchronization signal from the first microcomputer 401. When the first microcomputer 401 has abnormality and is reset, the first microcomputer 401 can determine own operation start timing and start operation in accordance with the synchronization signal from the second microcomputer 402. In this case, the first microcomputer 401 can restart driving the motor synchronously with the second microcomputer 402 after restoration from the abnormality.

The sixth embodiment provides the first microcomputer 401 and the second microcomputer 402 functioned identically with each other with complete redundancy. This configuration is ready for any failure pattern in any one of the systems, and thus achieves improvement in reliability.

The common synchronization signal line 48 for bidirectional communication is adopted and timing of synchronization signal transmission in one of the directions is set not to match timing of synchronization signal transmission in the other one of the directions. This achieves reduction in the number of components of the ECU as well as simplification in configuration of the ECU.

Seventh and Eighth Embodiments

The seventh and eighth embodiments will be described with reference to FIGS. 41 and 42.

The ECUs 10 according to the seventh and eighth embodiments are basically configured as depicted in FIG. 7 according to the basic mode of the fifth embodiment. The seventh and eighth embodiments provide received signal determination not by determination of synchronization signal reception timing but by adoption of a synchronization signal having a specific pulse pattern for determination of normality or abnormality of the synchronization signal. The "timing determiner 432" in the timing corrector 422 of the second microcomputer 402 is thus replaced with a "received signal determiner 432".

Processing to be executed when the received signal determiner 432 according to the seventh or eighth embodiment determines the synchronization signal as being normal or abnormal is similar to that according to the basic mode of the fifth embodiment.

The specific pulse pattern has a number of pulses, duration, or an interval prescribed per cycle. Unlike FIGS. 31 and 34, FIGS. 41 and 42 do not clearly indicate a cause of synchronization signal abnormality but simply indicate difference between a normal pulse pattern and an abnormal pulse pattern.

Figure 41:
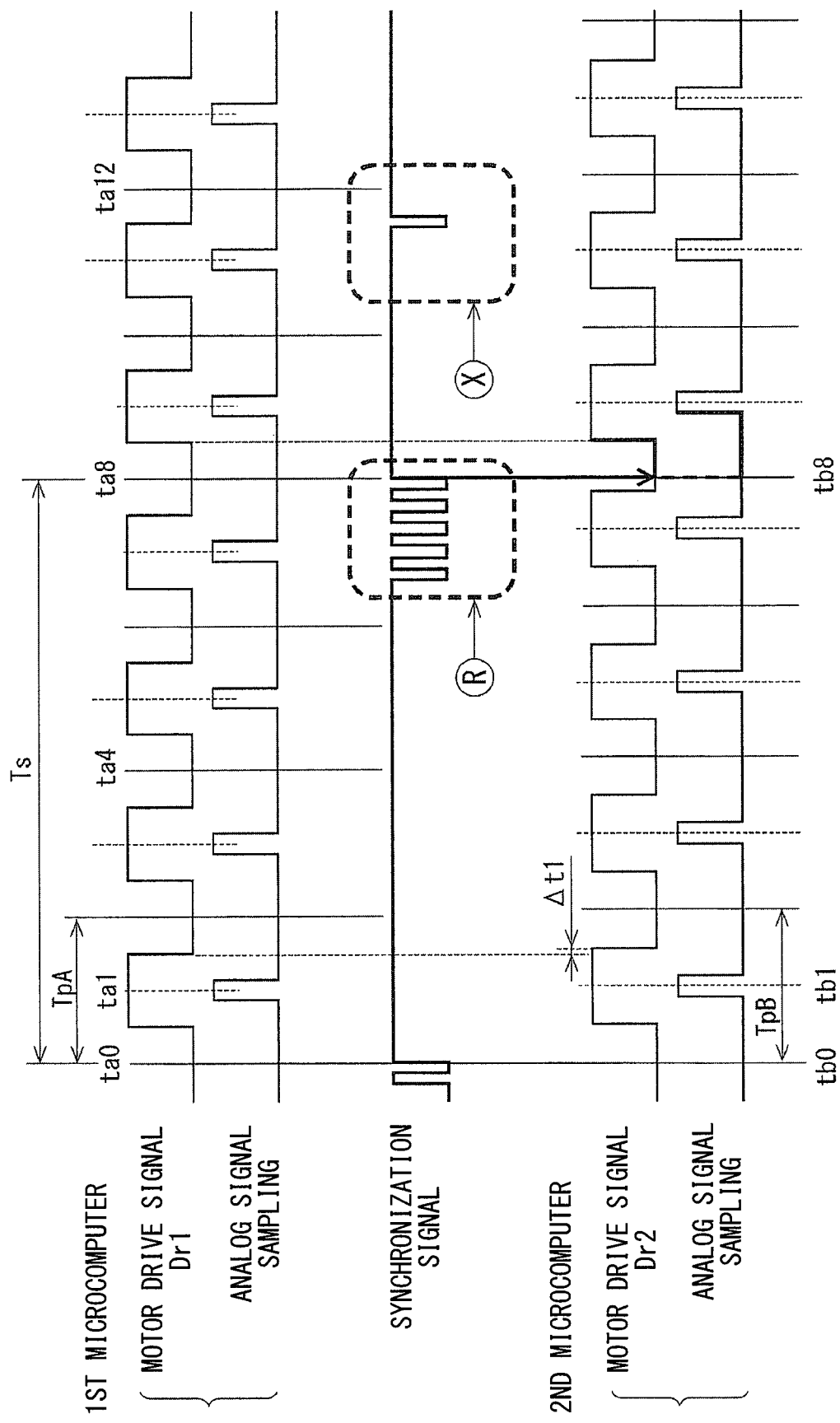
FIG. 41 is a timing chart according to a seventh embodiment, with a synchronization signal having a specific pulse pattern.

As indicated in a portion R in FIG. 41 according to the seventh embodiment, the synchronization signal is determined as being normal if a clock having predetermined duration is inputted k times as a prescribed number of times. The synchronization signal receiver microcomputer executes timing correction, in other words, synchronization of drive timing between the microcomputers, at k-th clock input timing.

If the synchronization signal has different pulse duration or has a different consecutive number of times as indicated in a portion X, timing correction is not executed and the motor is driven asynchronously.

The eighth embodiment includes, when a clock line for serial communication or the like is adopted as a synchronization signal line in a configuration for commonality between a synchronization signal and a different signal, calculation of reliability of received data according to the CRC method or the like with reception of serial communication as a trigger. Synchronization between the microcomputers is permitted if proper communication is found to be executed.

Figure 42:
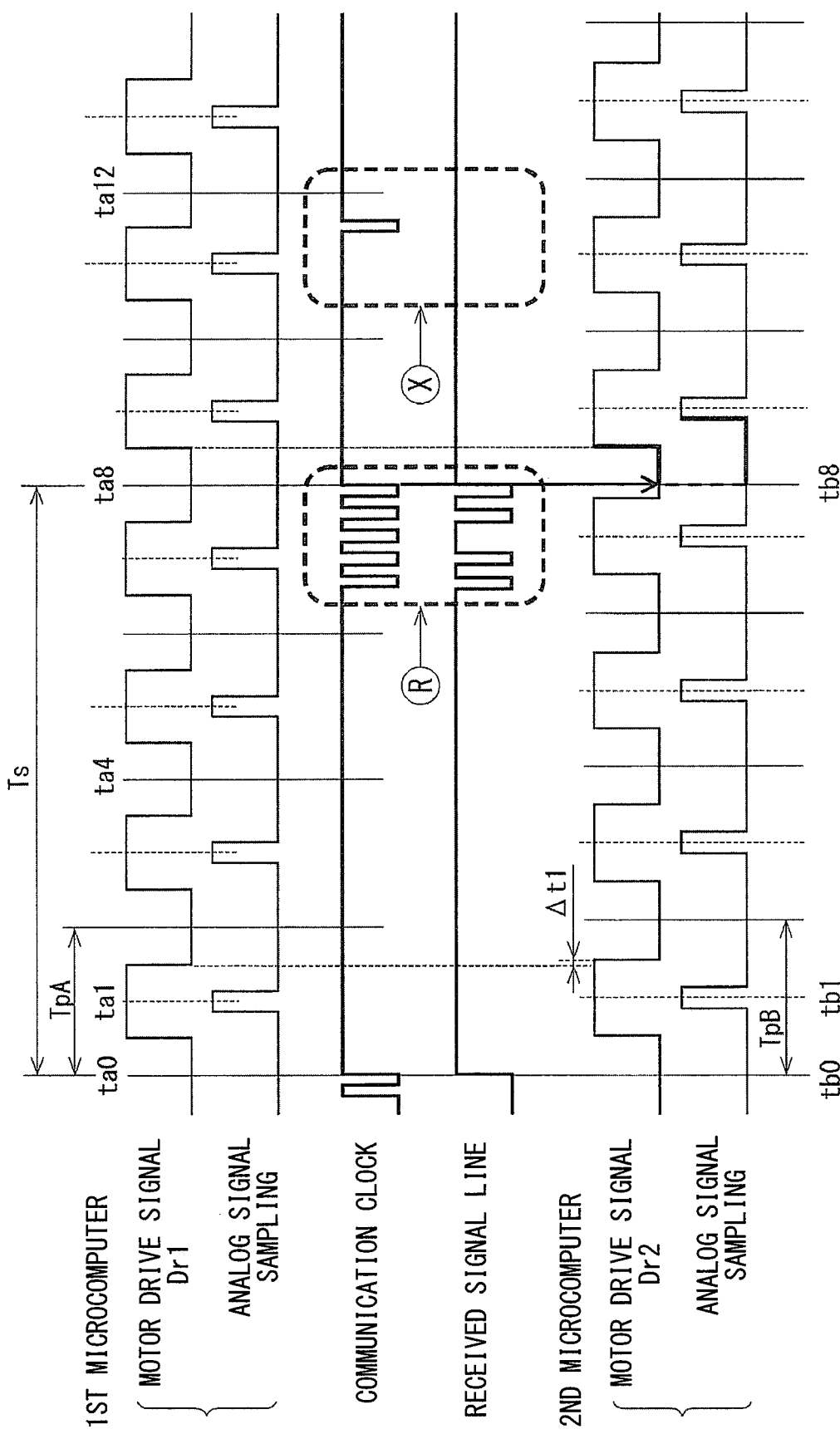
FIG. 42 is a timing chart according to an eighth embodiment, with a synchronization signal having a specific pulse pattern.

FIG. 42 indicates a pulse of a communication clock and a pulse of a received signal line according to the eighth embodiment. In the portion R, timing correction is executed with reception completion timing as a reference when CRC normality is determined. Timing correction can be executed in accordance with any appropriately set specific method, such as synchronization through correction by time required for CRC calculation.

In the portion X, timing correction is not executed with determination as abnormal timing due to CRC inconsistency.

In this manner, the received signal determiner 432 is configured to determine normality or abnormality of the synchronization signal in accordance with a specific pulse pattern, instead of the method by means of synchronization signal reception timing according to the basic mode of the fifth embodiment.

Processing depicted in FIGS. 35 to 38 is applicable also to the format according to the seventh or eighth embodiment for execution of received signal determination according to a specific pulse pattern. The seventh or eighth embodiment is applicable to the format according to the sixth embodiment of bidirectional synchronization signal transmission and reception.

OTHER EMBODIMENTS (a) The motor 80 to be controlled in the above embodiments is a multiple winding motor including the two coil sets 801 and 802 disposed at the common stator to be shifted from each other by the electrical angle of 30 degrees. A motor to be controlled in other embodiments can alternatively include two or more coil sets disposed to have the same phases. The present disclosure is not limited to such a configuration including a single motor having a common stator provided with two or more coil sets, but is applicable to multiple motors including multiple stators separately provided with the coil sets wound therearound and configured to cooperatively output torque.

The number of phases of a multiphase brushless motor is not limited to three, but can be four or more. The motor to be driven is not limited to an AC brushless motor but can be a DC brush motor. The "motor drive circuit" can be an H bridge circuit in this case.

(b) The above embodiments exemplify the motor control apparatus including the two microcomputers. The present disclosure is also applicable to a motor control apparatus including three or more microcomputers. In a format for synchronization signal unidirectional transmission according to the basic mode of the fifth embodiment, a single synchronization signal transmitter microcomputer can transmit a synchronization signal to each of remaining two or more synchronization signal receiver microcomputers. Alternatively, two or more synchronization signal transmitter microcomputers can each transmit a synchronization signal to each of synchronization signal receiver microcomputers other than the own microcomputer.

A format for stop determination in the motor control apparatus including three or more microcomputers is preferred to match stop timing of all the microcomputers if operation of all the microcomputers influences motor drive. In an exemplary format according to the second embodiment, the microcomputer having received the stop determination signal from at least one other microcomputer can actually stop operation of the own microcomputer in accordance with all the stop determination signals received from the other microcomputers and the stop determination signal from the own microcomputer.

In a case where operation of part of the microcomputers does not influence motor drive, stop timing has only to be matched between only the microcomputers influencing motor drive. In an exemplary format according to the second embodiment, the microcomputer having received the stop determination signal from at least one other microcomputer can actually stop operation of the own microcomputer in accordance with the stop determination signal received from at least one other microcomputer among the stop determination signals received from the other microcomputers, and the stop determination signal from the own microcomputer.

(c) The motor control apparatus may not include the analog signal sampling portion that is synchronized with the motor drive timing generator. In this case, the motor control apparatus can execute control arithmetic in accordance with externally acquired digital data. The motor control apparatus can alternatively execute feedforward control not in accordance with feedback information.

In the configuration including the analog signal sampling portion, sample timing can match switch timing of the motor drive signal.

(d) The motor drive signals can be generated in accordance with a PWM control technique indicated in FIG. 26 and the like, a pulse pattern technique of selecting an appropriate one from multiple prestored pulse patterns in accordance with a modulation factor or rotational speed, or the like. The carrier wave according to the PWM control technique is not limited to a triangular wave but can be a sawtooth wave.

(e) The motor control apparatus according to the present disclosure can be applied to a motor for an electric power steering apparatus as well as to a motor for any other purpose. In an exemplary case where the motor control apparatus is applied to a system other than a vehicle, the "vehicle switch signal" according to the above embodiments can be replaced with a "system switch signal" or the like.

Furthermore, for reference, a related technique is described as follows.

There is known a motor control apparatus that drive-controls a motor with use of multiple redundantly provided microcomputers.

A related art discloses a technique of continuing control with a normal microcomputer when either a main microcomputer or a sub microcomputer has abnormality in a control portion of an electric power steering control device.

In a case where multiple microcomputers are configured to drive a motor and are operated by a single power source, all the microcomputers stop and cannot continue control due to a common cause of power source failure. The multiple microcomputers need to be supplied with independent power sources and execute control when the own microcomputer is capable of controlling, regardless of operation status of the other microcomputer.

Simply providing such independent power sources may cause an OFF/ON timing shift between the power sources for the microcomputers due to difference in supplied voltage to the microcomputers, characteristic variation between power source generation circuits, or the like. Even if the microcomputers and the power sources have no failure, only part of the microcomputers may stop and only the other microcomputer may operate.

Assume a specific configuration in which each microcomputer determines stop/boot of the own microcomputer in accordance with an OFF/ON state of a vehicle switch signal. When the multiple microcomputers stop operation in this configuration, the microcomputers may have a timing shift of operation stop determination according to power source OFF, due to difference in information on the vehicle switch signals recognized by the microcomputers or difference in control state between the microcomputers.

Assume that this configuration is applied to an electric power steering apparatus including microcomputers that control motor drive power and executes assist control of reducing steering torque of a driver. If each of the microcomputers independently executes operation stop determination when the vehicle switch signal is turned OFF or ON, one of the microcomputers may continue assist control whereas the other microcomputer may once shut down the power source and then reboot.

This may lead to an erroneous failure determination due to stop of the signal expected to be received from the other microcomputer or failure in timing synchronization with the other microcomputer if applicable.

In a case where the electric power steering apparatus executes abnormality determination assuming an assist stop state in abnormality test upon microcomputer booting, generation of assist power due to motor drive by the other microcomputer may cause erroneous abnormality determination. Output of unexpected assist power due to stop of only one of the microcomputers may cause deterioration in steering feeling or make a driver to feel anxious.

A related art never refers to such a difficulty that consistency in control state, operation timing, or the like is not achieved upon operation stop of the multiple microcomputers.

Aspects of the disclosure described herein are set forth in the following clauses.

According to the present disclosure, a motor control apparatus that secures consistency upon operation stop of multiple microcomputers is provided. Also, according to the present disclosure, a motor drive system including the motor control apparatus, and a motor control method with use of the motor control apparatus are provided As an aspect of the disclosure, a motor control apparatus according to the present disclosure includes multiple motor drive circuits, and multiple microcomputers.

The multiple motor drive circuits drive one or more motors each including multiple coil sets.

The multiple microcomputers are operated by a microcomputer power source generated by a power source generation circuit connected to a power source, and include a drive signal generator that generates a motor drive signal as a command to each of the motor drive circuits.

Each microcomputer and each motor drive circuit are provided in association with each other, and each unit including these constituent elements will be defined as a "system". The constituent elements in each system control electrification to a corresponding one of the coil sets to allow the motor control apparatus to drive the motor. Each of the microcomputers will call the microcomputer itself by the "own microcomputer".

A motor control apparatus according to a first aspect includes the basic configurations described above, as well as the following configurations.

At least one of the microcomputers includes a stop determiner that determines that operation of the own microcomputer is about to be stopped and transmits such information as a stop determination signal to the other microcomputer.

A microcomputer having received the stop determination signal from at least one other microcomputer actually stops operation of the own microcomputer in accordance with at least the stop determination signal from the other microcomputer.

The motor control apparatus according to the present disclosure can thus match actual operation stop timing even when the multiple microcomputers have a timing shift of stop determination due to difference in supplied voltage or in characteristic between power source generation circuits. It is thus possible to secure consistency upon operation stop of the multiple microcomputers.

A motor control apparatus according to a second aspect assumes the basic configurations described above, and at least one of the microcomputers and at least one microcomputer other than this microcomputer simultaneously stop operation.

A motor control apparatus according to a third aspect assumes the basic configurations described above, and at least one of the microcomputers and at least one microcomputer other than this microcomputer simultaneously stop driving the motor.

The present disclosure further provides a motor control method with use of the motor control apparatus including the above basic configurations.

This motor control method includes an own microcomputer stop determination step of causing the stop determiner included in at least one of the microcomputers to determine that operation of the own microcomputer is about to be stopped.

A stop determination signal transmission step includes transmitting to the other microcomputer, as a stop determination signal, information that operation of the own microcomputer is about to be stopped, in accordance with determination in the own microcomputer stop determination step.

Another microcomputer stop determination step includes causing the own microcomputer to receive the stop determination signal from at least one other microcomputer.

An operation stop step includes causing the own microcomputer to actually stop operation of the own microcomputer in accordance with at least the stop determination signal from the other microcomputer.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Further alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes multiple steps (also referred to as sections), each of which is represented, for instance, as S51. Further, each step can be divided into several sub-steps while several steps can be combined into a single step.

The present disclosure has been described in accordance with the embodiments. The present disclosure should, however, not be limited to these embodiments and the structures thereof. The present disclosure can include various modification examples as well as modifications made within equivalent ranges. Various combinations and modes, as well as other combinations and modes achieved by adding only one element, more elements, or less elements to the various combinations and modes will fall within the scope and the ideological range of the present disclosure.

What is claimed is:

1. A motor control apparatus comprising:
a plurality of motor drive circuits that drive at least one motor; and
a plurality of microcomputers that are operated by a microcomputer power source generated by a power source generation circuit connected to a power source, and include a drive signal generator that generates a motor drive signal as a command to each of the motor drive circuits,
wherein:
the plurality of microcomputers include at least one microcomputer including a stop determiner that determines that operation of an own microcomputer is about to be stopped and transmits, to a different microcomputer, information as a stop determination signal; and
a microcomputer having received the stop determination signal from at least one different microcomputer stops operation of an own microcomputer actually in accordance with at least the stop determination signal from the different microcomputer.

2. The motor control apparatus according to claim 1, wherein:
the microcomputer having received the stop determination signal from at least one different microcomputer actually stops the operation of the own microcomputer in accordance with the stop determination signal received from the at least one different microcomputer among the stop determination signals received from the different microcomputers, and the stop determination signal from the own microcomputer.

3. The motor control apparatus according to claim 2, wherein:
the microcomputer having received the stop determination signal from the at least one different microcomputer actually stops the operation of the own microcomputer in accordance with the stop determination signals received from all the different microcomputers, and the stop determination signal from the own microcomputer.

4. The motor control apparatus according to claim 2, wherein:
in response to that an upper limit standby time elapses from output of the stop determination signal from the own microcomputer,
the microcomputer stops the operation of the own microcomputer regardless of whether the stop determination signal is received from the different microcomputer.

5. The motor control apparatus according to claim 1, wherein:
each of the microcomputers includes the stop determiner and mutually transmits and receives the stop determination signal from each of the stop determiners.

6. The motor control apparatus according to claim 1, wherein:
the plurality of microcomputers further includes a power source switching determiner that commands connection or disconnection to a power source switching circuit opening and closing a voltage supply path to the power source generation circuit; and
upon reception of the stop determination signal, the power source switching determiner outputs a disconnection command to the power source switching circuit to actually stop operation of a corresponding microcomputer.

7. The motor control apparatus according to claim 1, further comprising:
a reset controller that controls reset of a corresponding microcomputer,
wherein:
the reset controller stops operation of the corresponding microcomputer in accordance with the stop determination signal.

8. The motor control apparatus according to claim 7, wherein:
the reset controller is provided outside the microcomputer and is configured as an IC that controls a reset terminal of the microcomputer.

9. The motor control apparatus according to claim 7, provided in a vehicle and configured to supply voltage to the power source generation circuit upon receipt of a vehicle switch signal, wherein:
the plurality of microcomputers monitor input of the vehicle switch signal;
the plurality of microcomputers notify a corresponding reset controller of a reset command when the vehicle switch signal is once turned OFF and is then inputted again; and
the reset controller having received the reset command resets the corresponding microcomputer.

10. The motor control apparatus according to claim 1, further comprising:
a signal line through which a signal is communicated between the plurality of microcomputers.

11. The motor control apparatus according to claim 1, wherein:

the plurality of microcomputers are disposed with a predetermined space on an identical surface of an identical substrate.

12. The motor control apparatus according to claim 1, further comprising:
a plurality of clock generation circuits that independently generate a clock as operation reference of the microcomputers.

13. The motor control apparatus according to claim 12, wherein:
the plurality of microcomputers include a synchronization transmitter microcomputer as at least one microcomputer that transmits a synchronization signal synchronized with a drive timing of the own microcomputer and synchronizing the drive timing of the plurality of microcomputers;
the plurality of microcomputers include a synchronization signal receiver microcomputer as at least one microcomputer that receives the synchronization signal from the synchronization signal transmitter microcomputer;
the synchronization signal transmitter microcomputer includes a synchronization signal generator that generates the synchronization signal and transmits the synchronization signal to the synchronization signal receiver microcomputer; and
the synchronization signal receiver microcomputer includes a timing corrector that is configured to execute timing correction of correcting the drive timing of the own microcomputer to be synchronized with the synchronization signal received.

14. The motor control apparatus according to claim 13, further comprising:
at least one synchronization signal line that connects the synchronization signal transmitter microcomputer and the synchronization signal receiver microcomputer to allow the synchronization signal to be transmitted and received.

15. The motor control apparatus according to claim 13, wherein:
the timing corrector of the synchronization signal receiver microcomputer includes a received signal determiner that executes a received signal determination of determining normality or abnormality of the synchronization signal received;
the synchronization signal receiver microcomputer permits the timing correction in response to that the synchronization signal is determined as being normal in the received signal determination; and
the synchronization signal receiver microcomputer prohibits the timing correction in response to that the synchronization signal is determined as being abnormal in the received signal determination and asynchronously drives the motor with the synchronization signal transmitter microcomputer.

16. A motor control apparatus comprising:
a plurality of motor drive circuits that drive at least one motor; and
a plurality of microcomputers that are operated by a microcomputer power source generated by a power source generation circuit connected to a power source, and include a drive signal generator that generates a motor drive signal as a command to each of the motor drive circuits,
wherein:
at least one microcomputer in the plurality of microcomputers and at least one different microcomputer other than the at least one microcomputer in the plurality of microcomputers simultaneously stop operation.

17. A motor control apparatus comprising:
a plurality of motor drive circuits that drive at least one motor; and
a plurality of microcomputers that are operated by a microcomputer power source generated by a power source generation circuit connected to a power source and include a drive signal generator that generates a motor drive signal as a command to each of the motor drive circuits,
wherein:
at least one microcomputer in the plurality of microcomputers and at least one different microcomputer other than the at least one microcomputer in the plurality of microcomputers stop driving the motor simultaneously.

18. A motor drive system comprising:
the motor control apparatus according to claim 1; and
the motor configured as a brushless motor including a plurality of multiphase coil sets that are disposed coaxially and are electrified by the motor control apparatus.

19. The motor drive system according to claim 18, wherein:
the motor control apparatus is provided integrally at an axial end of the motor.

20. A motor drive system included in a vehicle electric power steering apparatus, the motor drive system comprising:
the motor control apparatus according to claim 1; and
the motor that is driven by the motor control apparatus and outputs assist torque.

21. The motor drive system according to claim 20, comprising:
two power sources;
the motor that is provided with two multiphase coil sets having electric power supplied from the two power sources, respectively;
the motor control apparatus that includes
two microcomputers controlling electrification to the two multiphase coil sets, respectively, and
two motor drive circuits receiving a motor drive signal as a command from a corresponding one of the two microcomputers;
two steering torque sensors that detect steering torque and output the steering torque to the two microcomputers; and
two rotation angle sensors that detect electrical angles of the motor and output the electrical angles to the two microcomputers.

22. A motor control method executed by a motor control apparatus including:
a plurality of motor drive circuits that drive at least one motor; and
a plurality of microcomputers that are operated by a microcomputer power source generated by a power source generation circuit connected to a power source, and include a drive signal generator that generates a motor drive signal as a command to each of the motor drive circuits;
the motor control method comprising:
an own microcomputer stop determination step of causing a stop determiner included in at least one of the microcomputers to determine that operation of an own microcomputer is about to be stopped;
a stop determination signal transmission step of transmitting, to a different microcomputer, information that operation of the own microcomputer is about to be stopped as a stop determination signal, in accordance with determination in the own microcomputer stop determination step;

a different microcomputer stop determination step of receiving the stop determination signal from at least one different microcomputer by the own microcomputer; and an operation stop step of actually stopping operation of the own microcomputer in accordance with at least the stop determination signal from the different microcomputer.

* * * * *